(12) United States Patent
Nishii et al.

(10) Patent No.: US 8,083,637 B2
(45) Date of Patent: Dec. 27, 2011

(54) TOROIDAL CONTINUOUSLY VARIABLE TRANSMISSION

(75) Inventors: Hiroki Nishii, Kanagawa (JP); Eiji Inoue, Kanagawa (JP); Jörg Möckel, Chemnitz (DE)

(73) Assignee: NSK Ltd., Tokyo (JP)

( * ) Notice: Subject to any disclaimer, the term of this patent is extended or adjusted under 35 U.S.C. 154(b) by 1185 days.

(21) Appl. No.: 11/757,440

(22) Filed: Jun. 4, 2007

(65) Prior Publication Data

US 2008/0009387 A1    Jan. 10, 2008

(30) Foreign Application Priority Data

Jun. 2, 2006 (JP) ............... P. 2006-155210
Jun. 23, 2006 (JP) ............... P. 2006-173634
Sep. 15, 2006 (JP) ............... P. 2006-250530

(51) Int. Cl.
  *F16H 15/38* (2006.01)
(52) U.S. Cl. .......................... 476/46; 476/40
(58) Field of Classification Search ............ 476/40, 476/42, 46, 70
  See application file for complete search history.

(56) References Cited

U.S. PATENT DOCUMENTS 6,878,091 B2 * 4/2005 Sich et al. ............ 476/46

FOREIGN PATENT DOCUMENTS

| DE | 10034453 A1 | 1/2002 |
|---|---|---|
| DE | 102 46 432 A1 | 4/2004 |
| EP | 0540499 A2 | 5/1993 |
| JP | 3-74667 A | 3/1991 |
| JP | 2001-165262 A | 6/2001 |
| JP | 2003-294099 A | 10/2003 |
| JP | 2005-249141 A | 9/2005 |

OTHER PUBLICATIONS

Aoyama Motto, "Best Car Supplement Volume Entitled Red Badge Series 245/Book Presenting Automotive Latest Mechanisms", Dec. 20, 2001, pp. 92-93, Sunsuisha Co., Ltd./Kodansha Co., Ltd., Japan.
Tanaka Hirohisa, "Toroidal CVT", Jul. 13, 2000, pp. 1-182, Corona Publishing Co., Ltd., Tokyo, Japan.
German Office Action dated Jan. 7, 2009.

* cited by examiner

*Primary Examiner* — William C Joyce
(74) *Attorney, Agent, or Firm* — Sughrue Mion, PLLC

(57) ABSTRACT

The support beam 34 having the cylindrical convex surface 33 is provided at the intermediate portion of the trunnion 9b. The recess 38 of the partial cylindrical surface formed on the outside of the outer ring 37 on the thrust ball bearing 36 supporting the power rollers 8b and the cylindrical convex surface 33 of the support beam are engaged. The outer ring and the power rollers 8b are supported swingably in the axial direction of the input and output discs in respect to the trunnions 9b.

25 Claims, 72 Drawing Sheets

TOROIDAL CONTINUOUSLY VARIABLE TRANSMISSION

BACKGROUND OF THE INVENTION

1. Field of the Invention

The present invention relates to an improved toroidal continuously variable transmission use for power transmission of a vehicle, particularly to achieve a structure that enables high transmission efficiency by smoothly shifting power roller in respect to a trunnion.

2. Description of Related Art

Examples of a toroidal continuously variable transmission used for a vehicle are disclosed in various publications, for example, Japanese Patent Unexamined Publications JP-A-03-74667 and JP-A-2001-165262 and Non Patent Documents "Best Car Supplement Volume Entitled Red Badge Series 245/Book Presenting Automotive Latest Mechanisms" pages 92-93 on Dec. 20, 2001, by Aoyama Motto in Sunsuisha Co. Ltd./Kodansha co. Ltd., and "Toroidal CVT" on Jul. 13, 2000, by Tanaka Hirohisa in Corona Publishing Co. Ltd., and some of which are known and in use. FIG. 70 shows a basic configuration of a toroidal continuously variable transmission that is known in the art. The configuration in the related art is first simply described. A pair of input discs 1a, 1b is coaxially and synchronously rotatably supported by an input rotary shaft 2, facing input-side inner faces 3 of toroidal curves (arc recess in the cross-section).

An output cylinder 5 with an output gear 4 fixed around the outside of the intermediate portion is rotatably supported at the intermediate portion of the input rotary shaft 2. An Output disc 6 is synchronously rotatably supported at both ends of the output cylinder 5 by a spline. Further, output-side inner faces 7 of toroidal curves of the output discs 6 face both of the input-side inner faces 3.

Two power rollers 8 having spherical convex surfaces are disposed (in the cavity) between the input-side and output-side inner faces 3, 7, respectively, around the input rotary shaft 2. The power rollers 8, 8 are supported on the inner surface of corresponding trunnions 9, 9 by a plurality of rolling bearings and support shafts 10 with eccentric upper and base halves such that they can rotate with the upper halves of the support shafts 10 and swing around the base halves of the support shafts 10.

Further, each of the trunnions 9 is disposed rotatably about tilt rotary shaft coaxially disposed at both longitudinal ends (in the direction vertical to the surface of FIG. 70) of the trunnion 9. The trunnion 9 swings (inclines) by being displaced in axial direction of the tilt rotary shaft by using a hydraulic actuator. In change of speed, the trunnions 9 are moved axially of the tilt rotary shafts by pressurized fluid supplied from the actuators. As a result, force tangentially exerting at the contact portions (traction portions) of the input-/output-side inner faces 3, 7 and the power rollers 8 changes in direction (sideslip appears), so that the trunnions 9 swing around the tilt rotary shafts.

To start the above-mentioned toroidal continuously variable transmission, an input disc 1a at one side (the left in FIG. 70) is rotated through a loading cam type loader 12 by a driving shaft 11. Accordingly, the input discs 1a, 1b supported at both ends of the input rotary shaft 2 are pressed close, rotating synchronously. The rotation is transferred through the power rollers 8 to the output discs 6 and outputted through the output gear 4.

In changing the rotational speed ratio of the input rotary shaft 2 and the output gear 4, in order to decelerate the input rotary shaft 2 and the output gear 4, the trunnions 9 swing to the position shown in FIG. 70 such that the outsides of the power rollers 8 contact with the center portions of the input-side inner faces 3 of the input discs 1a, 1b and the outer portions of the output-side inner faces 7 of the output discs 6. On the contrary, in acceleration, the trunnions 9 swing reverse to the position of FIG. 70 such that the outsides of the power rollers 8 contact with the outer portions of the input-side inner faces 3 of the input discs 1a, 1b and the center portions of the output-side inner faces 7 of the output discs 6. Intermediate speed ratio (transmission ratio) of the input rotary shaft 2 and the output gear 4 by positioning the trunnions 9 to half the swing angle.

When the toroidal continuously variable transmission is in operation, the members for power transmission, i.e. the input discs and output disc 1a, 1b, 6 and the power rollers 8 are elastically deformed by the pressing force (thrust) of the loader 12. The discs 1a, 1b, 6 are axially moved with the elastic deformation. Further, the pressing force of the loader 12 increases in accordance with increase in torque transferred by the toroidal continuously variable transmission and the amount of elastic deformation of the members increases correspondingly. Therefore, a mechanism for moving the power rollers 8 axially of the discs 1a, 1b, 6 in respect to the trunnions 9 regardless of changes in torque is required to appropriately maintain the contact of the input-side and output-side inner faces 3, 7 and the outsides of the power rollers 8. According to a first configuration of the related art shown in FIG. 70, the power rollers 8 are axially moved by swing the front halves of the support shafts 10 supporting the corresponding power rollers 8 about the base halves.

On the other hand, a toroidal continuously variable transmission is disclosed in German Patent Unexamined Publication DE 10 246 432 in which transmission ratio is changed and power rollers are moved axially of each disc by individual mechanisms. The above second toroidal continuously variable transmission in the related art has a transmission configuration shown in FIGS. 71 and 72. According to the second configuration shown in FIGS. 71 and 72, a swing frame 13 is mounted swingably about an input rotary shaft 2 around the input rotary shaft 2 between input and output discs 1, 6. Three trunnions 9a, 9a, 9a rotatably supporting power rollers 8a are supported only swingably about tilt rotary shafts 15 disposed at both ends between support plates 14 provided radial outer ends of the swing frame 13. The trunnions 9a, different from the configuration shown in FIG. 70, are not moved axially of the tilt rotary shafts 15 in respect to the swing frame 13. With the above configuration, the central extension lines a of the power rollers 8a cross each other at the central axis β of the discs 1, 6.

Of the tilt rotary shafts 15, sector gears 16, 16a are fixed to the tilt rotary shaft 15, exclusive of the two tilt rotary shafts 15 at the upper part in FIGS. 71 and 72. The sector gears 16, 16a that are circumferentially adjacent for the trunnions 9a are engaged. Accordingly, the trunnions 9a are inclined at the same angle in the same direction about the direction for changing transmission ratio. A sector gear 16a of the sector gears 16, 16a (right lower one in FIGS. 71 and 72) swings with respect to the tilt rotary shaft 15 fixing the sector gear 16a by a cam mechanism 17 and actuator 18.

The cam mechanism 17 consists of a cam follower 19 supported to the sector gear 16a and a cam member 21 fixed to the inner face of a housing 20 that houses the toroidal continuously variable transmission. The cam follower 19 is engaged with a cam groove 22 formed on the cam member 21. On the other hand, the actuator 18, a double-acting hydraulic actuator, transfers movement of a pin engaged with a long hole formed in a piston 23 through a connecting bracket 25 to the swing frame 13 and the swing frame 13 swings with respect to the input rotary shaft 2. The swing frame 13 swinging changes the positional relationship of the cam groove 22 and the cam follower 19 supported to the sector gear 16a and the sector gear 16a correspondingly swings with respect to the tilt rotary shaft 15. Further, the motion of the sector gear 16a is transferred to the trunnions 9a through the other sector gears 16. Consequently, the power rollers 8a supported to the inner side of the trunnions 9a swing at the same angel in the same direction in respect to the direction for changing the transmission ratio of the input and output discs 1, 6 and the transmission ratio is controlled to the desired value.

According to the configuration disclosed in DE 10 246 432 A1, in the relative positional relationship with the swing frame 13, the power rollers 8a in transmission swing only vertical to the surface of FIG. 72. In other words, the power rollers 8a are not moved axially of the tilt rotary shafts 15 (perpendicular to the extension lines α) in respect to the swing frame 13 for transmission (although they may be moved with the swing frame 13 in the rotational direction or opposite of the input rotary shaft 2). Further, the swing frame 13 is supported swingably only to a predetermined angle for transmission between the input and output discs 1, 6 and not moved axially of the discs 1, 6 (vertically to the surface of FIG. 72). Accordingly, the trunnions 9a do not move axially of the discs 1, 6.

On the other hand, when the toroidal continuously variable transmission is in operation, the members 1, 6, 8a are elastically deformed by additional force for ensuring surface pressure at the rotational contact portion (traction portion) between the inner surface 3, 7 of the discs 1, 6 and the outsides of the power rollers 8a. The power rollers 8a of them are moved vertical to the surface of FIG. 72. According to the configuration described in relation to FIG. 70, the power rollers 8 can be moved by elastic deformation of each member by swingably supporting them in respect to the trunnions 9 with the support shafts 10 (eccentric shafts) that make the base and front halves eccentric. However, according to the configuration shown in FIGS. 71 and 72, the power rollers 8a cannot swing by one eccentric shaft.

This is because, though the amount is a little, the power rollers 8a are moved in axial direction of the tilt rotary shafts 15 (perpendicular to the extension lines α) by motion along the arc having a rotational radius of the eccentric amount when the power rollers 8a swing by one eccentric shaft. As described in relation to the configuration shown in FIG. 70, side-slip appears at the traction portion when the power rollers 8a are moved axially of the tilt rotary shafts 15 and force is applied to the trunnions 9a through the power rollers 8a in the swing direction about the tilt rotary shafts 15 (the direction for changing the transmission ratio). The force is generated even at movement of 0.1 to 0.2. It is not preferable for the toroidal continuously variable transmission to operate under the side-slip and applied force. In detail, the side-slip results in reduction of transmission efficiency and durability and the force results in increase in the force to change the transmission ratio substantially required.

Accordingly, according to the configuration disclosed in DE 10 246 432 A1, the power rollers 8a are moved only axially of the input and output discs 1, 6 (vertical to the surface of FIG. 72) by elastic deformation of the members 1, 6, 8a, using the configurations shown in FIGS. 73 to 75. Used in the configurations, a support shaft 10a that rotatably supports the power roller 8a in respect to the trunnion 9a has an eccentric base 26 and support shaft portion 27, A circular recess 28 is centrally formed on the inner surface of the trunnion 9a. A cylindrical crank member 29 (thick disc) is engaged with the circular recess 28. Further, at a portion of the crank member 29, a circular hole 30 is formed at the outside from the center of the crank member 29. The eccentric amount δ2 between the central axes $X_{29}$ and $X_{30}$ of the crank member 29 and circular hole 30 is the same as the eccentric amount δ1 between the central axes $X_{26}$ and $X_{27}$ of the base portion 26 and the support shaft portion 27 (δ2=δ1). Accordingly, the base portion 26 is swingably engaged with the circular hole 30 without rattling. Therefore, the central axis $X_{26}$ of the base portion 26 is arranged in a line with the central axis $X_{30}$ of the circular hole 30.

At a portion of the trunnion 9a, a elongated hole for engaging that is long in axial direction of the tilt rotary shaft 15 is formed at the corner under the circular recess 28, communicating the outside of the trunnion 9a with the bottom of the circular recess 28. In the support shaft 10a, a guide rod 32 protruding at a corner of the end (right end in FIG. 74B) of the base portion 26 is held in the long elongated hole such that it is movable longitudinally (axially of the tilt rotary shaft 15 and up/down in FIG. 74).

According to the above-mentioned configuration disclosed in DE 10 246 432 A1, the power roller 8a moves only in the axial direction shown by an arrow (a) in FIG. 75A by axial movement of the input- and output-side inner faces 3, 7, the axial sides of the input and output discs 1, 6. As the power roller 8a moves in the direction of arrow (a), the guide rod 32 moves axially of the tilt rotary shaft 15 in the long elongated hole in the direction of arrow (b) in FIG. 75B. According to this configuration, the arc motion due to the eccentric amount δ2 between the central axes $X_{29}$ and $X_{30}$ of the crank member 29 and the circular hole 30 and the arc motion due to the eccentric amount δ1 between the central axes $X_{26}$ and $X_{27}$ of the base portion 26 and the support shaft portion are offset. As a result, the support shaft portion moves linearly.

Similarly, according to the first configuration in the related art shown in FIG. 70 and the second configuration in the related art shown in FIGS. 71 to 75, the contact between the outsides of the power rollers 8 and the discs 1, 1a, 1b, 6 is appropriately maintained regardless of the amount of elastic deformation of the members by moving the power rollers 8, 8a axially of the discs 1, 1a, 1b, 6. In any configuration, however, the structure for moving axially the power rollers 8 is complicated, so that manufacturing and managing, and assembling of parts are complicated and the cost increases accordingly. According to the configuration disclosed in JP-A-2003-294099, a direct-operated rolling bearing is disposed between the inner surface of a trunnion and an outer ring of a thrust ball bearing for rotatably supporting a power roller, so that each disc of the power roller is allowed to move axially. However, the above problems appear in the configuration disclosed in JP-A-2003-294099.

SUMMARY OF THE INVENTION

In consideration of the above problems, it is an object of the invention to achieve a simple configuration with low cost that can appropriately maintain contact between the outer surface of power rollers and discs regardless of the amount of elastic deformation by moving the power rollers in axial direction of the discs.

According to a first aspect of the invention, there is provided a toroidal continuously variable transmission including:

at least a pair of discs that are relatively rotatably supported and concentrically arranged so that axially side surfaces thereof oppose each other;

a plurality of trunnions that are disposed at a plurality of positions between the axially side surfaces of the discs along circumference of the discs; and a plurality of power rollers, each of which is rotatably supported by a thrust rolling bearing on an inner surface of the trunnion, and has a spherical convex surface contacting with the axially side surface of the disc, wherein the trunnion includes:

a pair of tilt rotary shafts that are eccentrically arranged at both ends thereof so as to be deviated from a central axis of the disc, the trunnion being swingable about the tilt rotary shaft; and a supporting beam which is formed between the tilt rotary shafts, and includes a cylindrical convex surface, of which central axis is parallel with the central axes of the tilt rotary shafts and positioned radially outside of the central axes of the tilt rotary shafts, and is formed on at least an inner surface thereof in radial direction of the discs, the thrust rolling bearing disposed between the support beam and an outer surface of the power roller includes:

an outer ring which is provided on a support beam side and includes a partially cylindrical recess on an outer side thereof; and a plurality of rolling elements rollably disposed between an outer ring raceway formed on an inner surface of the outer ring and an inner ring raceway formed on the outer surface of the power roller, and the outer ring is supported on the trunnion so as to be swingable about the support beam in an axial direction of the disc by engaging the partially cylindrical recess of the outer ring with the cylindrical convex surface of the support beam.

According to a second aspect of the invention, as set forth in the first aspect of the invention, it is preferable that a support shaft is fixed on a center of the inner surface of the outer ring, and the power roller is rotatably supported around the support shaft through a radial rolling bearing.

According to a third aspect of the invention, as set forth in the second aspect of the invention, it is preferable that a downstream oil passage is formed inside the outer ring and the support shaft so as to supply lubricant to the thrust rolling bearing and the radial rolling bearing, and an upstream oil passage connected to the downstream oil passage is formed inside the support beam.

According to a fourth aspect of the invention, as set forth in the third aspect of the invention, it is preferable that an oil pipe connected to the upstream oil passage is provided outside the support beam.

According to a fifth aspect of the invention, as set forth in the first aspect of the invention, it is preferable that on the inner surface of the trunnion, a pair of stepped faces opposing each other are formed at connecting portions between both ends of the support beam and the tilt rotary shafts, respectively, and the outer ring is disposed between the stepped faces such that either of the stepped faces supports traction force applied to the outer ring from the power roller.

According to a sixth aspect of the invention, as set forth in the fifth aspect of the invention, it is preferable that a secondary thrust bearing is provided between an outer surface of the outer ring and the stepped face so as to bear traction force and reduce load required to swing the outer ring relative to the support beam.

According to a seventh aspect of the invention, as set forth in the first aspect of the invention, it is preferable that on the inner surface of the trunnion, a pair of stepped faces opposing each other are formed at connecting portions of both ends of the support beam and the tilt rotary shafts, respectively, in such a manner that distance between the stepped faces is larger than an outer diameter of the outer ring, a traction force transmitting mechanism is provided between the outer ring and the trunnion, and the traction force transmitting mechanism transmits axial traction force of the outer ring applied to the outer ring from the outer ring so that the axial traction force is supported without contacting the outer peripheral of the outer ring with the stepped face.

According to an eighth aspect of the invention, as set forth in the seventh aspect of the invention, it is preferable that the traction force transmitting mechanism includes:

an inner recessed groove that is circumferentially formed on an inner surface of a recess formed on the outer surface of the outer ring;

an outer recessed groove that is formed on the cylindrical convex surface of the support beam along with the inner recessed groove; and a transmission member crossed over the inner recessed groove and the outer recessed groove.

According to a ninth aspect of the invention, as set forth in the eighth aspect of the invention, it is preferable that cross-sections of the inner and outer recessed grooves of the traction force transmission mechanism are rectangle, the transmission member is a partially arc shaped engaging piece, both axial end faces of the transmission member are flat faces parallel to each other, and the transmission member includes a recess groove on an inner peripheral face thereof for communicating lubricant therethrough.

According to a tenth aspect of the invention, as set forth in the eighth aspect of the invention, it is preferable that cross-sections of the inner and outer grooves are semicircle, and the transmission member is a plurality of steel balls.

According to an eleventh aspect of the invention, as set forth in the seventh aspect of the invention, it is preferable that the traction force transmitting mechanism includes:

a key fixed on the outer surface of the support beam so as to be protruded therefrom; and an inner recessed groove circumferentially formed on an inner surface of a recess formed on the outer surface of the outer ring, wherein the key is engaged with the inner recessed groove so as to be capable of displacing relative to the inner recessed groove.

According to a twelfth aspect of the invention, as set forth in the seventh aspect of the invention, it is preferable that the traction force transmitting mechanism includes:

a protrusion formed on an axially intermediate portion of the support beam so as to be monolithic with the support beam; and an inner recessed groove circumferentially formed on an inner surface of a recess formed on the cuter surface of the outer ring, wherein the protrusion is engaged with the inner recessed groove so as to be capable of displacing relative to the inner recessed groove.

According to a thirteenth aspect of the invention, as set forth in the seventh aspect of the invention, it is preferable that the traction force transmitting mechanism includes a strut member arranged in the trunnion so as to be parallel with the support beam, a longitudinally intermediate portion of the strut member is fixed to a part of the outer ring at a position away from the partially cylindrical recess of the outer ring, a pair of supporting surfaces are formed on a part of the trunnion at a position opposite of the power roller relative to the outer ring, and both of longitudinally end faces of the strut member are provided so as to abut or closely oppose to the pair of supporting surfaces, respectively.

According to a fourteenth aspect of the invention, as set forth in the first aspect of the invention, it is preferable that a pair of plates are provided in the trunnion so as to connects ends of the support beam with the tilt rotary shafts, respectively, the plate extends from the support beam side to the power roller side so as to beyond the inner surface of the power roller, and a strut beam is provided between ends of extended portions of the plates.

According to a fifteenth aspect of the invention, as set forth in the first aspect of the invention, it is preferable that the partial cylindrical recess of the outer ring directly contacts with the cylindrical convex surface of the support beam.

According to a sixteenth aspect of the invention, as set forth in the first aspect of the invention, it is preferable that the partial cylindrical recess of the outer ring engages with the cylindrical convex surface of the support beam through a bearing.

According to a seventeenth aspect of the invention, as set forth in the first aspect of the invention, it is preferable that a stopper is provided on a portion of an intermediate outer peripheral surface of the support beam so that when the outer ring swings at limit allowed swinging angle, a part of the outer ring abuts or engages with the stopper so as to prevent the outer ring from swinging further the allowed swinging angle.

According to an eighteenth aspect of the invention, as set forth in the first aspect of the invention, it is preferable that a first separation-preventing mechanism, which allows relative rotation between the outer ring and the power rollers and also prevents the outer ring from separating from the power rollers, is provided between the outer ring and the power roller; and a second separation-preventing mechanism, which allows the outer ring and the trunnions to swing and also prevents the outer ring from separating from the trunnions, is provided between the outer ring and the trunnion.

According to a nineteenth aspect of the invention, as set forth in the eighteenth aspect of the invention, it is preferable that the first separation-preventing mechanism includes:
a support shaft fixed on a center of an inner surface of the outer ring;
a radial roller bearing rotatably supporting the power roller around the support shaft; and
a stop ring fixed on a protruded part of an edge portion of the support shaft which is protruded relative to the inner surface of the power roller.

According to a twentieth aspect of the invention, as set forth in the eighteenth aspect of the invention, it is preferable that the second separation-preventing mechanism includes a separation-preventing bracket formed so as to stride across the support beam, and both ends of the separation-preventing bracket are fixed on the outer surface of the outer ring at positions exist both sides of the support beam.

According to a twenty-first aspect of the invention, as set forth in the twentieth aspect of the invention, it is preferable that a support shaft is fixed on a center of an inner surface of the outer ring so that the power roller is rotatably supported around the support shaft through a radial roller bearing, a downstream oil passage, which supplies lubricant to the thrust rolling bearing and the radial rolling bearing, is formed inside the support shaft and the outer ring, an upstream oil passage connected to the downstream oil passage is formed inside the support beam, an oil pipe connected to the upstream oil passage is provided outside the support beam, and a part of the separation-preventing bracket is disposed on an edge side portion of the oil pipe at a position facing a connecting portion between the oil pipe and the support beam, so that the oil pipe is prevented from moving in a direction in which the oil pipe is removed out from the connecting portion.

According to a twenty-second aspect of the invention, as set forth in the twentieth aspect of the invention, it is preferable that a stopper mechanism includes:
an engagement hole formed at the intermediate portion of the separation-preventing bracket; and
an engagement pin protrudingly formed on the support beam at a portion corresponding to the engagement hole,
wherein stopper mechanism prevents the outer ring from swinging further an allowed swinging angle by engaging the engaging pin with the engaging hole.

According to a twenty-third aspect of the invention, as set forth in the twenty-first aspect of the invention, it is preferable that a large diameter portion is formed on the separation-preventing bracket at a position facing the oil pipe so as to be positioned radially outward of the support beam relative to the other part, and a stopper mechanism prevents the outer ring from swinging further the allowed swinging angle by engaging both ends of the large diameter portion with the oil pipe.

According to a twenty-fourth aspect of the invention, as set forth in the first aspect of the invention, it is preferable that in the support beam, a portion opposite to the cylindrical convex surface in the radial direction of the disc is recessed radially inward from a virtual cylindrical surface including the cylindrical convex surface.

According to a twenty-fifth aspect of the invention, as set forth in the twenty-fourth aspect of the invention, it is preferable that wherein the portion recessed radially inward is a partial cylindrical surface that is concentrically arranged with an outer peripheral surface of the tilt rotary shaft.

According to a toroidal continuously variable transmission of the invention, a configuration in which contact between the peripheral surfaces of power rollers and discs in appropriately maintained by moving the power rollers in the axial direction of the discs regardless of change in the amount of elastic deformation of components can be achieved with low cost.

That is, when the toroidal continuously variable transmission is in operation and it is required to move the power rollers in axial direction of the discs on the basis of elastic deformation of input and output disc and the power rollers, the outer ring of the thrust rolling bearing rotatably supporting the power rollers swings by engaging a partial cylindrical recess formed on the outer surface of the outer ring with a cylindrical convex surface of the support beam. On the basis of the swing motion, in the peripheral surface of the power roller, the portion that is in rollingly contact with the axial side surface of the disc moves in axial direction of the disc, thus, the contacting state is appropriately maintained. The central axis of the cylindrical convex surface is positioned outside from the central axis of the tilt rotary shaft about which the trunnion swings in transmission operation, in the axial direction of the disc Accordingly, the swing radius about the central axis of the cylindrical convex surface is larger than the swing radius in transmission operation, which does not affect the transmission ratio between the input and output discs (negligible or easily correctable).

A machining of the recess and the cylindrical convex surface to appropriately maintain the contact is easy and specific parts are not needed. Therefore, the toroidal continuously variable transmission is simply achieved with low cost.

Further, according to the second aspect of the invention, since the power rollers are supported around the support shaft, the positioning process of the power roller in radial direction can be easily performed, thus the transmission operation of the toroidal continuously variable transmission can be stable.

Further, according to the third and fourth aspects of the invention, since the downstream and upstream oil passages and the oil pipe are provided if necessary, lubricant is effectively supplied to the thrust rolling bearing and the radial rolling bearing, thus the reliability and durability of the bearings can be efficiently ensured.

According to the fifth and sixth aspects of the invention, since one of the stepped faces can bear the traction force applied to the outer ring from the power rollers directly or through the thrust bearing, the power rollers are prevented from moving axial direction of the tilt shaft in the inner surface of the trunnion. Thus, the reliability of the transmission operation of the toroidal continuously variable transmission can be ensured.

Further, according to the seventh to thirteenth aspects of the invention, due to load applied to the power rollers from the discs, even though the support beam elastically deforms such that the power rollers are recessed, the stepped faces do not strongly push the outer ring of the thrust rolling bearing. Therefore, although the amount of elastic deformation of the support beam due to large power transmission is large, the power rollers can swing smoothly.

On the other hand, according to the fourteenth aspect of the invention, even in transmitting large power, elastic deformation of the support beam is prevented. Therefore, similar to the configurations of the seventh to thirteenth aspects of the invention, the stepped faces do not strongly push the outer ring of the thrust rolling bearing and the power rollers can swing smoothly.

Further, in an embodiment of the invention, according to the fifteenth aspect of the invention, since the recess is in direct contact with the cylindrical convex surface, the configuration is simplified with low cost. Further, according to the sixteenth aspect, because the engagement is achieved by the bearing, the outer ring can swing more smoothly.

Further, according to the seventeenth aspect of the invention, since the stopper is provided, the outer ring is prevented from excessively swinging in respect to the trunnions and further, when assembling, positioning operation of the outer ring can be performed easily and efficiency of the assembling operation can be improved.

Further, according to the eighteenth aspect of the invention, since the first and second separation-preventing mechanisms are provided, the trunnions, thrust rolling bearings, and power rollers are not unintentionally separated even before they are positioned between the input and output discs, which makes the assembling operation of the toroidal continuously variable transmission efficient.

The first and second separation-preventing mechanisms can be simply achieved according to the nineteenth and twentieth aspects of the invention.

Further, according to the twenty first aspect of the invention, since the separation-preventing bracket is prevented from moving in a direction in which the oil pipe is removed out from the connection portion, a specific part for retaining the oil pipe is not needed. Accordingly, lubricant can be reliably supplied to the thrust rolling bearing and the radial rolling bearing with low cost.

Further, according to the twenty second and third aspects of the invention, making the stopper mechanism that prevents the outer ring from swinging further a predetermined allowed swinging angle by employing the separation preventing bracket, the assembling process of the toroidal continuously variable transmission becomes efficient with low cost.

Further, according to the twenty fourth aspect of the invention, while the size of the disc in the radial direction is not increased, the swing radius of the power roller about the tilt rotary shaft is ensured. Further, according to the twenty fifth aspect of the invention, it is easy to form the recessed portion.

DETAILED DESCRIPTION OF EXEMPLARY EMBODIMENTS OF THE INVENTION EMBODIMENTS

First Embodiment

Figure 70:
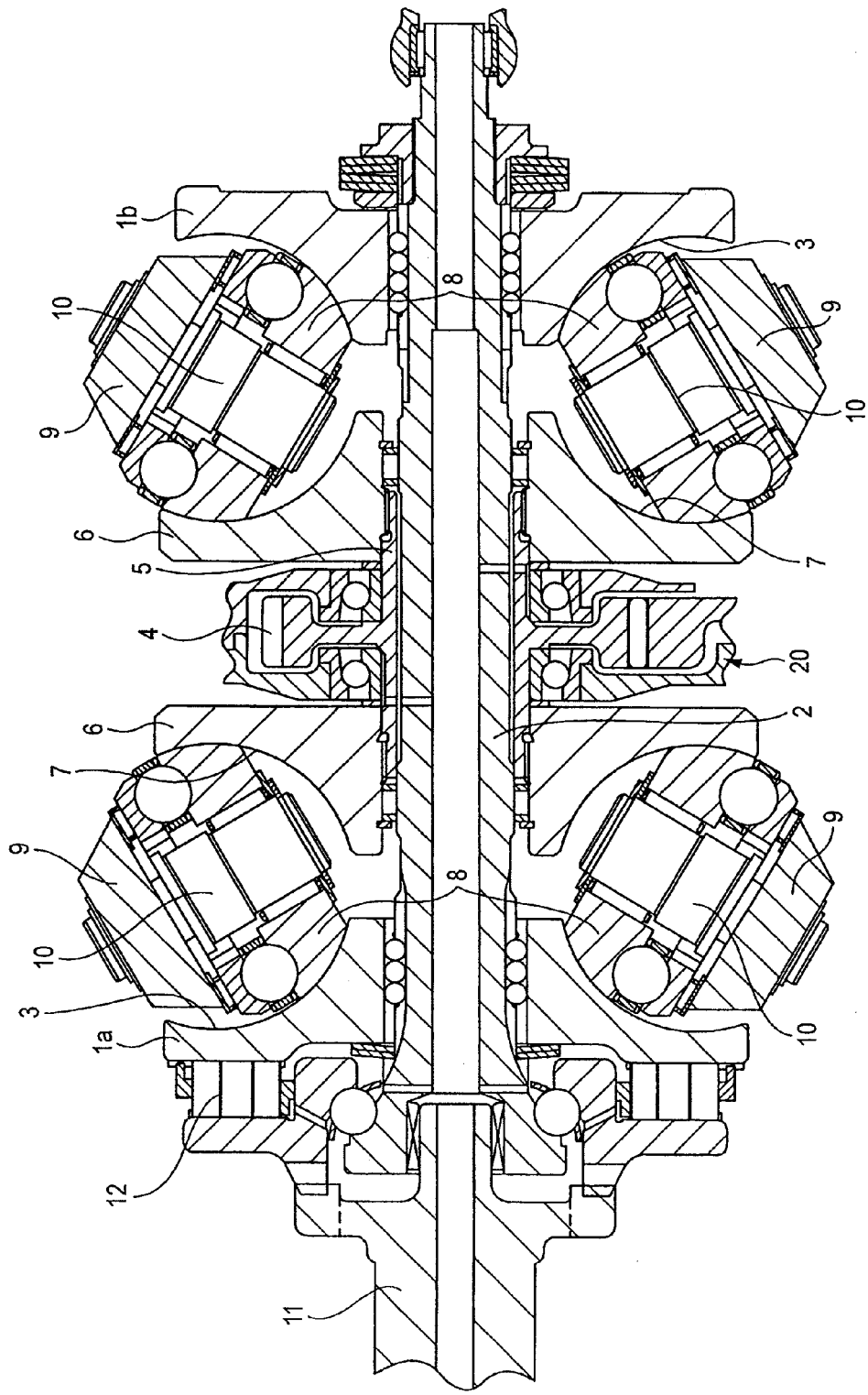
FIG. 70 is a cross-sectional view illustrating a first configuration of the related art.
Figure 71:
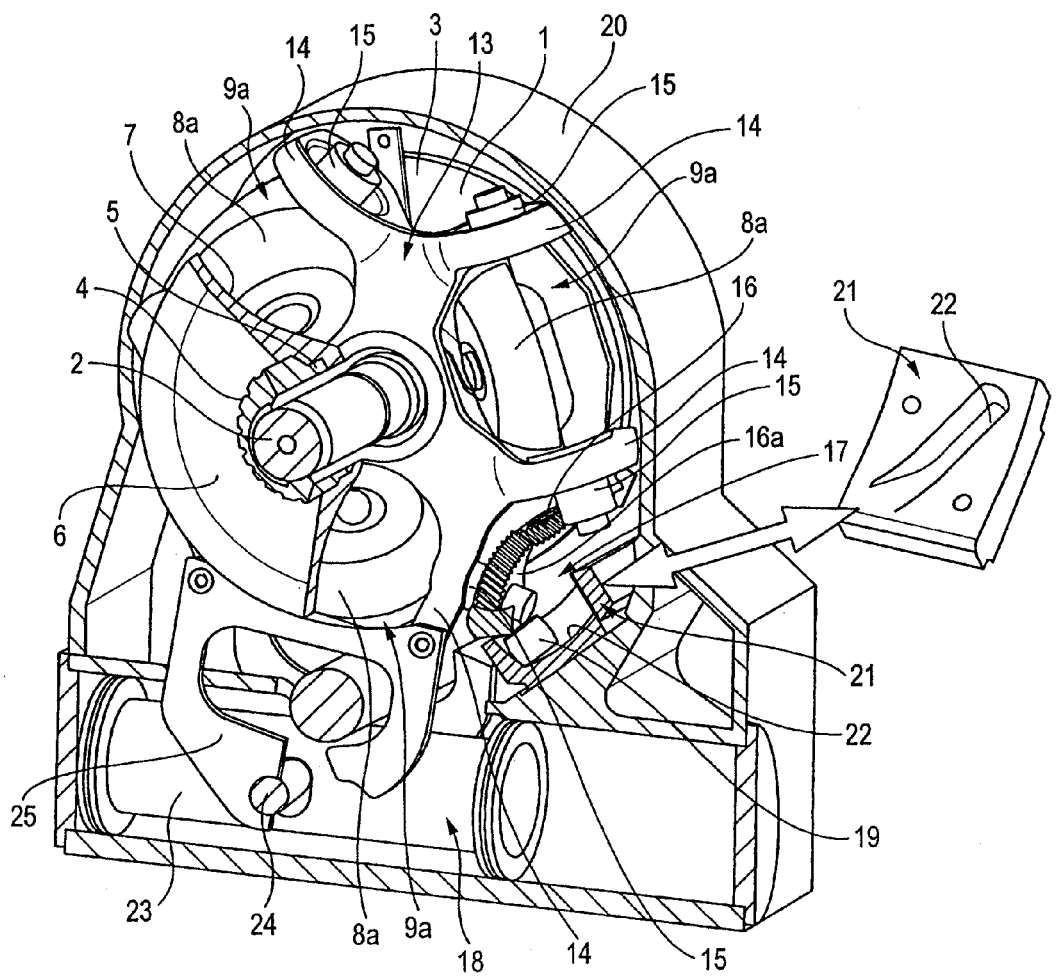
FIG. 71 is a perspective view illustrating the main parts of a second configuration of the related art.
Figure 72:
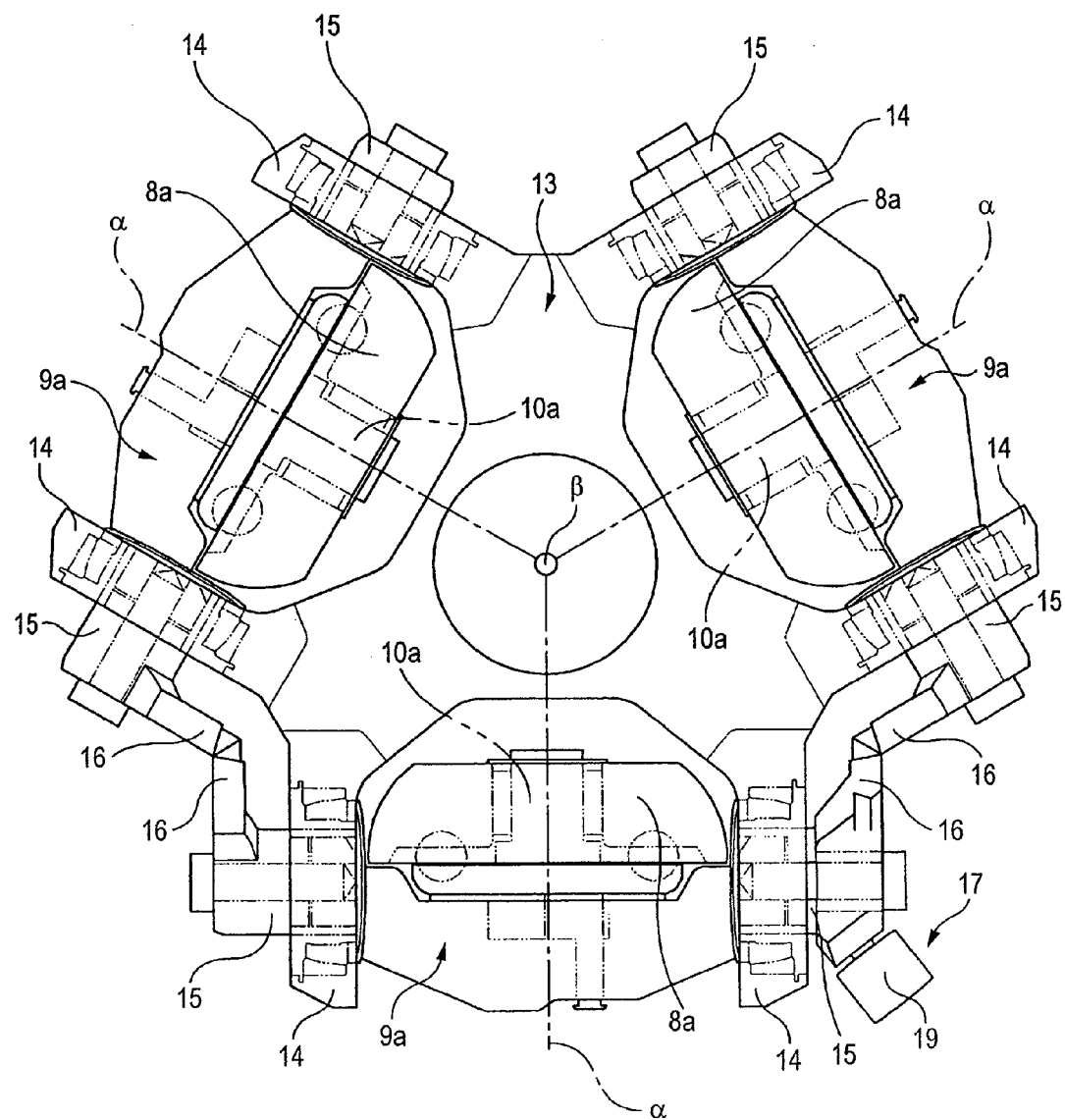
FIG. 72 is a view of a part separated from FIG. 71, seen axially of each disc.
Figure 73:
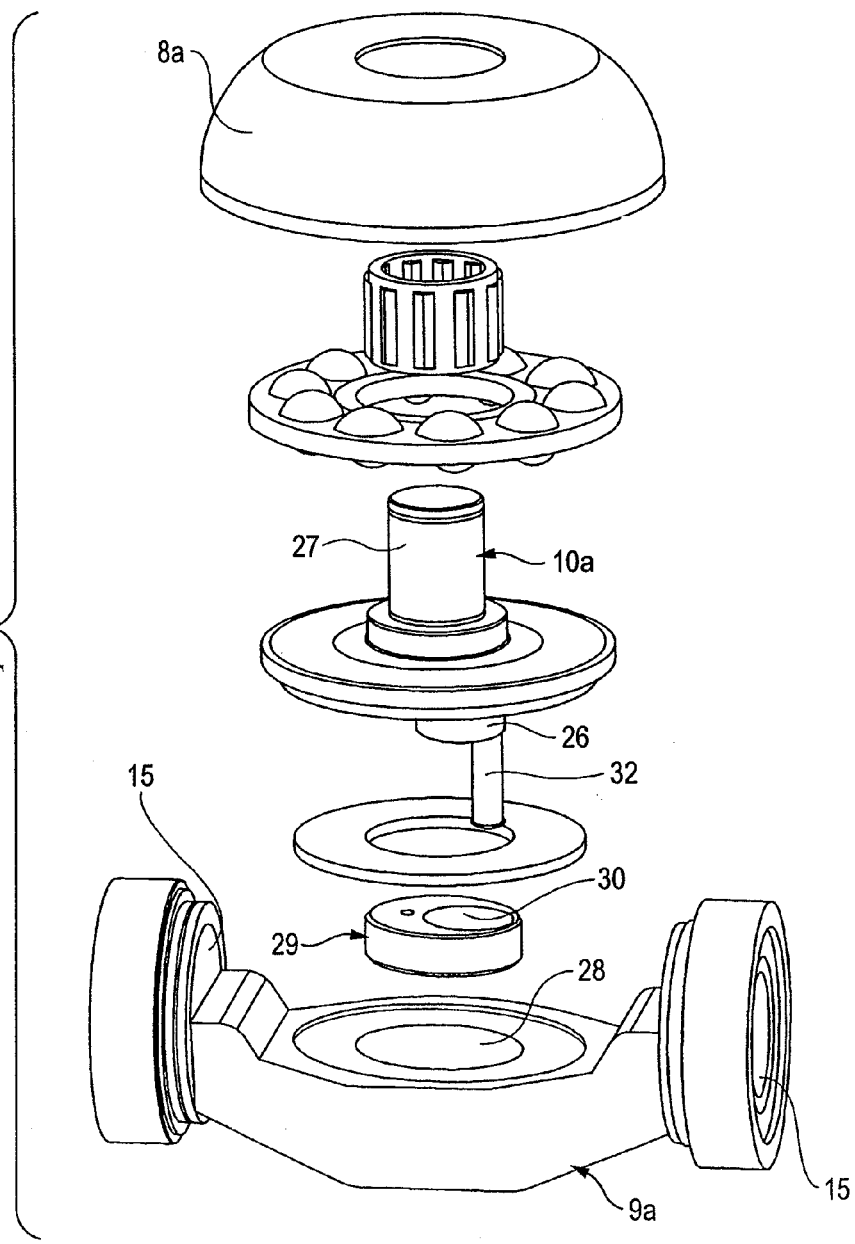
FIG. 73 is an exploded perspective view illustrating a trunnion and power roller separated.
Figure 74B:
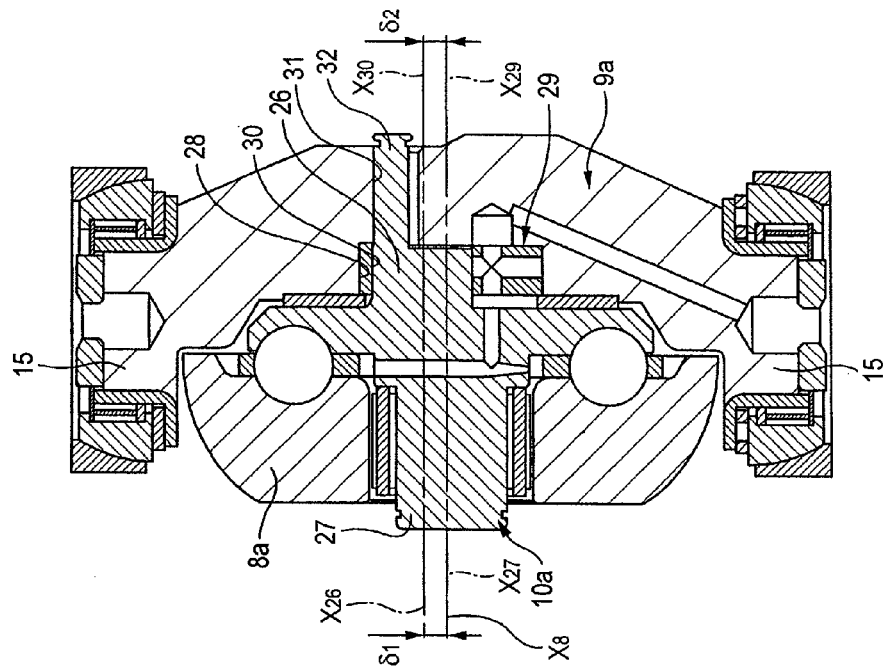
FIG. 74B is a cross-sectional view of trunnion in assembly.
Figure 74A:
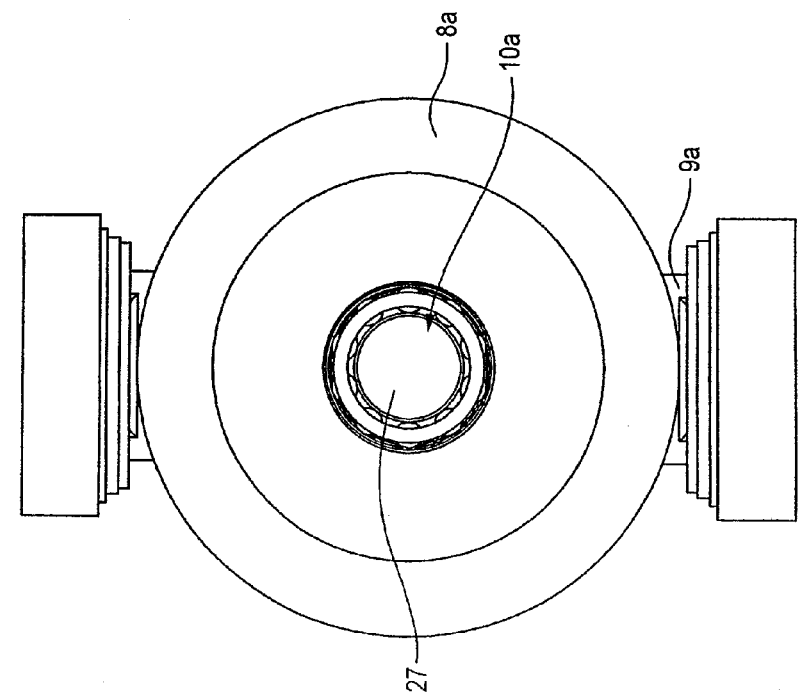
FIG. 74A is a view seen from the inside of a trunnion in assembly.
Figure 75A:
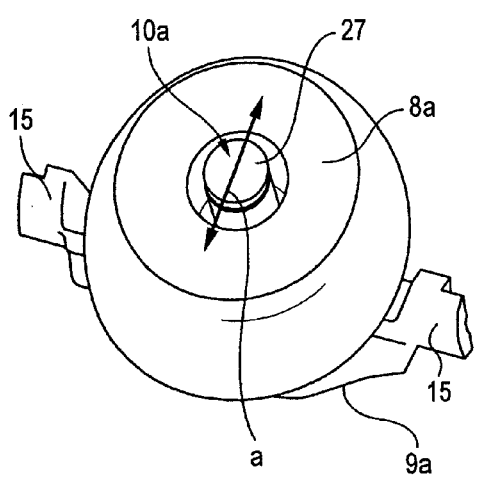
FIG. 75A is a perspective view seen from inside of a trunnion in assembly.
Figure 75B:
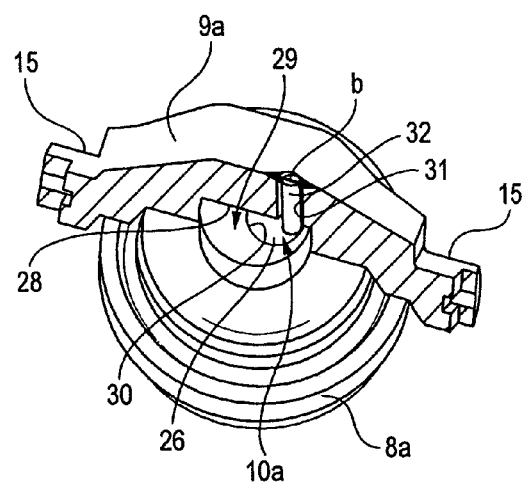
FIG. 75B is a perspective view of the trunnion with a portion cut off, seen from outside, in assembly.

FIGS. 1 to 6 show a first embodiment of the invention that corresponds to the first to fifth, and fifteenth aspects of the invention. Including this embodiment, one of features of the present invention is a structure which supports a power roller 8b on a trunnion 9b so as to be capable of displacing in axial direction of input and output discs 1a, 1b, 6 (see FIG. 70). The entire structure and operation of the toroidal continuously variable transmission are the same as those known in the related art including those shown in FIGS. 70 to 72. The same parts as in the related art are simply or not described and the parts characterized in this example will be mainly described hereafter.

The trunnion 9b of a toroidal continuously variable transmission of the invention has a pair of tilt rotary shafts 15, 15 concentrically arranged each other at both ends. Further, the trunnion 9b has a support beam 34 which is disposed between the tilt rotary shafts 15, 15 and has a cylindrical convex surface 33 formed on at least an inner surface in a inward radial direction of the input and output discs 1a, 1b, 6 (upsides in FIGS. 2 and 4 to 6). The tilt rotary shafts 15, 15 are swingably supported on a yoke (not shown) or support plates 14, 14 (see FIGS. 71 and 72) of a swing frame 13 through radial needle bearings 35, 35. The central axis I of the cylindrical convex surface 33 is parallel with the central axes II of the tilt rotary shafts 15, 15, and is positioned radially outside of the discs 1a, 1b, 6 (downside in FIGS. 2, 4, 5, and 6) from the tilt rotary shafts 15, 15.

A thrust ball bearing 36 has an outer ring 37 and is provided between the support beam 34 and the outer surface of the power roller 8b. A partial cylindrical recess 38 is formed on the outer surface of the outer ring 37 so as to across over the outer surface of the outer ring 37 in radial direction. That is, the partial cylindrical recess 38 is formed so as to be cutout the outer surface of the outer ring 37 in axial direction of the tilt rotary shaft. The outer ring 37 is swingably supported in axial direction of the discs with respect to the trunnion 9b by engagement of the cylindrical convex surface 33 of the support beam with the recess 38. That is, the outer ring 37 is swingable around the axial direction of the support beam 34. Further, according to the first embodiment, because the radius of curvature r38 of the recess 38 is set to be the same as the radius of curvature r33 of the cylindrical convex surface 33 in the cross-section (FIG. 6), the cylindrical convex surface 33 is in direct contact with the recess 38.

According to the first embodiment, a support shaft 10b is monolithically fixed to a center of an inner surface of the outer ring 37 and the power roller 8b is rotatably supported around the support shaft 10b through a radial needle bearing 39. A downstream oil passage 40 for supplying lubricant to the thrust ball bearing 36 and the radial needle bearing 39 is formed inside the outer ring 37 and the support shaft 10b and an upstream oil passage 41 connected to the downstream oil passage 40 is formed inside the support beam 34. A recess 42 that is elongated in the swing direction of the outer ring 37 is formed at a portion surrounding an opening at the upstream end of the downstream oil passage 40 on the outer surface of the outer ring 37 and oil passages 40, 41 is connected regardless of swinging of the outer ring 37. An oil pipe 43 connected to the upstream oil passage 41 is provided outside the support beam 34. The upstream end of the oil pipe 43 is connected to the end of the trunnion 9b, is opened to radial inner side of a pulley 44 to wind a synchronous cable, and allows a lubricant to be supplied through the radial inner side of the pulley 44.

Further, according to the first embodiment, on an inner surface of the trunnion 9b, a pair of stepped faces 45, 45 facing each other are formed at a connection portion of a pair of tilt rotary shafts 15, 15 and both ends of the support beam 34. The distance between the stepped faces 45 are larger only a very little than the outer radius of the outer ring 37 (e.g. several tens of μm). Accordingly, in contacting the recess 38 with the cylindrical convex surfaces 33, the outer surface of the outer ring 37 is in contact with or faces closely to the stepped faces 45. Specifically, the outer ring 37 is disposed between the stepped faces 45 such that the stepped faces 45 bear the traction force applied to the outer ring from the power roller 8b.

According to the toroidal continuously variable transmission having the above configuration, it is possible to simply achieve a configuration that can appropriately maintain the contact between the discs 1a, 1b, 6 and the outer surface of the power roller 8b regardless of the amount of elastic deformation of the members by moving the power roller 8b axially of the discs 1a, 1b, 6 with low cost.

Specifically, when the toroidal continuously variable transmission is in operation and it is required to move the power roller 8b in axial direction of the input and output discs 1a, 1b, 6 on the basis of elastic deformation of the discs 1a, 1b, 6 and the power roller 8b, the outer ring 37 of the thrust ball bearing 36 rotatably supporting the power roller 8b swings about the central axis I of the cylindrical convex surfaces 33, while sliding the contact surface between the partial cylindrical recess formed on the outer surface and the cylindrical convex surfaces 33 of the support beam 34. According to the swing displacement, a portion of the peripheral surface of the power roller 8b, which rolling contacts with the axial side surface of the discs 1a, 1b, 6 is moved in the axial direction of the discs 1a, 1b, 6, thus, the contact state is appropriately maintained. As described above, the central axis I of the cylindrical convex surfaces 33 is positioned radially outside of the discs 1a, 1b, 6 from the central axis II of the tilt rotary shafts 15 about which the trunnion 9b rotates in transmission operation. Accordingly, the swing radius about the engaging portion is larger than the swing radius in transmission operation and has little effect on changes in transmission ratio between the input discs 1a, 1b and the output disc 6 (in the range of negligible or easily correcting amount).

Machining of the recess 38 and cylindrical convex surfaces 33 that is needed to appropriately maintain the contact is easy without specific parts. Therefore, the toroidal continuously variable transmission is achieved simply with low cost.

Further, according to the first embodiment, since the power roller 8b is supported around the support shaft 10b, the positioning operation of the power rollers 8b in radial direction can be performed easily and surely. Thus, the transmission operation of the toroidal continuously variable transmission can be performed reliably.

Further, according to the first embodiment, since the lubricant is efficiently supplied to the thrust ball bearing 36 and the radial needle bearing 39 through the downstream and upstream oil passages 40, 41 and the oil pipe 43, it is possible to sufficiently ensure the reliability and durability of the bearings 36, 39.

Furthermore, according to the first embodiment, since the stepped faces 45 bear the traction force applied to the outer ring 37 from the power roller 8b, the power roller 8b is surely prevented from moving axial direction of the tilt rotary shafts 15 within the trunnion 9b, thus, the transmission operation of the toroidal continuously variable transmission can be stabled.

Second Embodiment

Figure 1:
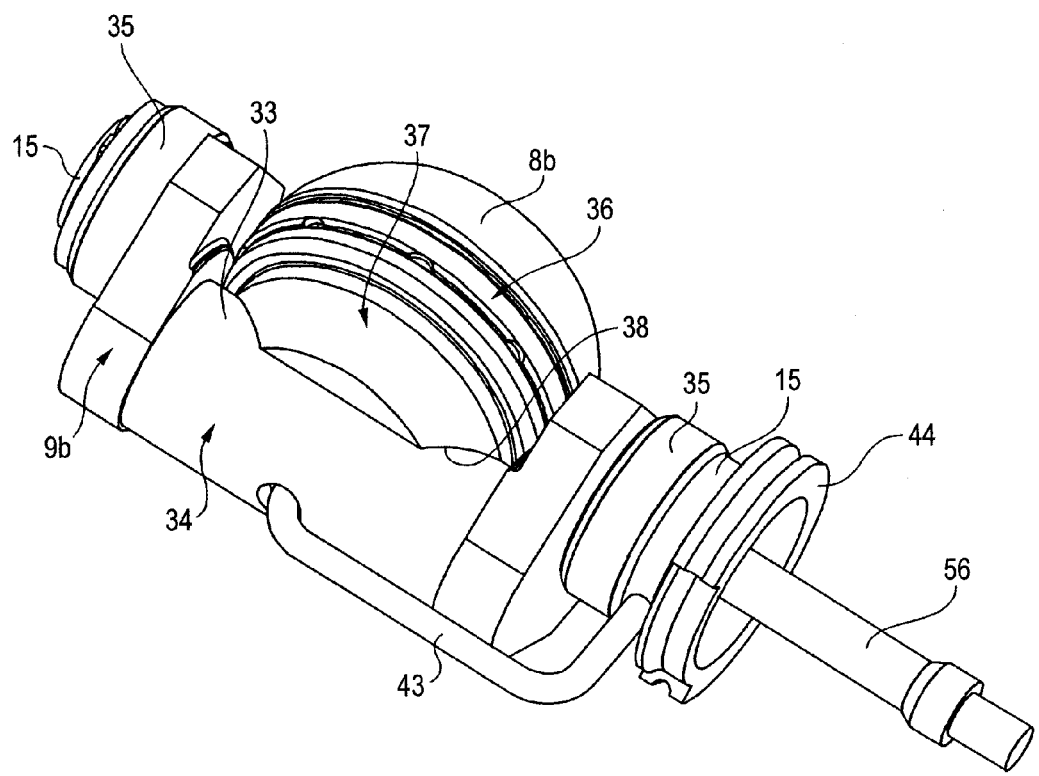
FIG. 1 is a perspective view showing the main parts according to a first embodiment of the invention.
Figure 2:
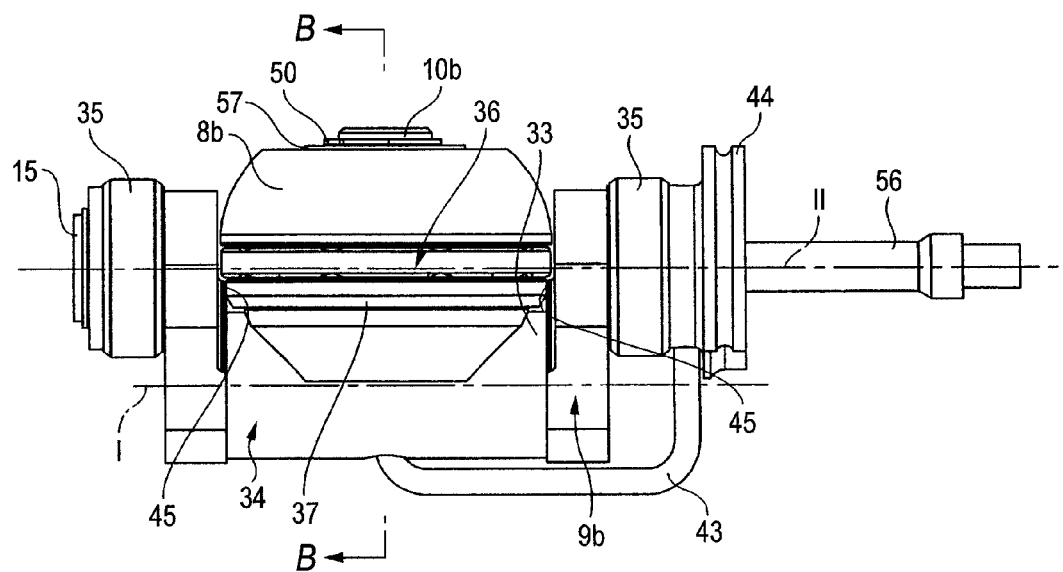
FIG. 2 is a front view of FIG. 1.
Figure 3:
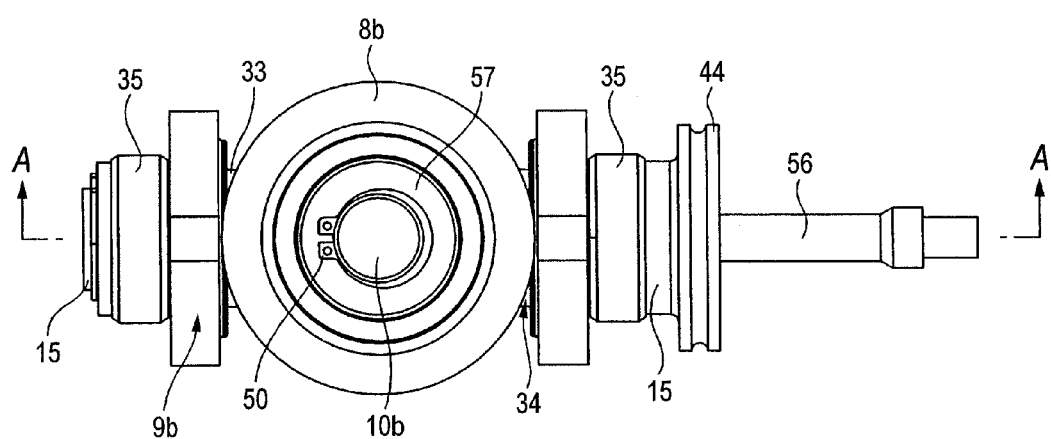
FIG. 3 is a plan view of FIG. 2.
Figure 4:
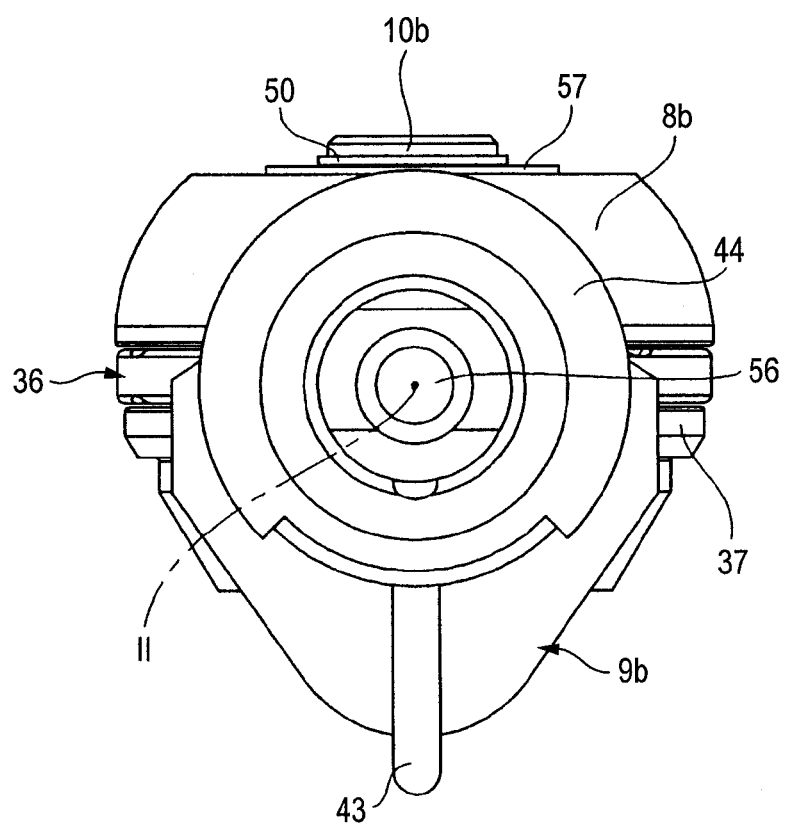
FIG. 4 is a right-sided view of FIG. 2.
Figure 5:
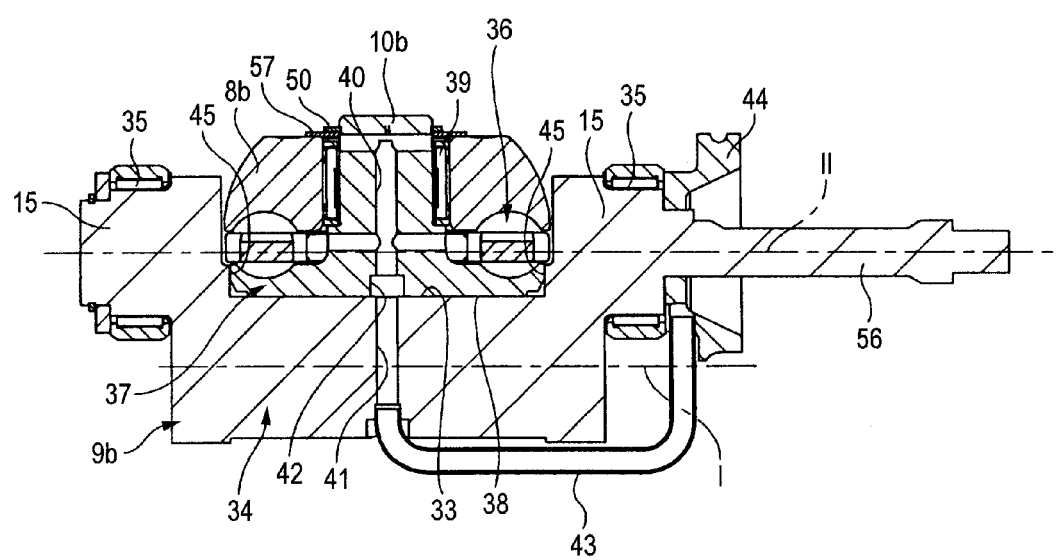
FIG. 5 is a cross-sectional view taken along the line A-A of FIG. 3.
Figure 6:
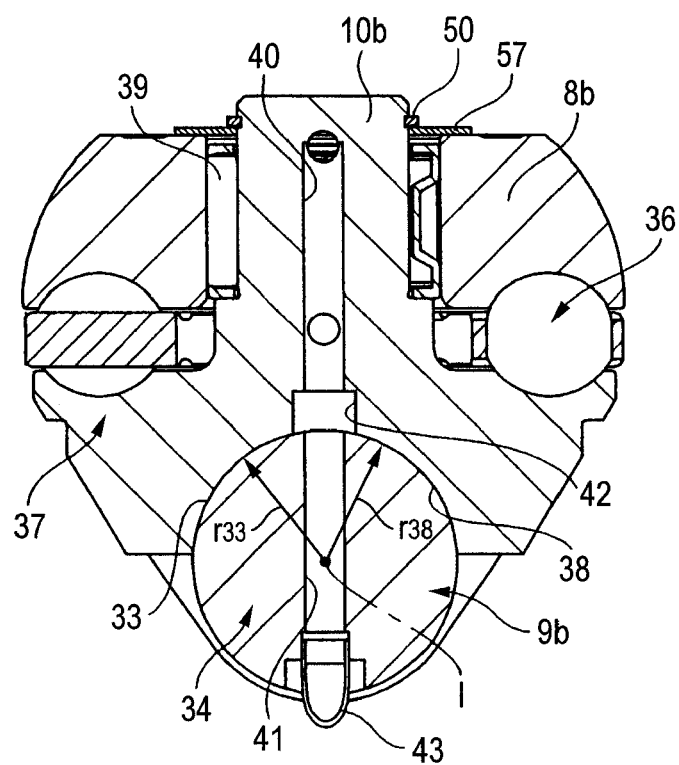
FIG. 6 is a cross-sectional view taken along the line B-B of FIG. 2.
Figure 7:
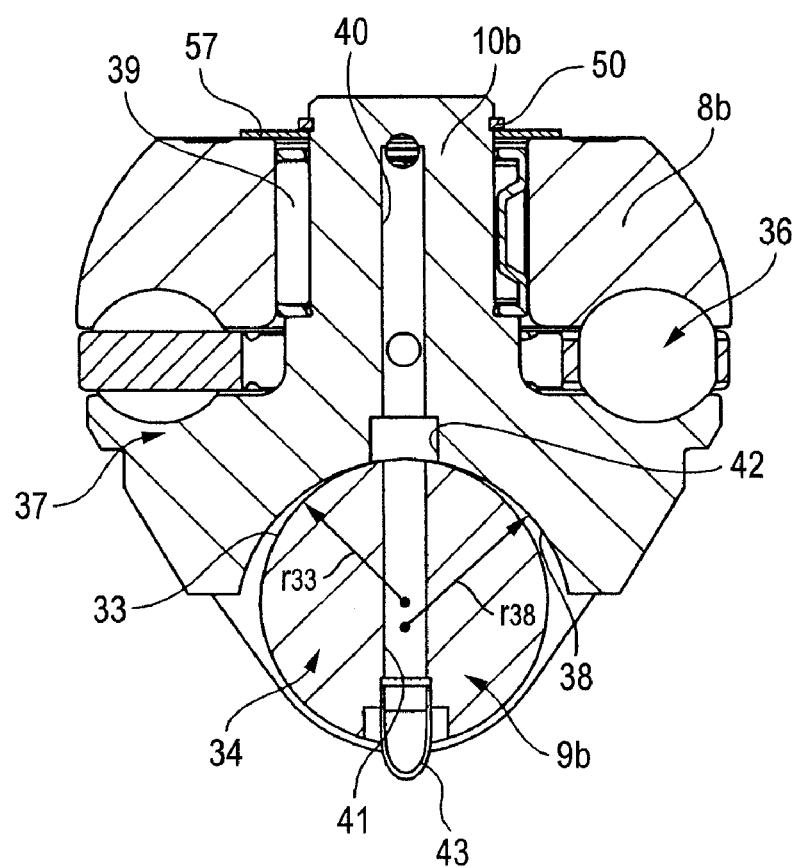
FIG. 7 is a cross-sectional view according to a second embodiment of the invention, similar to FIG. 6.
Figure 8:
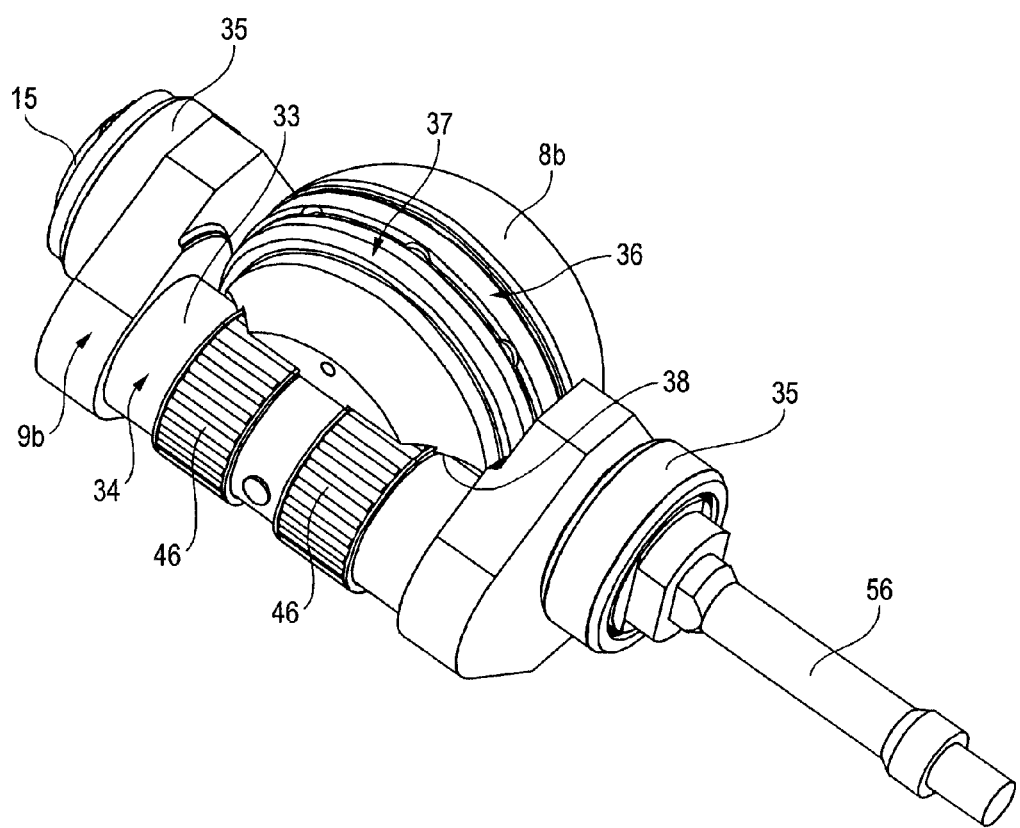
FIG. 8 is a perspective view of the main parts according to a third embodiment of the invention.
Figure 9:
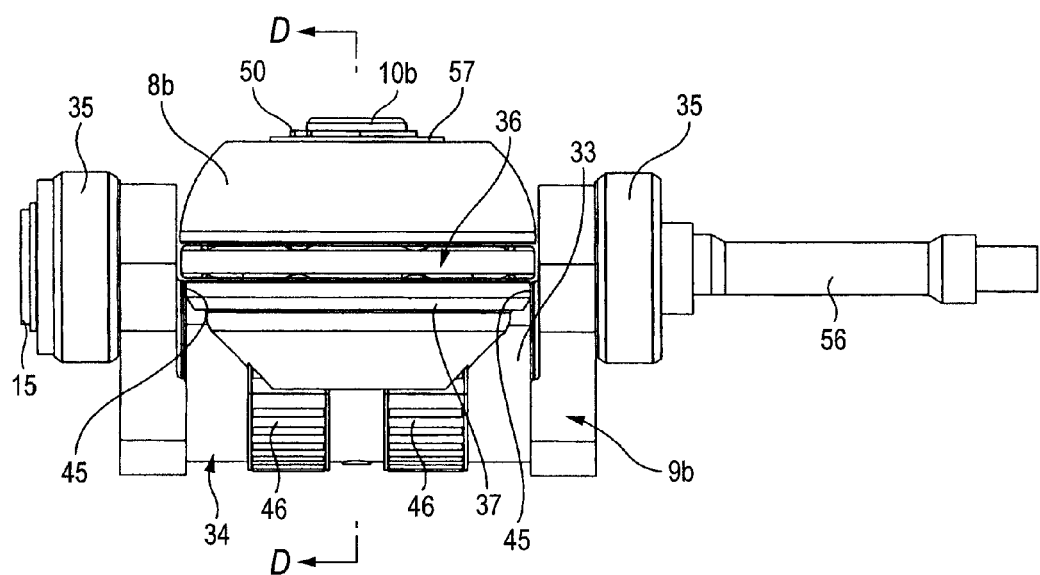
FIG. 9 is a front view of FIG. 8.
Figure 10:
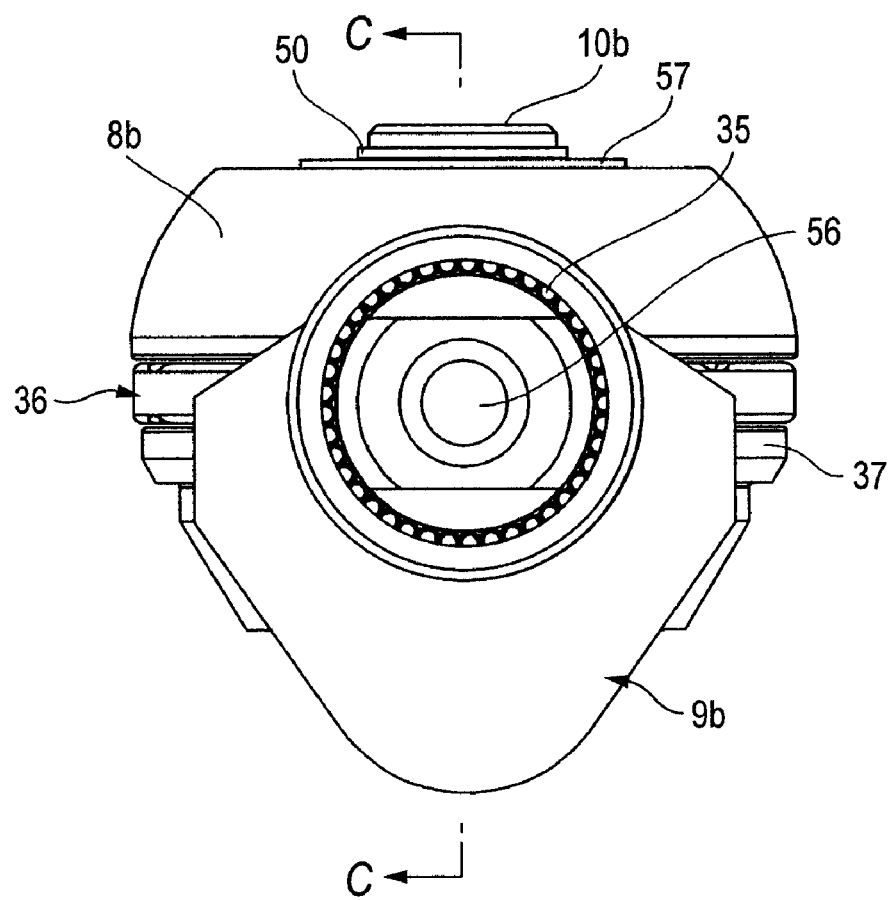
FIG. 10 is a right-sided view of FIG. 9.
Figure 11:
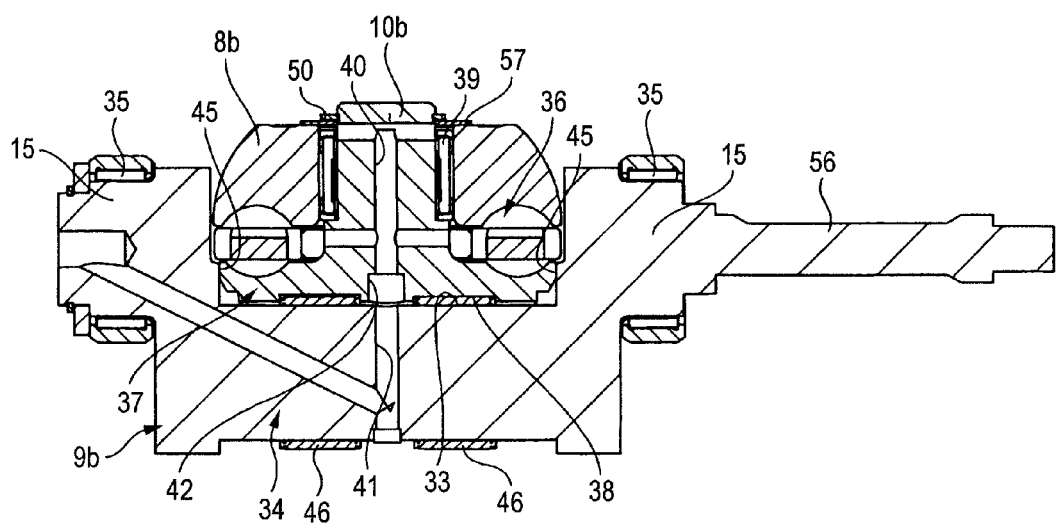
FIG. 11 is a cross-sectional view taken along the line C-C of FIG. 10.
Figure 12:
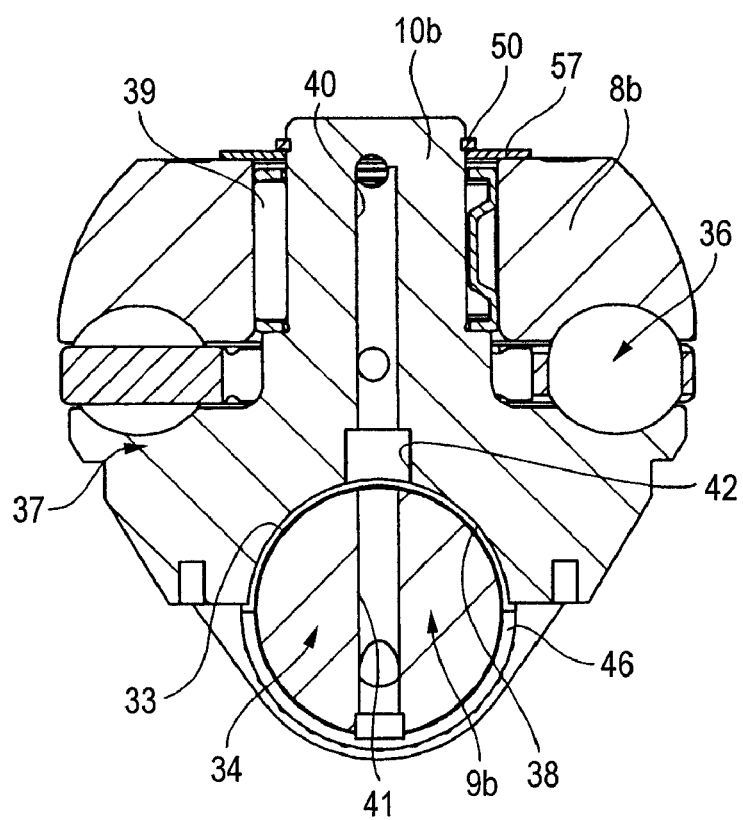
FIG. 12 is a cross-sectional view taken along the line D-D of FIG. 9.
Figure 13:
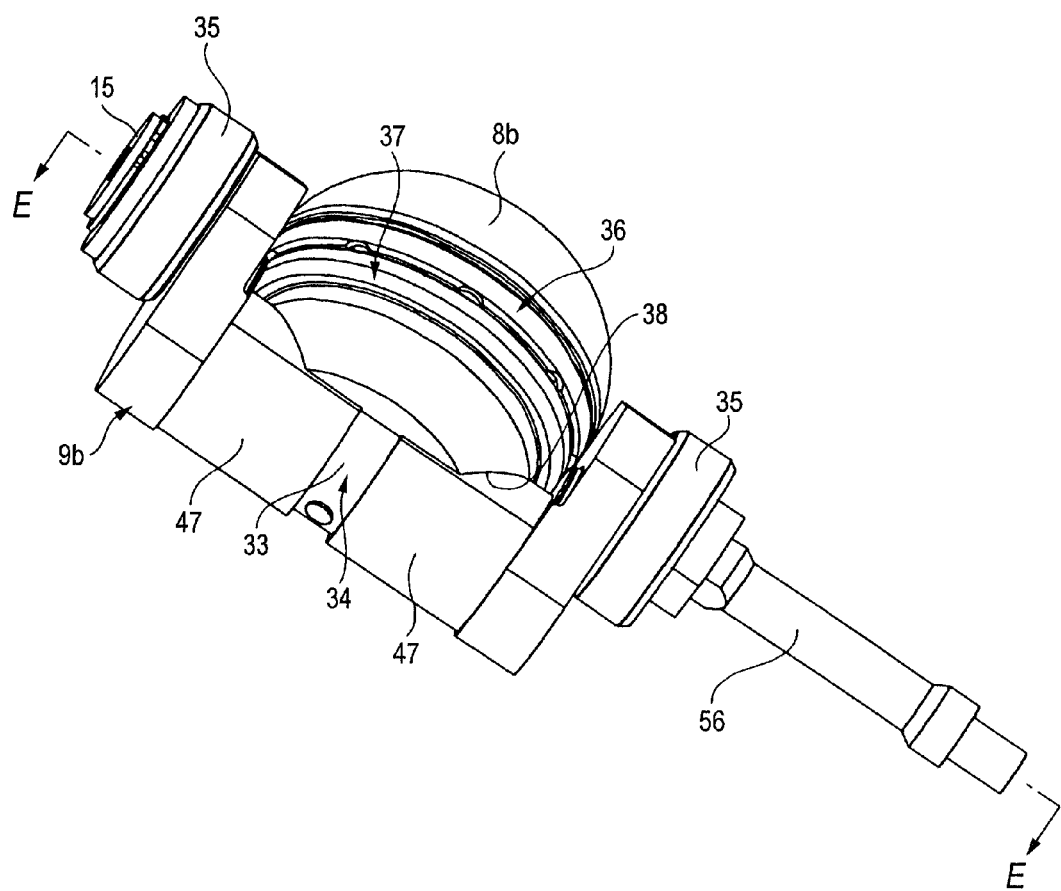
FIG. 13 is a perspective view of the main parts according to a fourth embodiment of the invention.
Figure 14:
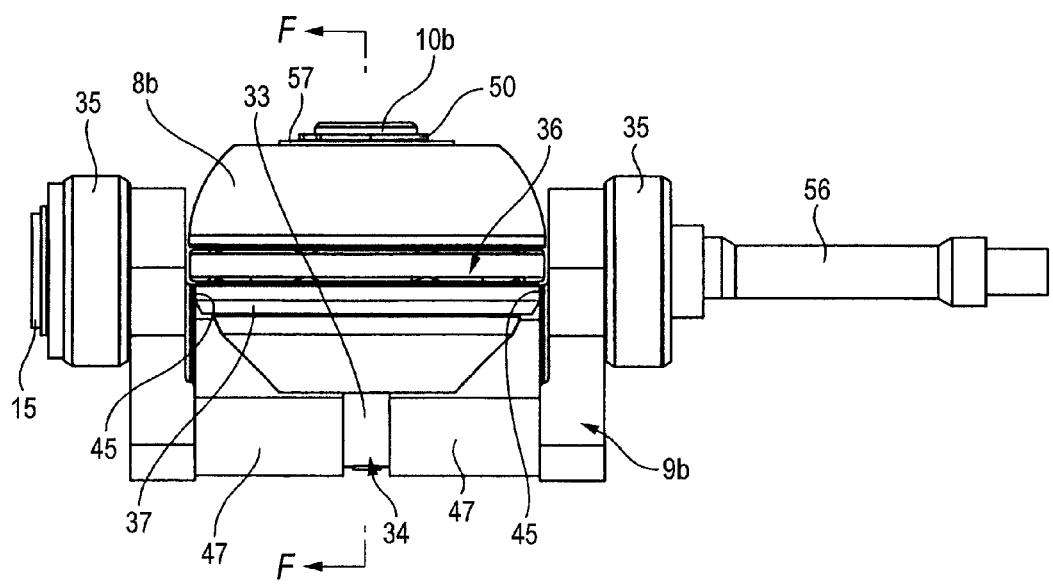
FIG. 14 is a front view of FIG. 13.
Figure 15:
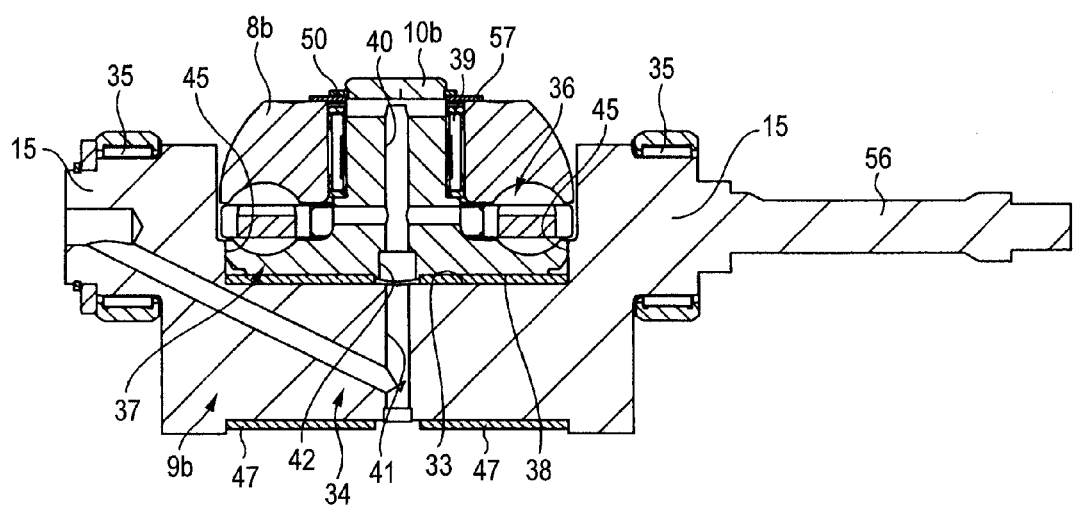
FIG. 15 is a cross-sectional view taken along the line E-E of FIG. 13.
Figure 16:
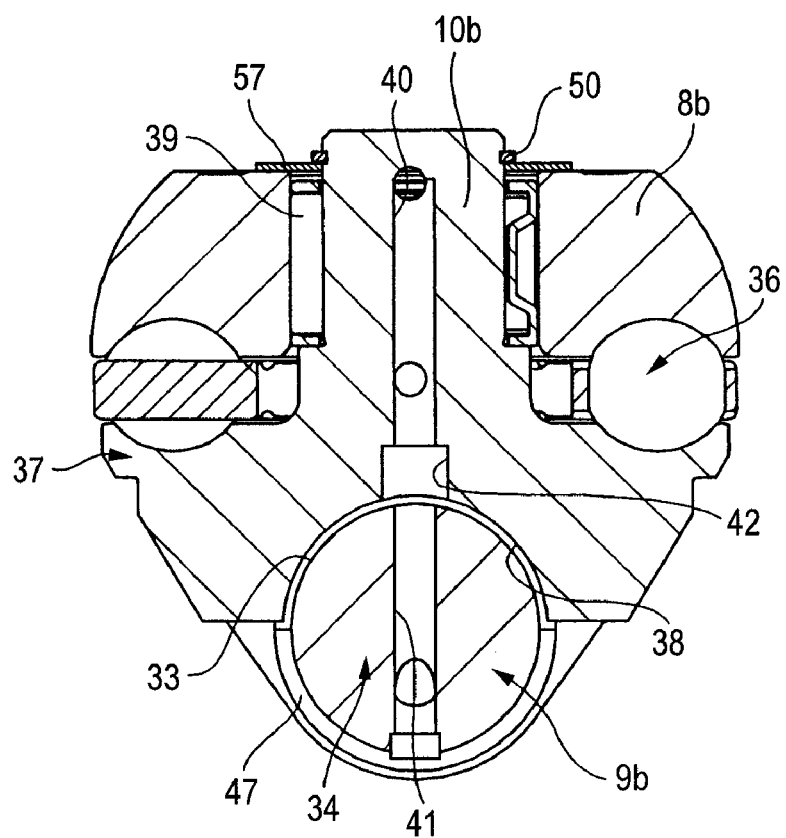
FIG. 16 is a cross-sectional view taken along the line F-F of FIG. 14.
Figure 17:
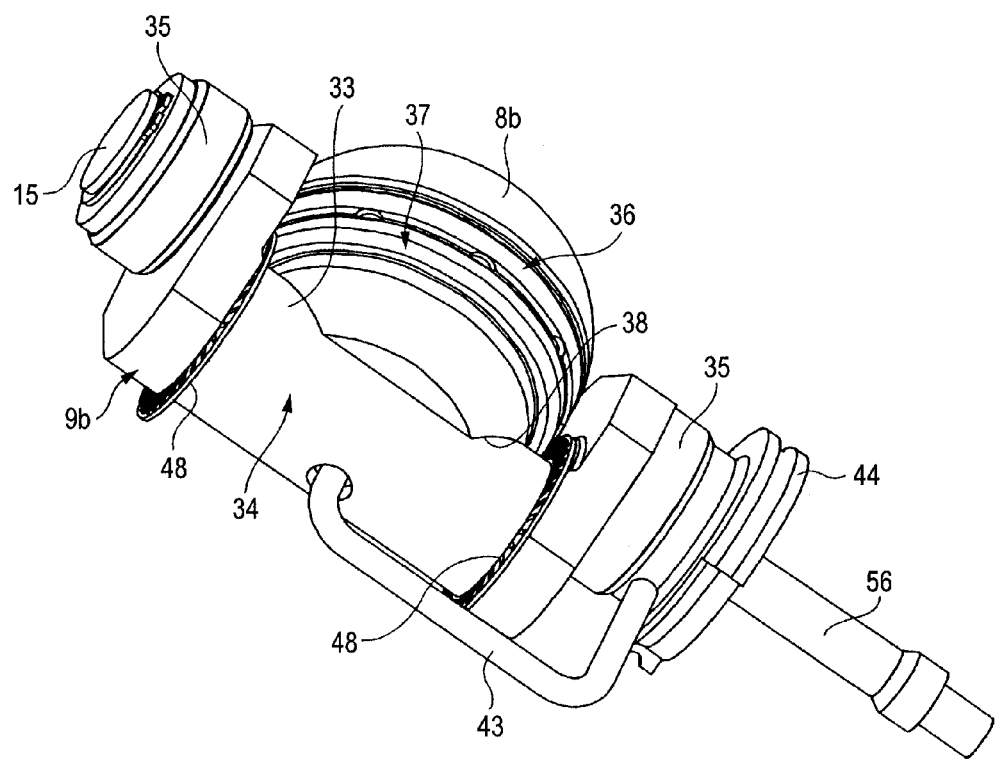
FIG. 17 is a perspective view of the main parts according to a fifth embodiment of the invention.
Figure 18:
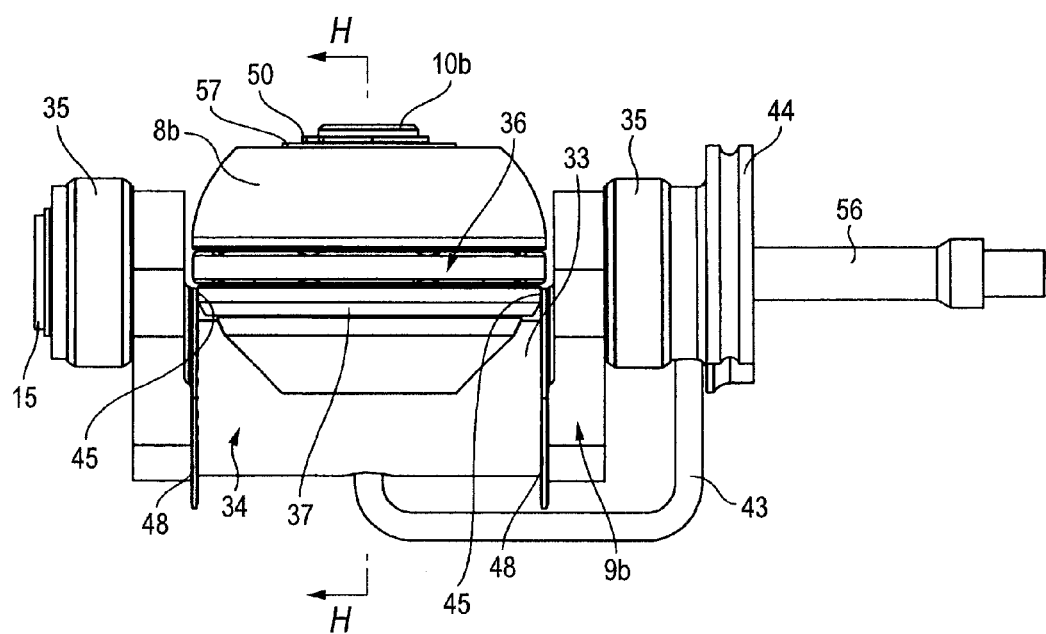
FIG. 18 is a front view of FIG. 17.
Figure 19:
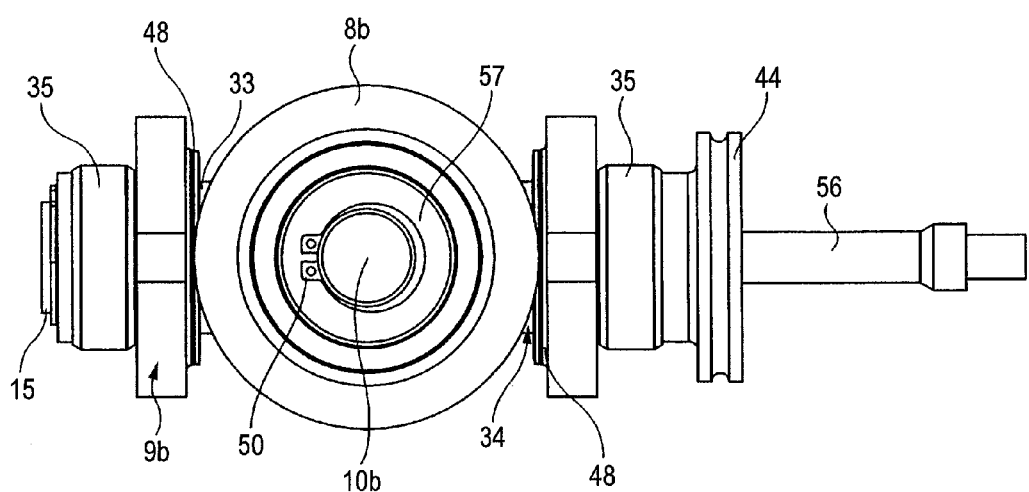
FIG. 19 is a plan view of FIG. 18.
Figure 20:
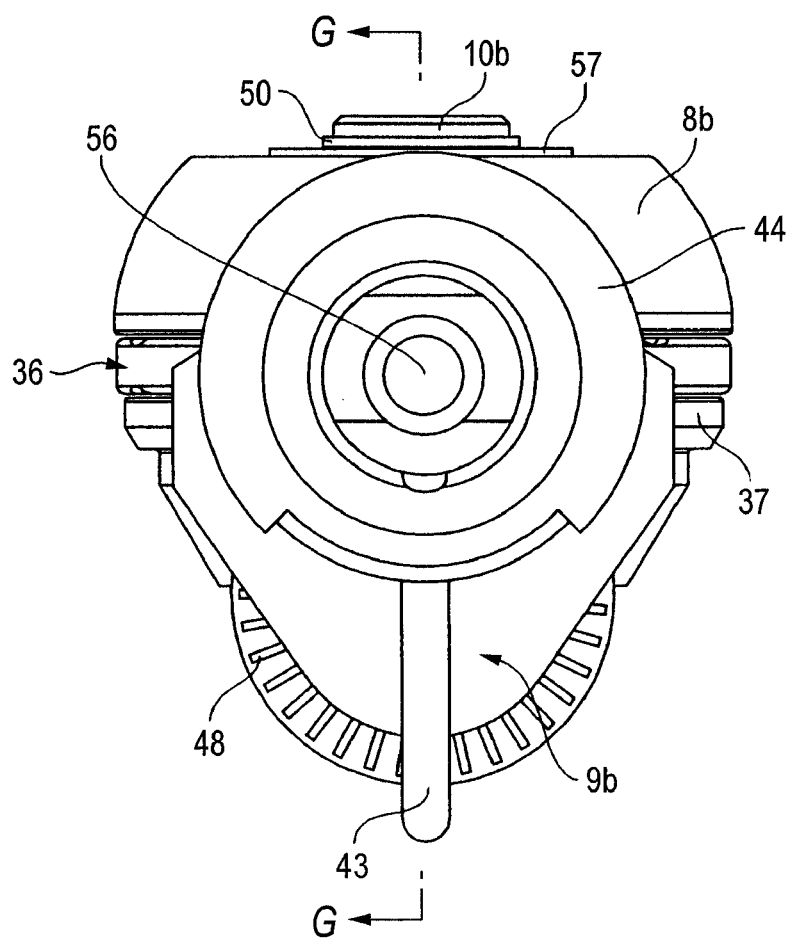
FIG. 20 is a right-sided view of FIG. 18.
Figure 21:
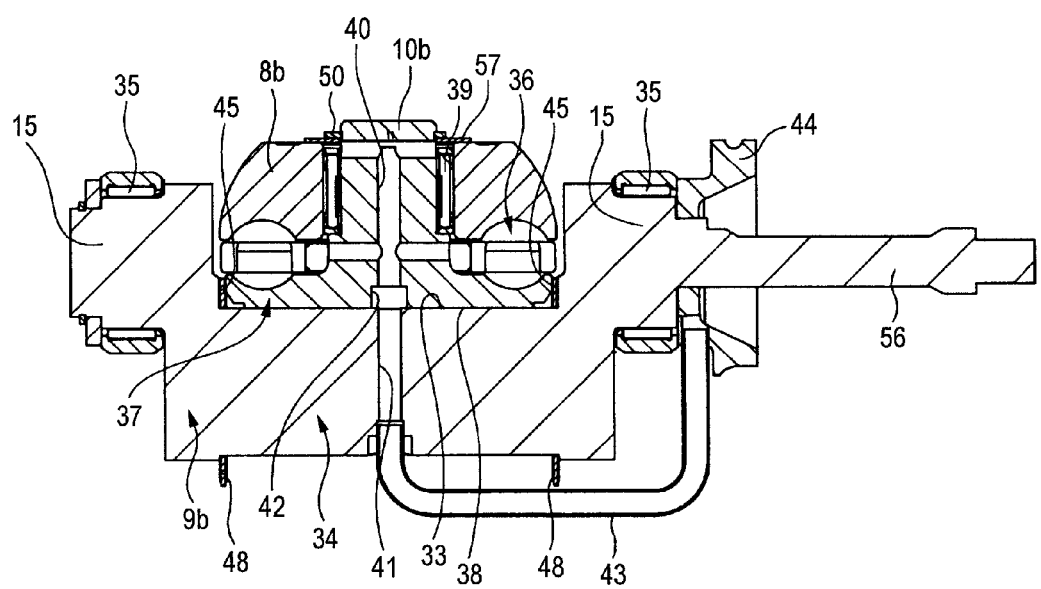
FIG. 21 is a cross-sectional view taken along the line G-G of FIG. 20.
Figure 22:
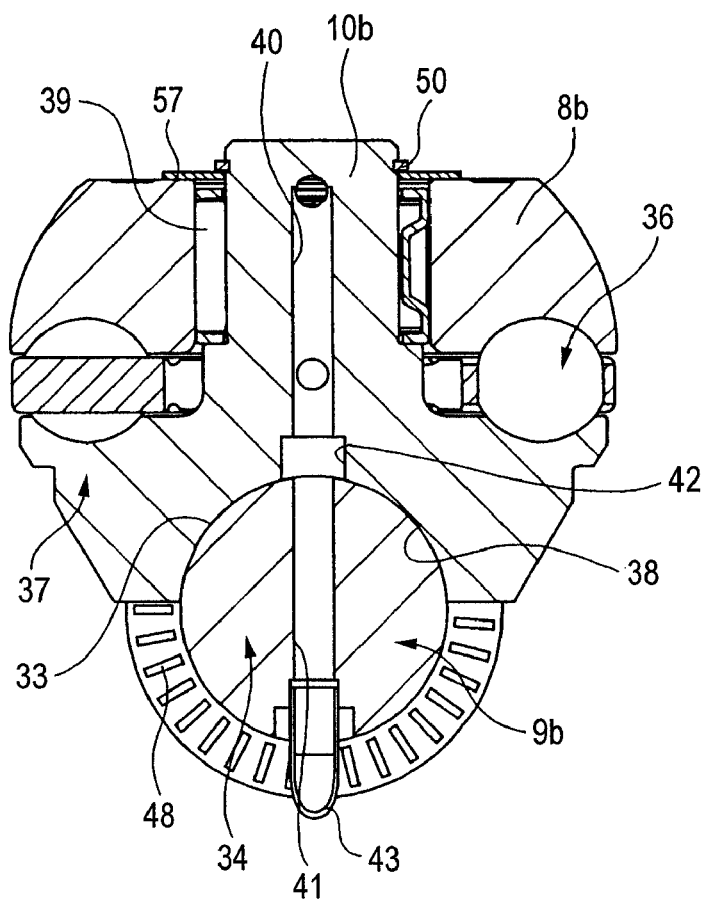
FIG. 22 is a cross-sectional view taken along the line H-H of FIG. 18.
Figure 23:
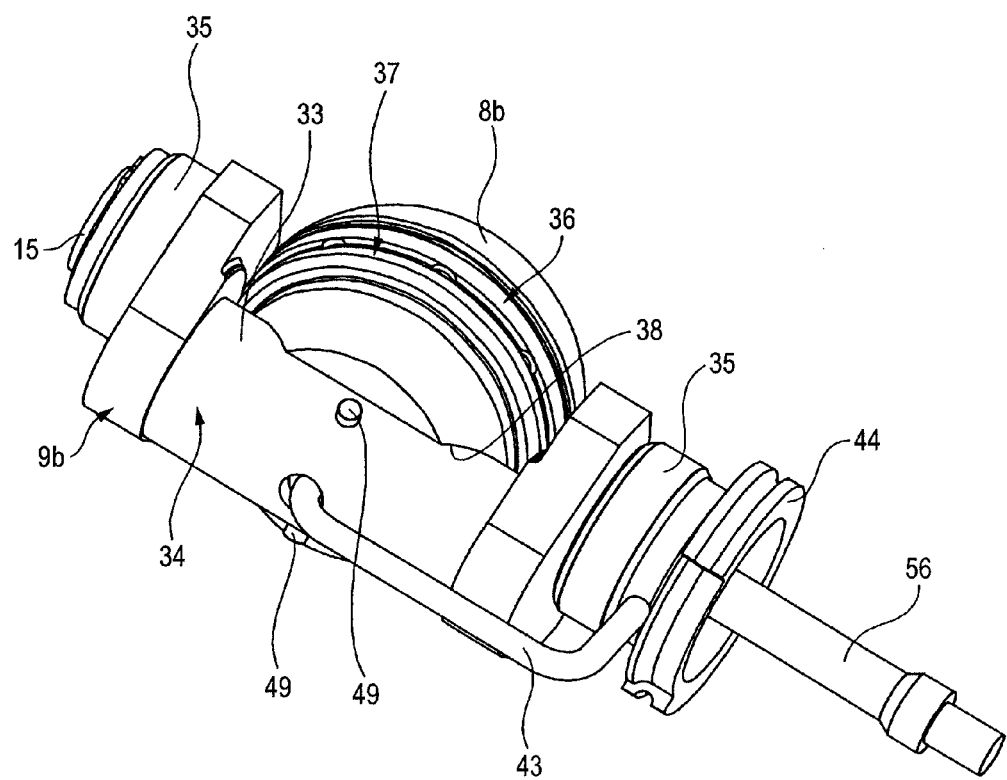
FIG. 23 is a perspective view of the main parts according to a sixth embodiment of the invention.
Figure 24:
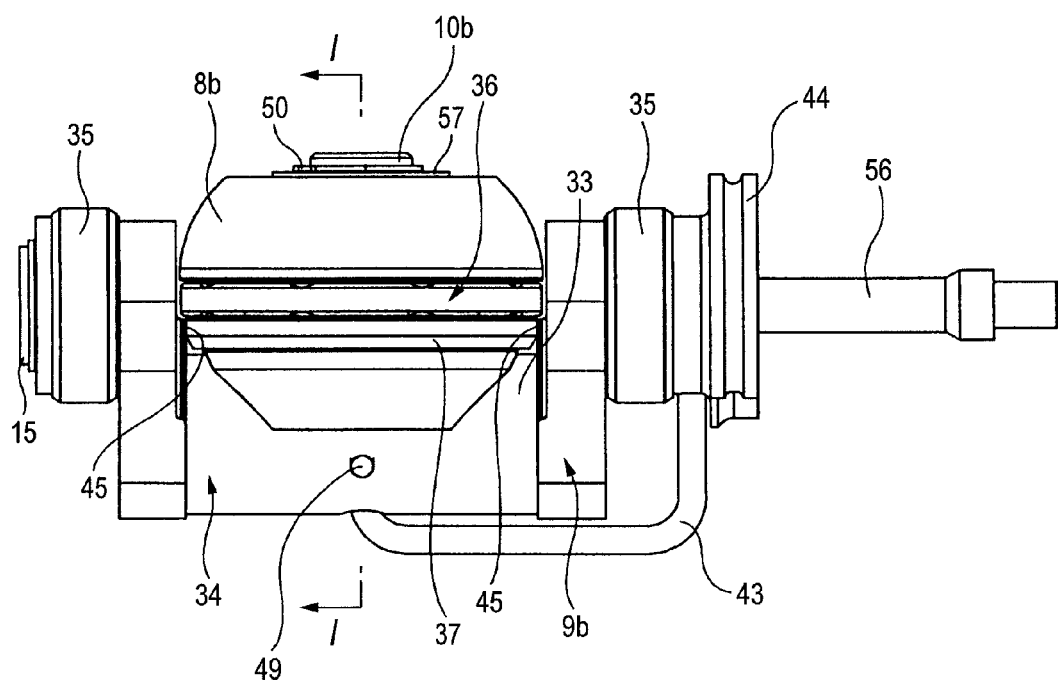
FIG. 24 is a front view of FIG. 23.
Figure 25:
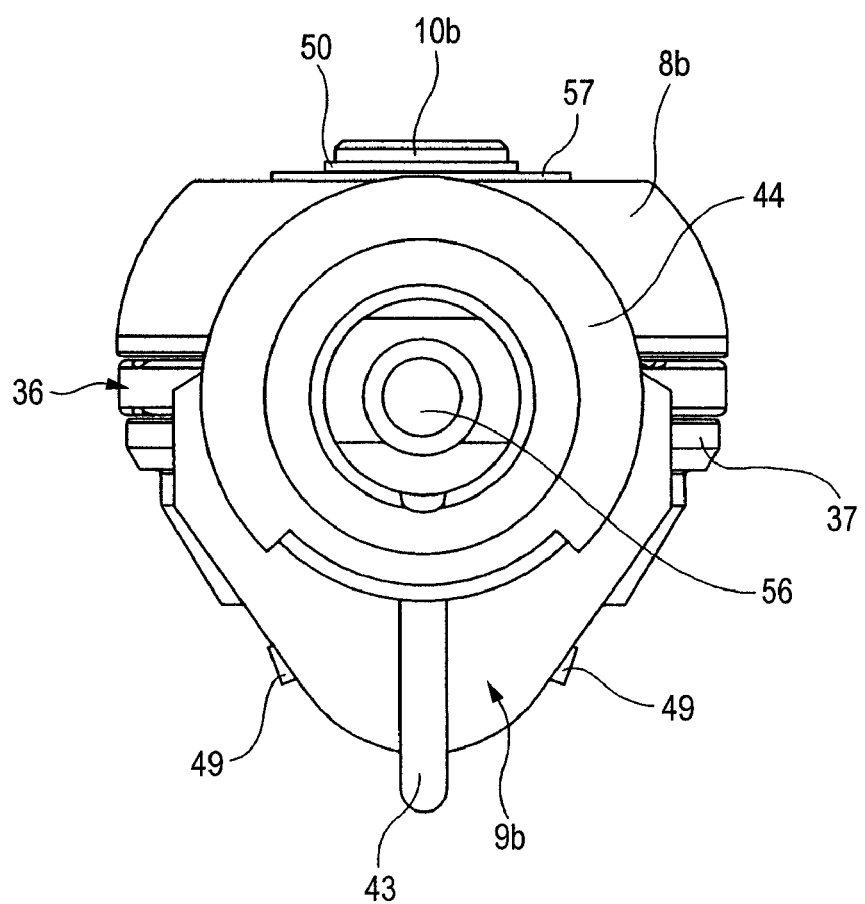
FIG. 25 is a right-sided view of FIG. 24.
Figure 26:
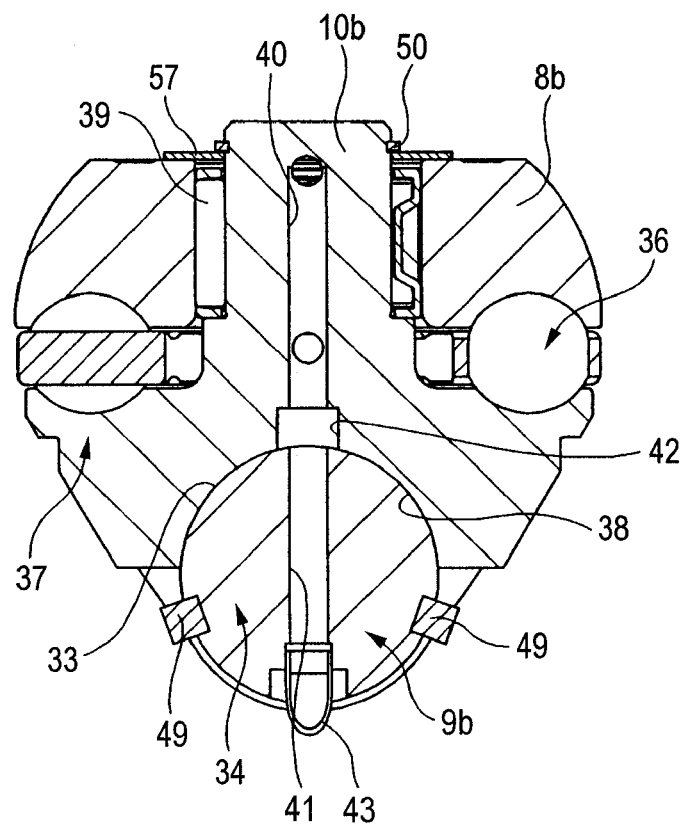
FIG. 26 is a cross-sectional view taken along the line I-I of FIG. 24.
Figure 27:
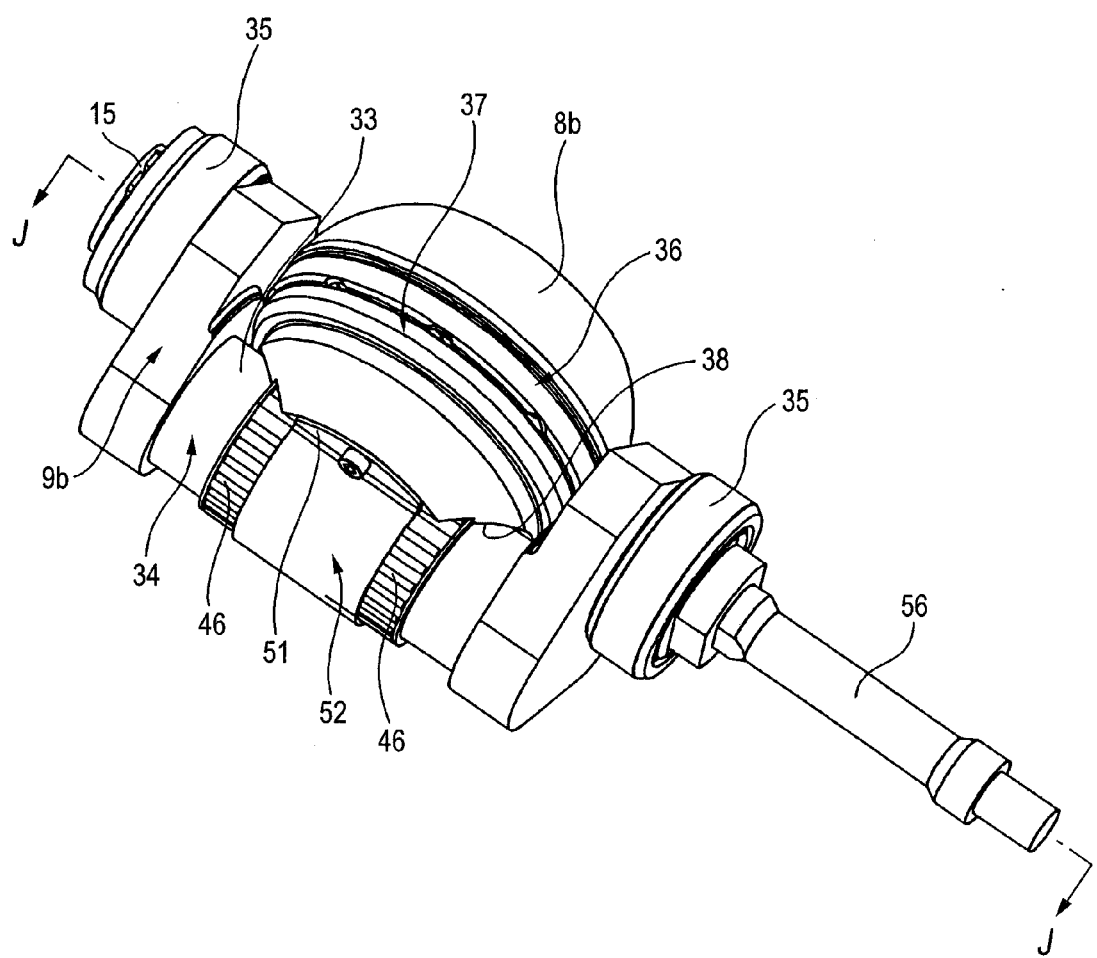
FIG. 27 is a perspective view of the main parts according to a seventh embodiment of the invention.
Figure 28:
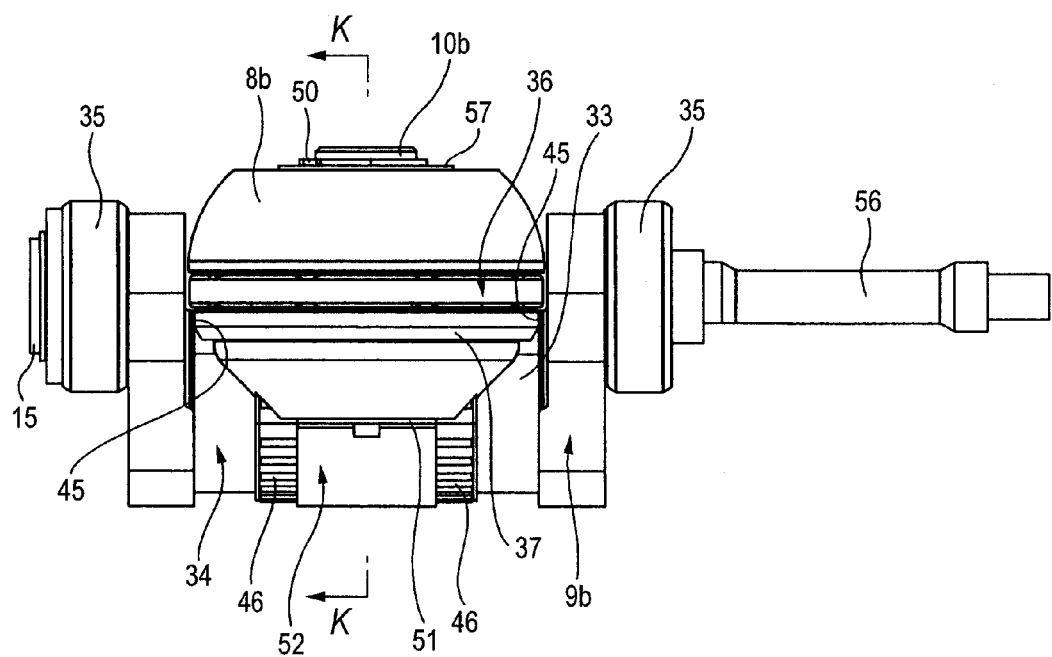
FIG. 28 is a front view of FIG. 27.
Figure 29:
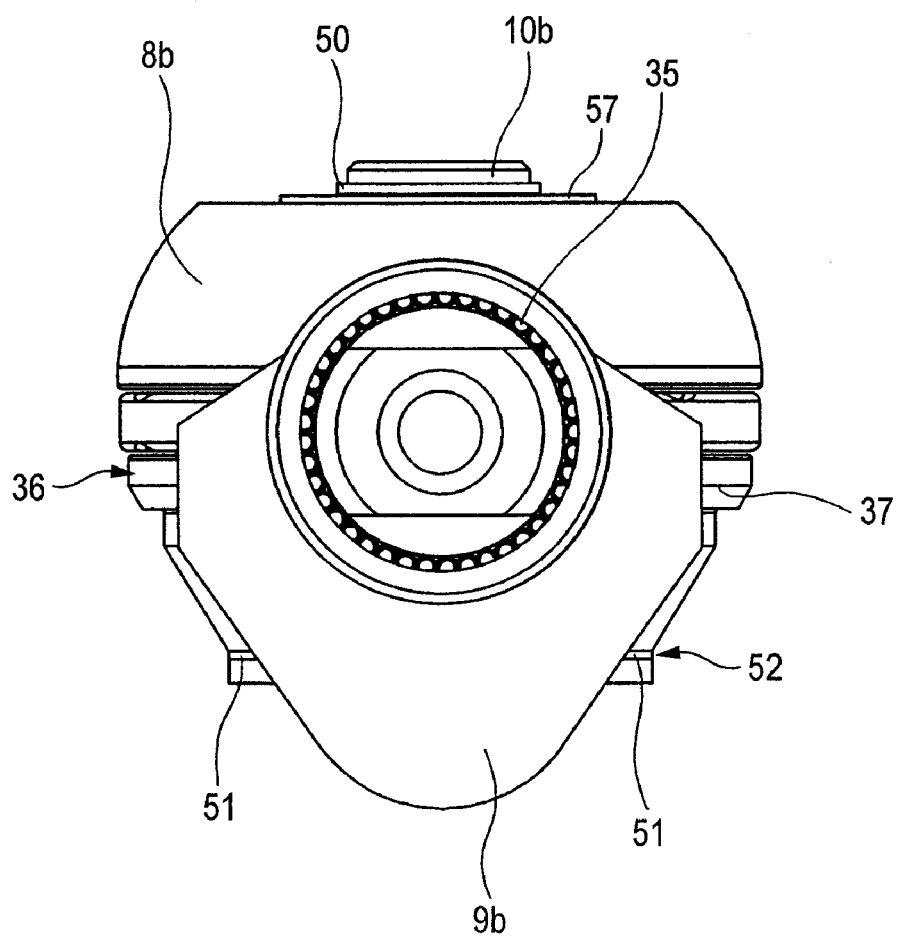
FIG. 29 is a right-sided view of FIG. 28.
Figure 30:
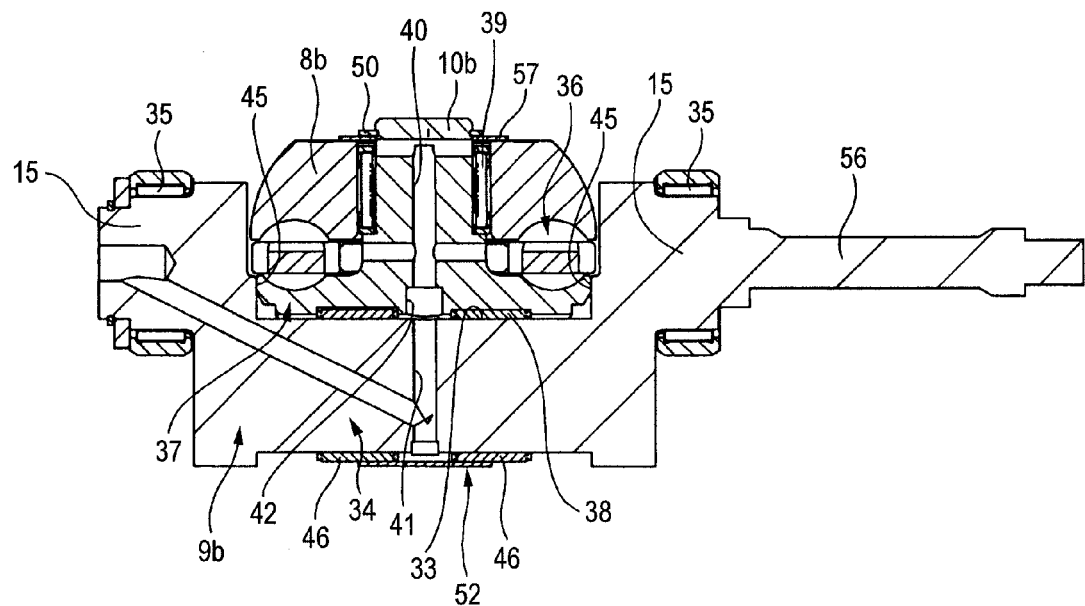
FIG. 30 is a cross-sectional view taken along the line J-J of FIG. 27.
Figure 31:
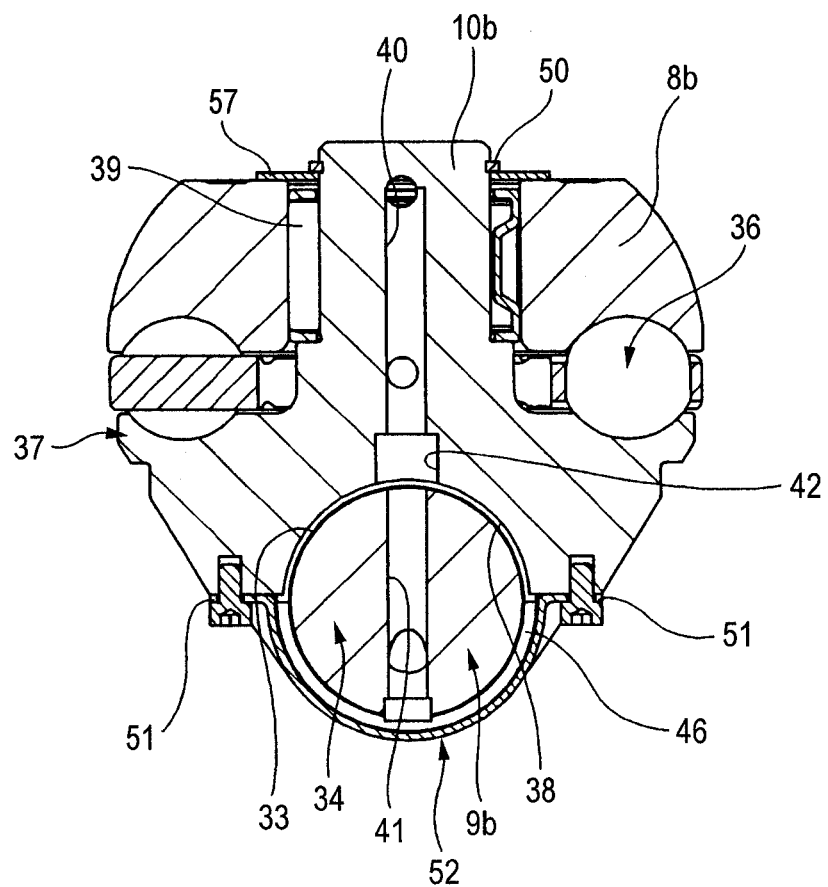
FIG. 31 is a cross-sectional view taken along the line K-K of FIG. 28.
Figure 32:
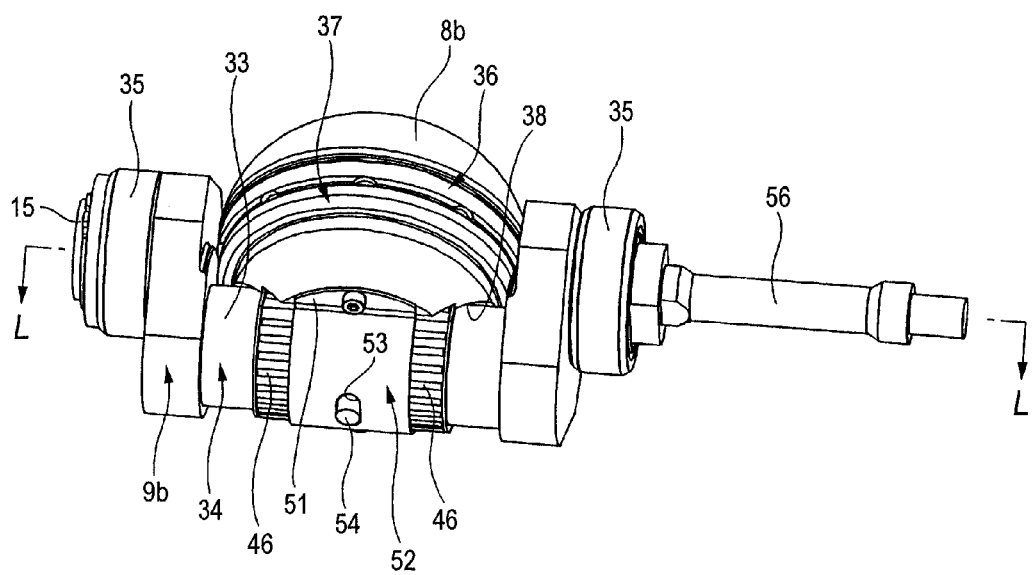
FIG. 32 is a perspective view of the main parts according to an eighth embodiment of the invention.
Figure 33:
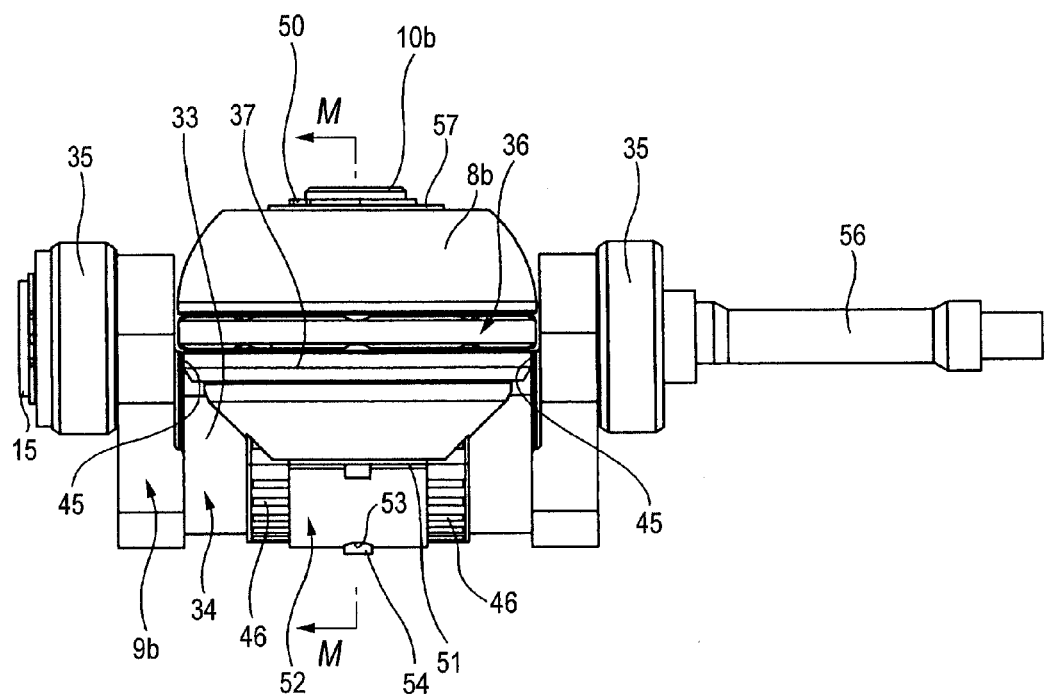
FIG. 33 is a front view of FIG. 32.
Figure 34:
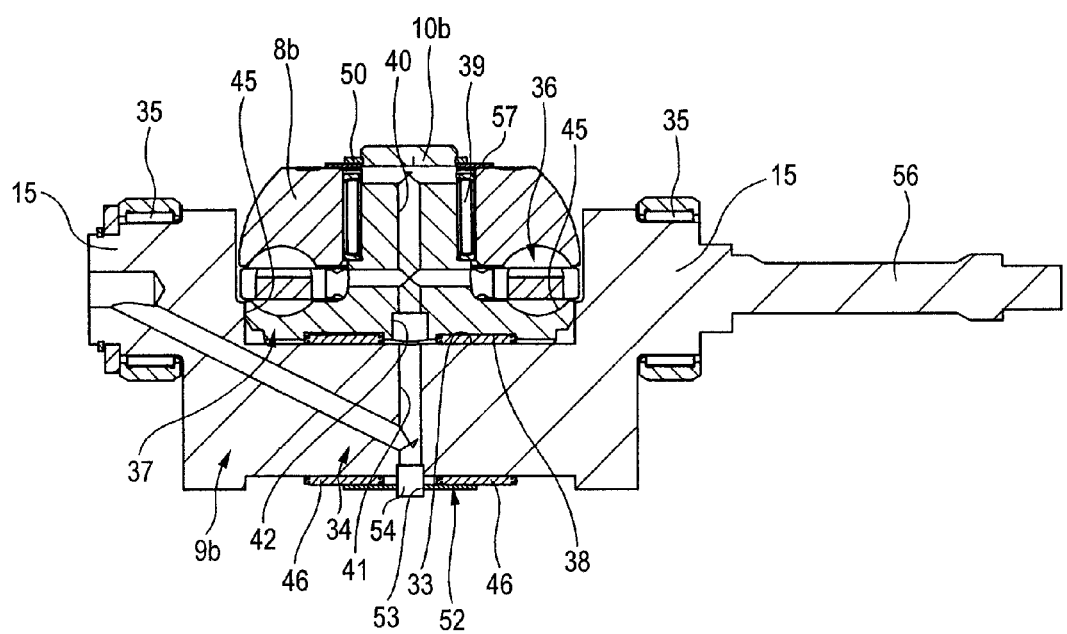
FIG. 34 is a cross-sectional view taken along the line L-L of FIG. 32.
Figure 35:
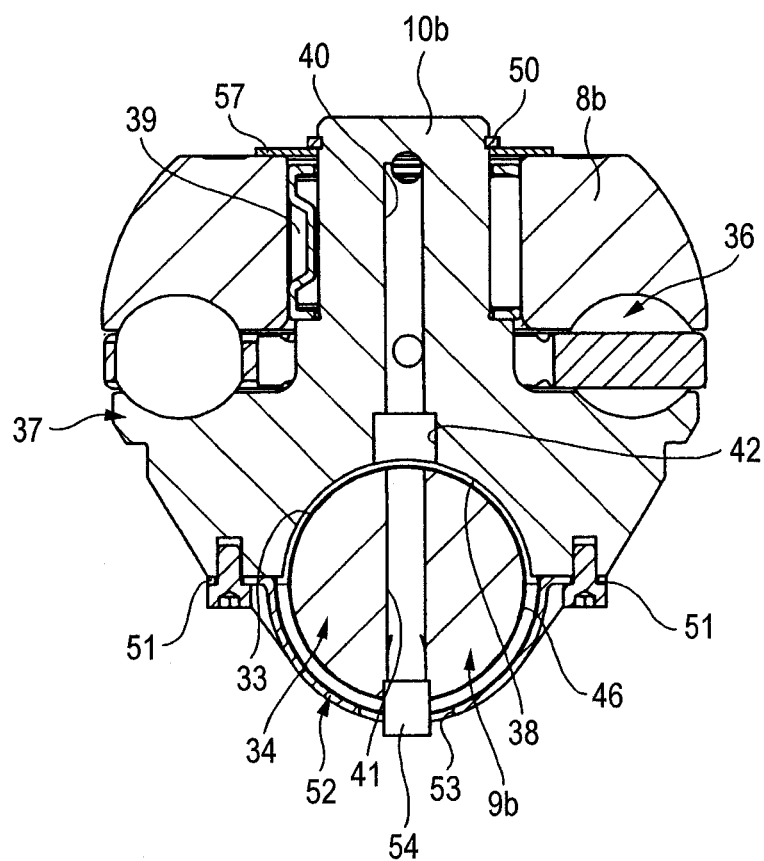
FIG. 35 is a cross-sectional view taken along the line M-M of FIG. 33.
Figure 36:
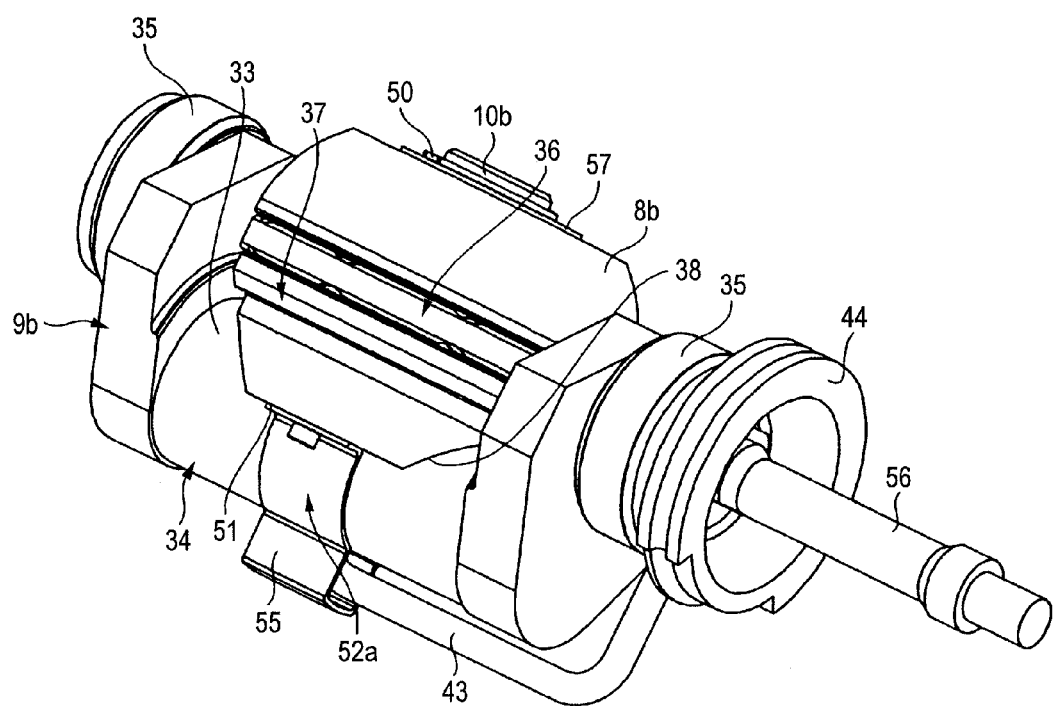
FIG. 36 is a perspective view of the main parts according to a ninth embodiment of the invention.
Figure 37:
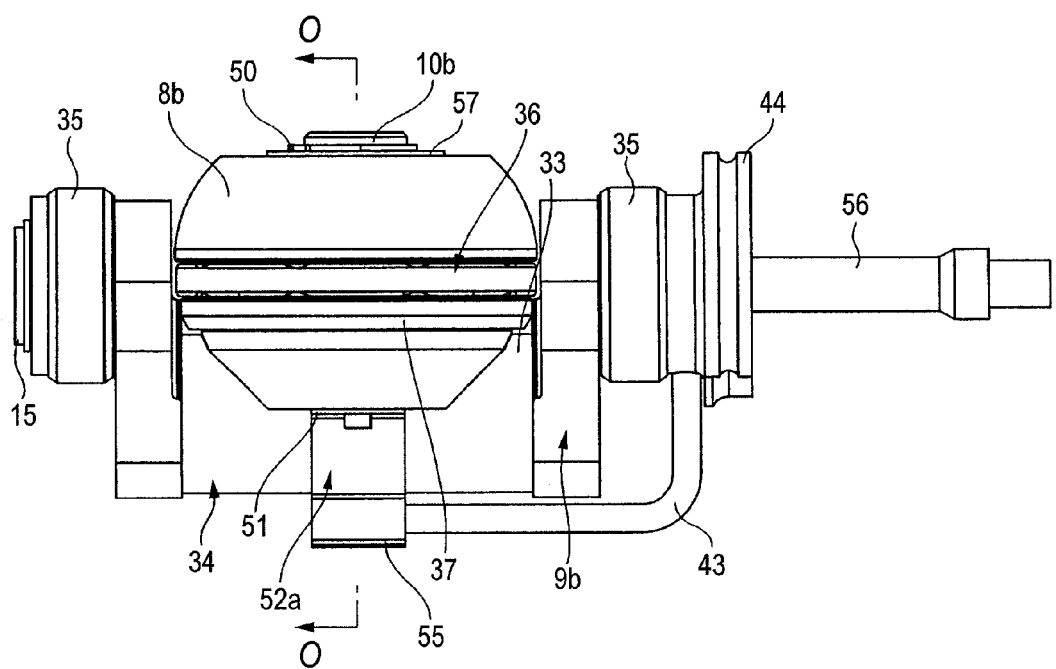
FIG. 37 is a front view of FIG. 36.
Figure 38:
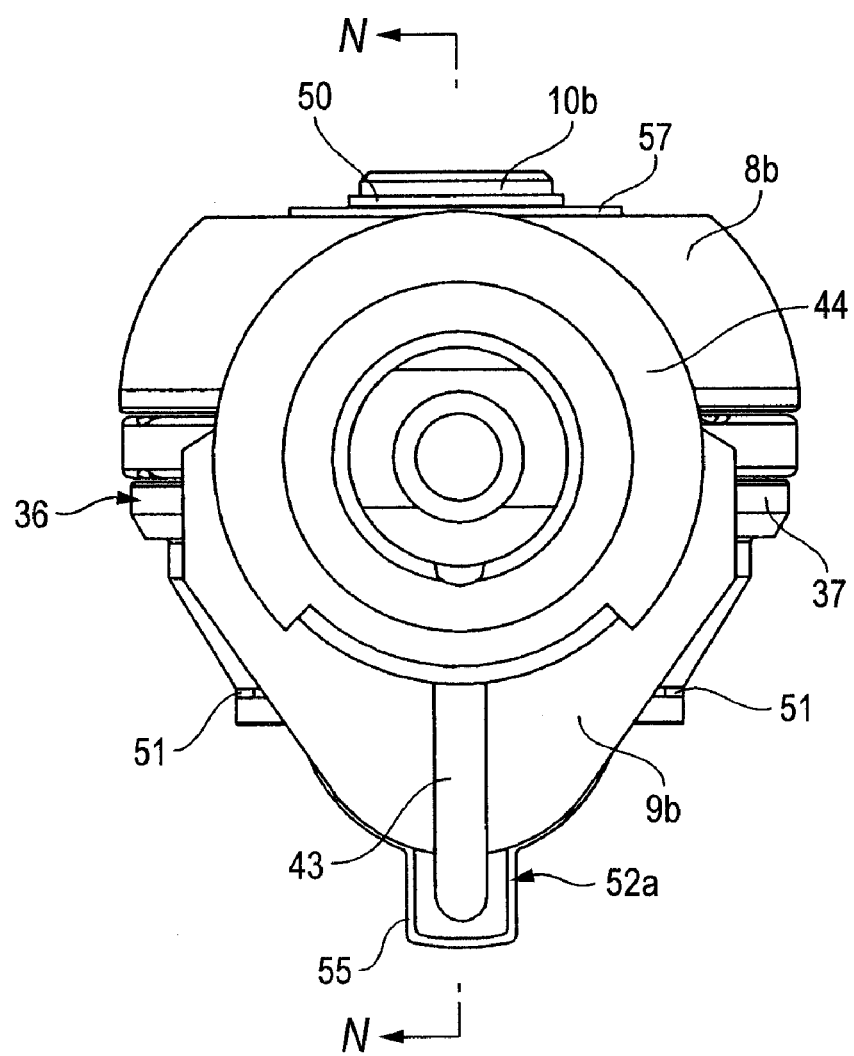
FIG. 38 is a right-sided view of FIG. 37.
Figure 39:
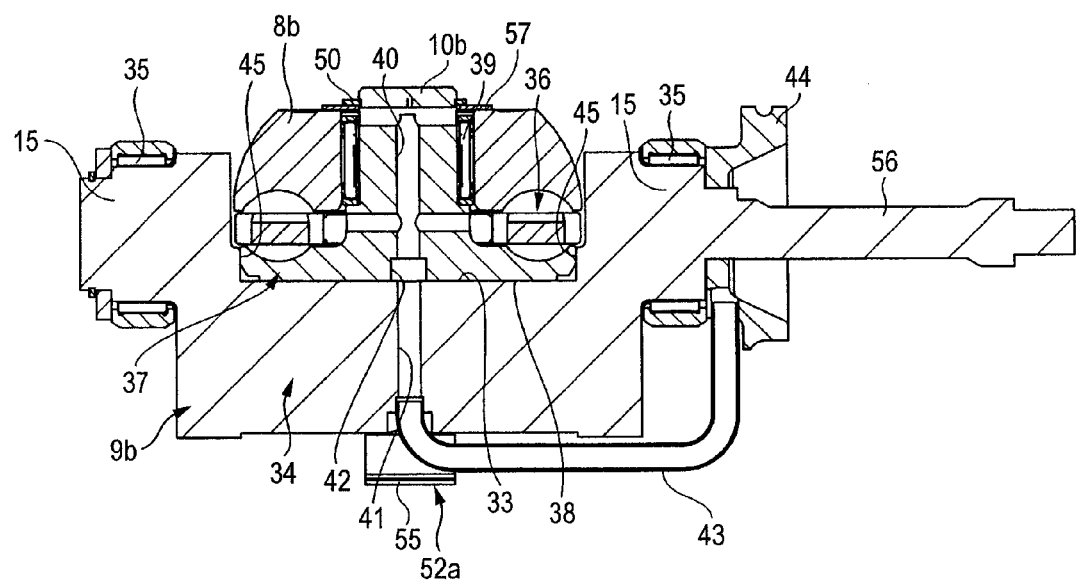
FIG. 39 is a cross-sectional view taken along the line N-N of FIG. 38.
Figure 40:
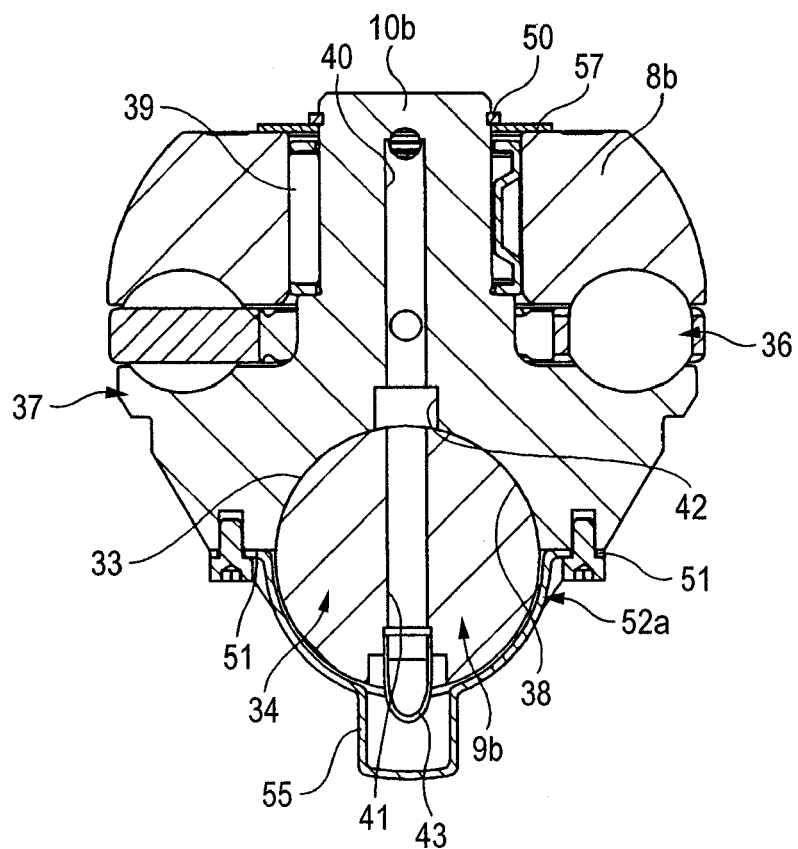
FIG. 40 is a cross-sectional view taken along the line O-O of FIG. 37.
Figure 41:
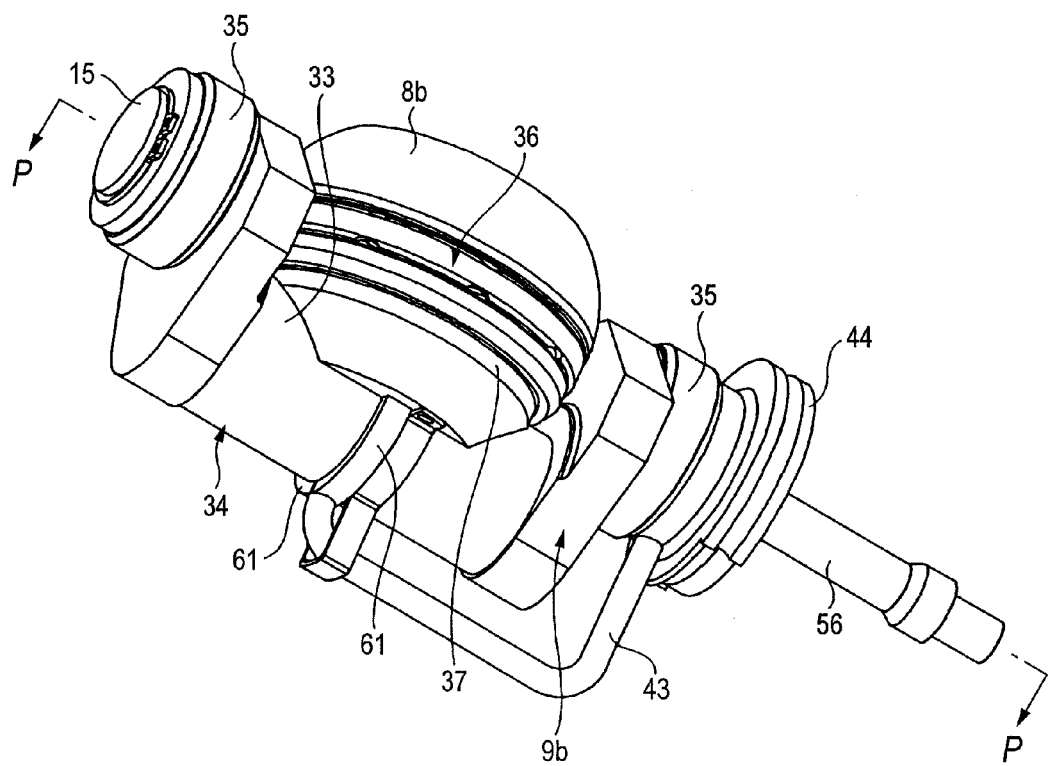
FIG. 41 is a perspective view of the main parts according to a tenth embodiment of the invention.
Figure 42:
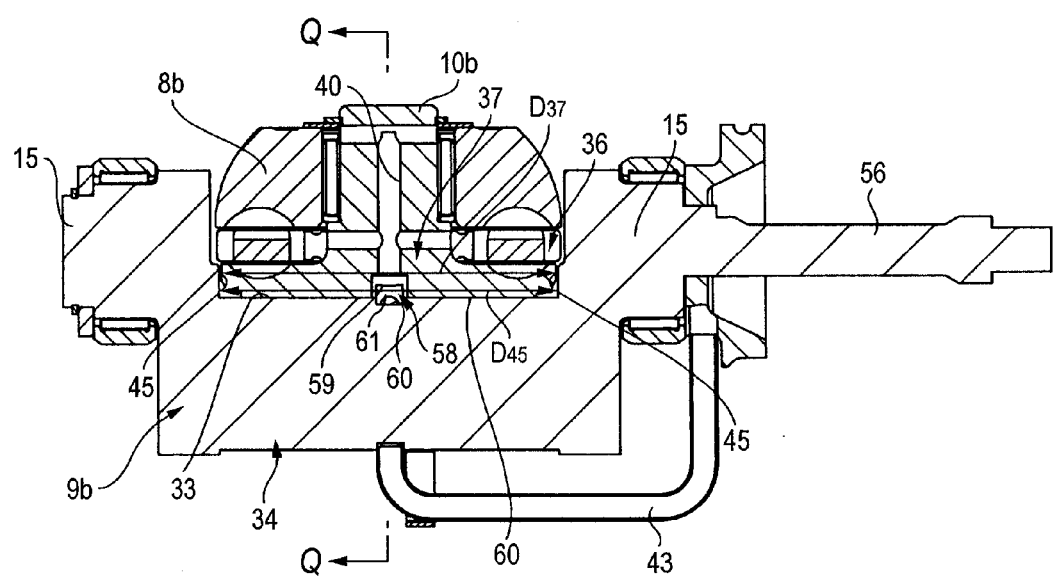
FIG. 42 is a cross-sectional view taken along the line P-P of FIG. 41.
Figure 43:
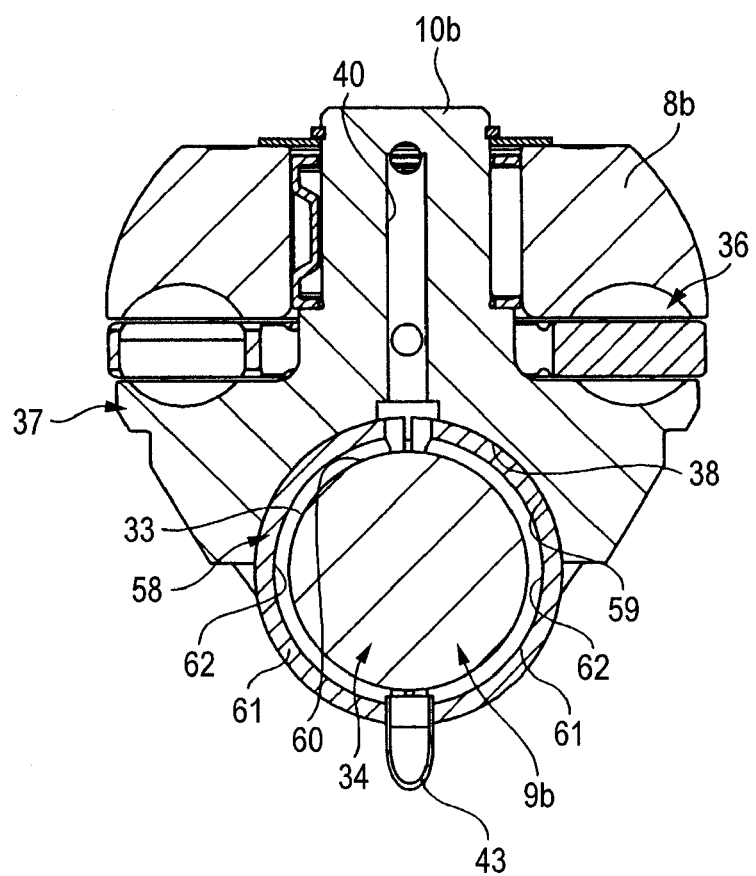
FIG. 43 is a cross-sectional view taken along the line Q-Q of FIG. 42.
Figure 44:
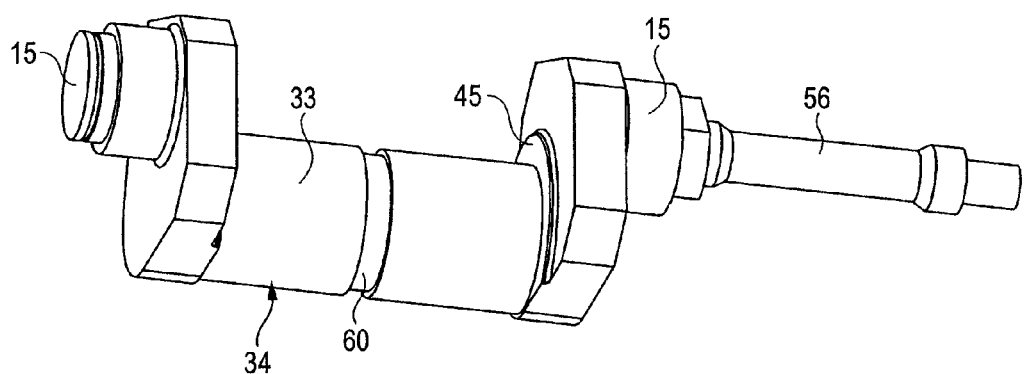
FIG. 44 is a perspective view in which a trunnion is removed.

FIG. 7 shows a second embodiment of the invention that corresponds to the first to fifth, and fifteenth aspects of the invention. According to the second embodiments the radius of curvature r33 in the cross-section of the cylindrical convex surfaces 33 of the support beam 34 is set smaller than the radius of curvature r38 in the cross-section of the partial cylindrical recess 38 formed on the outer surface of the outer ring 37. According to this configuration, lubricant is easily supplied to the contact portion of the cylindrical convex surfaces 33 and the recess 38. The other configuration and operation are the same as the first embodiment of the invention, therefore, not shown and described for the same parts.

Third Embodiment

FIGS. 8 to 12 show a third embodiment of the invention that corresponds to the first to third, fifth, and sixteenth aspects of the invention. According to the third embodiment, the partial cylindrical recess 38 formed on the outer surface of the outer ring 37 and the cylindrical convex surfaces 33 of the support beam 34 are formed into a cylindrical shape and the recess 38 and the convex 33 are engaged through a pair of needle bearings 46. Therefore, the outer ring 37 can more efficiently swing with respect to the support beam 34. Further, according to the third embodiment, the oil pipe 43 is not provided and the upstream end of the upstream oil passage 41 is open to the center of the front end of a tilt rotary shaft 15 (the left one in FIG. 11). The other configuration and operation are the same as the first embodiment of the invention, therefore, not shown and described for the same parts.

Fourth Embodiment

FIGS. 13 to 16 show a fourth embodiment of the invention that corresponds to the first to third, fifth, and sixteenth aspects of the invention. According to the fourth embodiment, the partial cylindrical recess 38 formed on the outer surface of the outer ring 37 and the cylindrical convex surfaces 33 of the support beam 34 are formed in a cylindrical shape and the convex 33 is engaged with the recess 38 through one or more sliding bearings 47. Therefore, similar to the third embodiment described above, the outer ring 37 is operable to swing smoothly in respect to the support beam 34. According to this embodiment, in particular, since the sliding bearings 47 are provided, the toroidal continuously variable transmission can be manufactured with low cost and load capacity at the swing support of the recess 38 and cylindrical convex surface 33 can be sufficiently ensured. The other configuration and operation are the same as the third embodiment of the invention, therefore, not shown and described for the same parts.

Fifth Embodiment

FIGS. 17 to 22 show a fifth embodiment of the invention that corresponds to the first to sixth, and fifteenth aspects of the invention. According to the fifth embodiment, a pair of thrust needle rollers 48 are provided between the outer surface of the outer ring 37 and a pair of stepped faces 45 formed on the inner surface of the trunnion 9b. Therefore, the thrust needle bearings 48 bear the traction force applied to the outer ring 37 through the thrust ball bearing 36 from the power roller 8b and load required to swing the outer ring 37 in respect to the support beam 34 is reduced. The thrust needle bearing 48, which is so called "cage & roller", has a plurality of needles radially and rotatably held in a ring-shaped retainer so as not to be separated. The other configuration and operation are the same as the first embodiment of the invention, therefore, not described for the same parts.

Sixth Embodiment

FIGS. 23 to 26 show a sixth embodiment of the invention that corresponds to the first to fifth, fifteenth and seventeenth aspects of the invention. According to the sixth embodiment, a stopper is provided on a portion of an intermediate outer peripheral surface of the support beam 34 so that when the outer ring 37 swings at limit allowed swinging angle, a part of the outer ring 37 abuts or engages with the stopper so as to prevent the outer ring 37 from swinging further the allowed swinging angle. Specifically, a pair of stopper pins 49 is provided at two positions that are determined around circumferential of the intermediate outer peripheral surface of the support beam 34, at a position sandwiching the outer ring 37 by both sides. The outer ring 37 is operable to swing only between the stopper pins 49. Therefore, the outer ring 37 is prevented from excessively swinging in respect to the trunnion 9b and positioning operation can be easily performed in assembling process, thereby increasing efficiency of assembling of the toroidal continuously variable transmission. The other configuration and operation are the same as the first embodiment of the invention, therefore, not described for the same parts.

Seventh Embodiment

FIGS. 27 to 31 show a seventh embodiment of the invention that corresponds to the first to third, fifth, sixteenth and eighteenth to twentieth aspects of the invention. According to the seventh embodiment, a first separation-preventing mechanism that prevents separation of the outer ring 37 from the power roller 8b and a second separation-preventing mechanism that prevents separation of the outer ring 37 from the trunnion 9b are provided. The first separation-preventing mechanism is disposed between the outer ring 37 and the power roller 8b so as to allow relative rotation of the outer ring 37 and the power roller 8b, and also prevent the outer ring 37 from separating from the power roller 8b. Further, the second separation-preventing mechanism is disposed between the outer ring 37 and the trunnion 9b so as to allow the outer ring 37 and the trunnion 9b to swing, and also prevent the outer ring 37 from separating from the trunnion 9b.

In order to achieve the first separation-preventing mechanism as described above, in the seventh embodiment, a washer 57 and a stop ring 50 are engaged on an edge portion of a support shaft 10b, which is fixed to the center of the inner surface of the outer ring 37, at a position protruding from the inner surface of the power roller 8b. Further, in order to achieve the second separation-preventing mechanism, a separation-preventing bracket 52 having flange-shaped attaching portions 51 that are formed by bending a metal plate and bending both ends of a semi cylindrical portion in the opposite directions is fixed to the outer ring 37. The separation-preventing bracket 52 is provided so as to stride over the support beam 34 of the trunnion 9b. The attaching portions 51, 51 are fixed on the outer ring 37 by screws. In this configuration, a clearance is defined between the inner surface of the semi cylindrical portion at the intermediate portion of the separation-preventing bracket 52 and the outer surface of the support beam 34. Therefore, the outer ring 37, power roller 8b, and trunnion 9b are not unintentionally separated even before they are disposed between the discs and the positioning process becomes easy. The other configuration and operation are the same as the third embodiment of the invention shown in FIGS. 8 to 12, therefore, not described for the same parts.

Eighth Embodiment

FIGS. 32 to 35 show an eighth embodiment of the invention that corresponds to the first to third, fifth, sixteenth, eighteenth to twentieth, and twenty second aspects of the invention. According to the eight embodiment, an oval engagement hole 53 is formed at an intermediate portion of the separation-preventing bracket 52, an engagement pin 54 protruding from the support beam 34 to correspond to the engagement hole 53 is inserted (engaged) in the engagement hole 53. A stopper mechanism, which prevents the outer ring 37 swing from swing further a predetermined allowed swinging angle by engagement of the engagement pin 54 and the engagement hole 53, is provided. According to this configuration, similar to the sixth embodiment shown in FIGS. 23 to 26, the positioning operation of the outer ring 37 becomes easily in assembling process, which improves efficiency of assembling of the toroidal continuously variable transmission. Further, the engagement hole 54 functions as an upstream oil passage 41 and blocks oil by closing the opening communicating with the passage opened to the cylindrical convex surfaces 33 of the support beam 34. The other configuration and operation are the same as seventh embodiment of the invention, therefore, not described for the same parts.

Ninth Embodiment

FIGS. 36 to 40 show a ninth embodiment of the invention that corresponds to the first to fifth, fifteenth, eighteenth to twenty first, and twenty third aspects of the invention. According to the ninth embodiment, the oil pipe 43 is prevented from moving in a direction in which the oil pipe is removed out from the connecting portion by disposing a portion of the separation-preventing bracket 52a at a portion facing the connecting portion to the support beam 34 at the end of the oil pipe 43. Further, a large diameter portion 55 is formed by protruding the portion facing the oil pipe 43 radially outward of the support beam 34 from the other portion at a portion of the separation-preventing bracket 52a and the oil pipe 43 is engaged by both ends of the large diameter portion 55. Through the engagement, a stopper mechanism that prevents the outer ring 37 swinging with the power roller 8b from swinging further the predetermined allowed swinging angle is provided. According to this embodiment, without a specific part for preventing the oil pipe 43 from removing, reliability in supplying lubricant to the thrust ball bearing 36 and the radial needle bearing 39 is ensured with low cost. Further, since the separation-preventing bracket 52a is provided, the outer ring 37 is prevented from swinging further the predetermined allowed swinging angle, which improves efficiency in assemblage of the toroidal continuously variable transmission with low cost. The other configuration and operation are the same as first and seventh embodiments of the invention, therefore, not described for the same parts.

Tenth Embodiment

FIGS. 41 to 46 show a tenth embodiment of the invention that corresponds to the first to fourth, seventh to ninth, fifteenth, eighteenth to twenty first, and twenty third aspects of the invention. According to the tenth embodiment, the distance $D_{45}$ between a pair of stepped faces 45 facing each other at the connecting portion of both ends of the support beam 34 and a pair of tilt rotary shafts 15 is larger than the outer radius $D_{37}$ of the outer ring 37 of the thrust ball bearing 36 ($D_{45} > D_{37}$). Further, a traction force transmitting mechanism 58 is disposed between the outer ring 37 and the support beam 34 of the trunnion 9b. The support beam 34 bears the traction force applied axially of the support beam 34 to the outer ring 37 through the thrust ball bearing 36 from the power roller 8b by the traction force transmitting mechanism 58 (with the outside of the outer ring 37 not in contact with the stepped faces 45).

Figure 45:
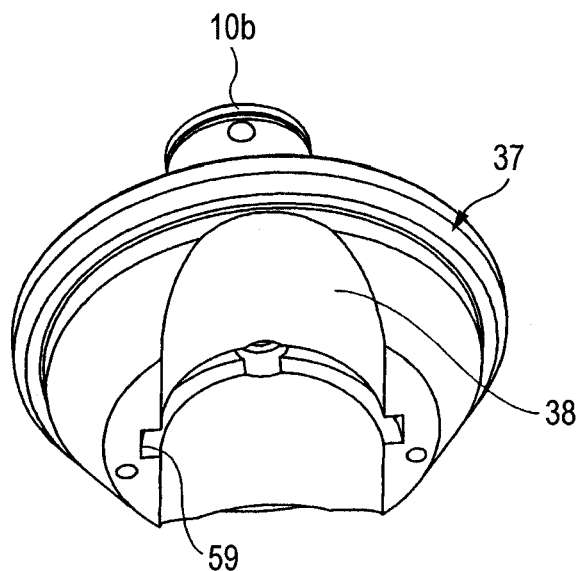
FIG. 45 is a perspective view in which an outer ring is removed.
Figure 46:
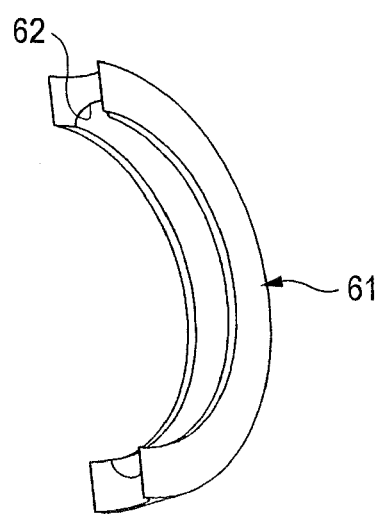
FIG. 46 is a perspective view illustrating an engagement separated.

According to the tenth embodiment, the traction force transmitting mechanism 58 has an inner groove 59, an outer groove 60, and a pair of engagement portions 61. The inner groove 59 of a rectangular shape in cross-section, as shown in FIG. 45, is circumferentially formed on the inner surface of the recess 38 formed on the outer surface of the outer ring 37 at the intermediate portion including the center of the outer ring 37. Further, the outer groove 60 of a rectangular shape in cross-section is formed around the cylindrical convex surface 33 at the axially intermediate portion of the support beam 34. On the other hand, the engagement portions 61 have partial arc shapes as shown in FIG. 46 (substantially semi circle) and are formed by the parallel flat surfaces. A groove 62 is formed inner side thereof to allow a lubricant to flow thereinto.

In each member of the configuration described above, the engagement portions 61 are inserted between the inner and outer grooves 59, 60 while aligning the groove 59 with the groove 60. That is, while the outer ends of the engagement portions 61 are fitted in the inner groove 59 without axial rattling and the inner ends are fitted in the groove 60 without axial rattling. Under this condition, a clearance is defined between the outer surface of the outer ring 37 and the stepped faces 45. When the toroidal continuously variable transmission is in operation, the traction force, called 2Ft, that is applied to the power roller 8b from the rotational contact portion (traction portion) of the input and output discs and the inner surface of the power roller 8b is applied to the outer ring 37 through the thrust ball bearing 36. According to this embodiment, the traction force is transmitted through the engagement portions 61 to the support beam 34 and born by the trunnion 9b including the support beam 34. This embodiment, as described above, does not restrict elastic deformation of the support beam 34 and allows the power roller 8b to swing smoothly about the support beam 34, which is now described hereafter.

Figure 47:
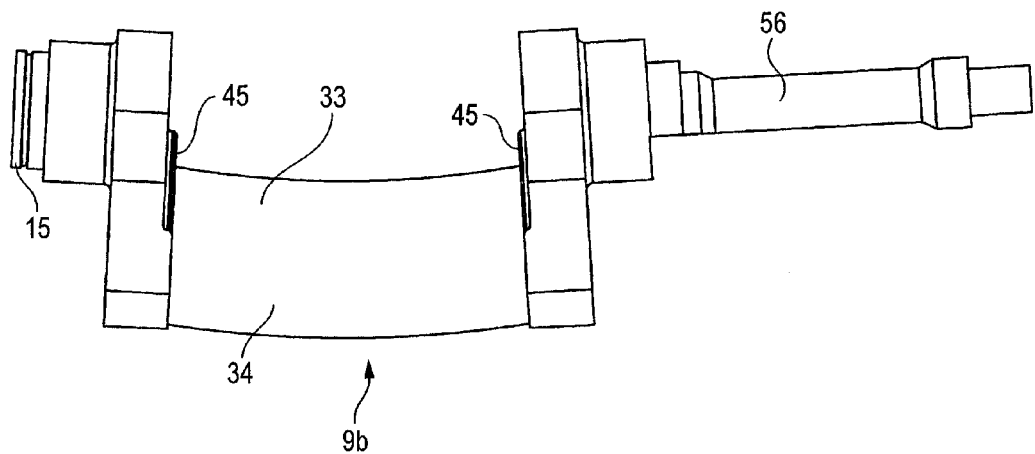
FIG. 47 is a front view illustrating elastic deformation of the trunnion in operation.
Figure 48:
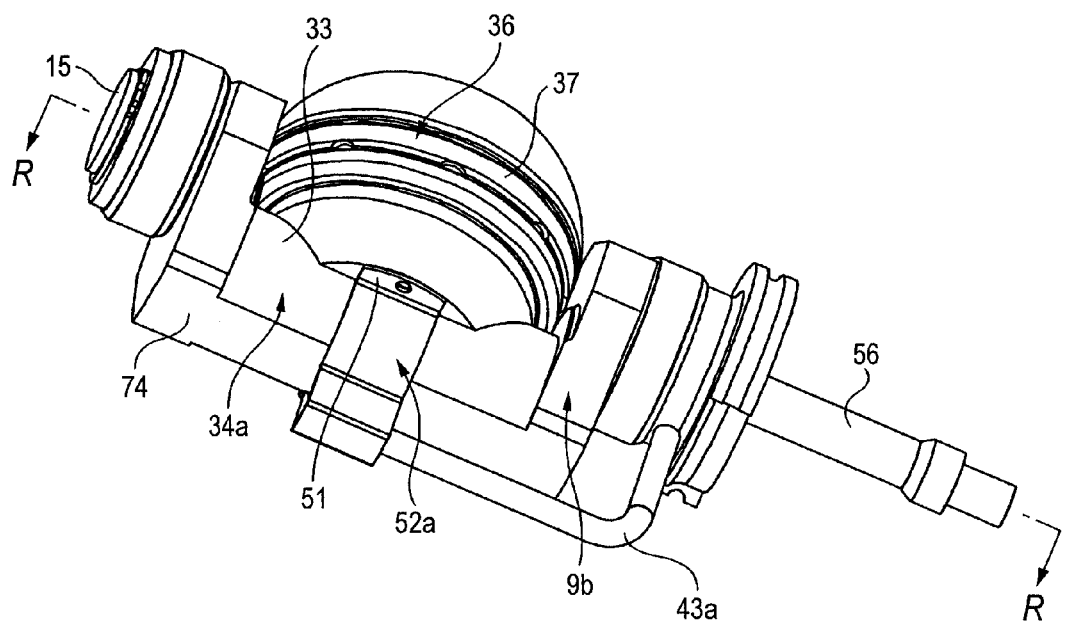
FIG. 48 is a perspective view illustrating the main parts of an eleventh embodiment of the invention.
Figure 49:
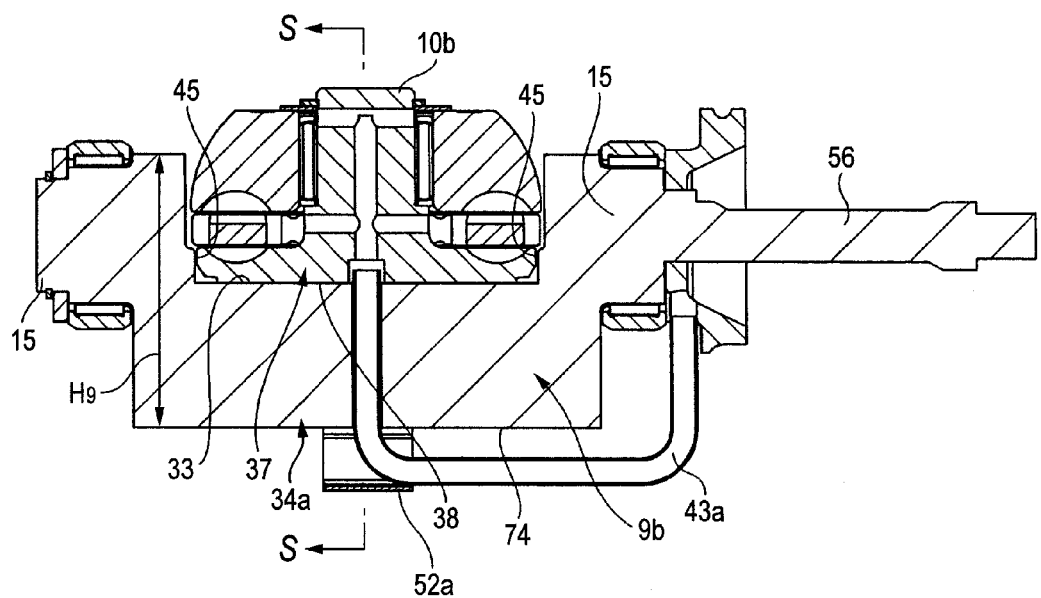
FIG. 49 is a cross-sectional view taken along the line R-R of FIG. 48.
Figure 50:
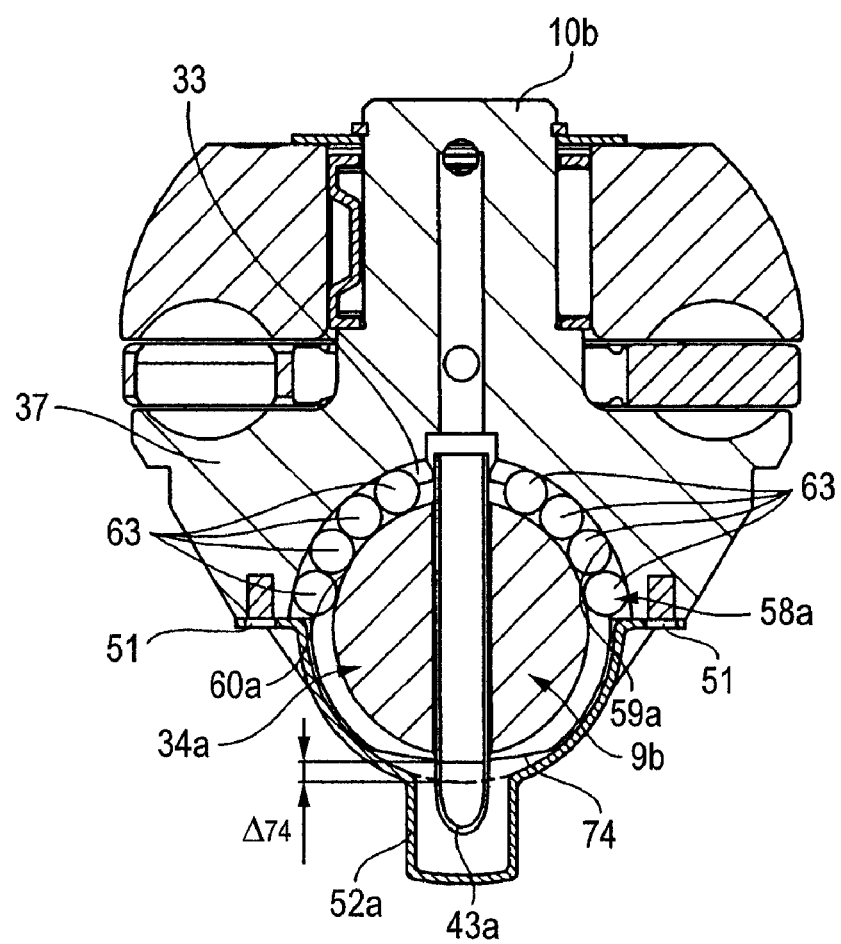
FIG. 50 is a cross-sectional view taken along the line S-S of FIG. 49.
Figure 51:
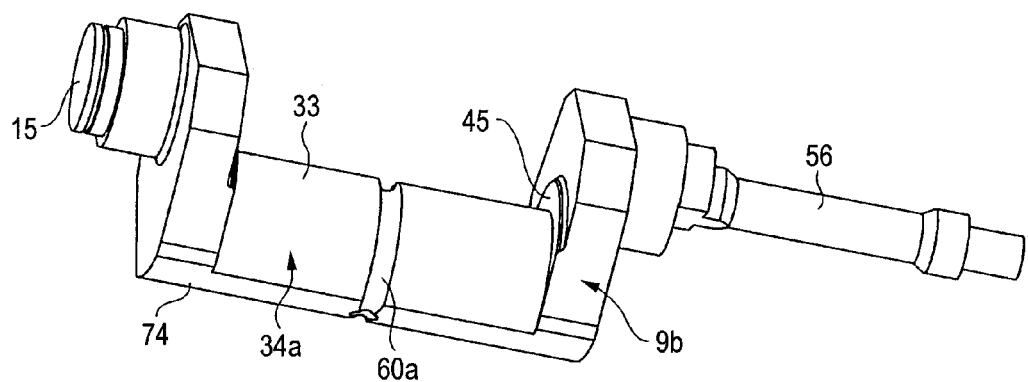
FIG. 51 is a perspective view illustrating a trunnion separated.
Figure 52:
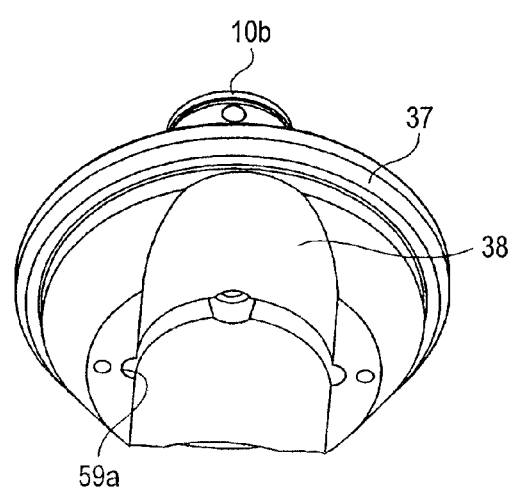
FIG. 52 is a perspective view illustrating an outer ring separated.
Figure 53:
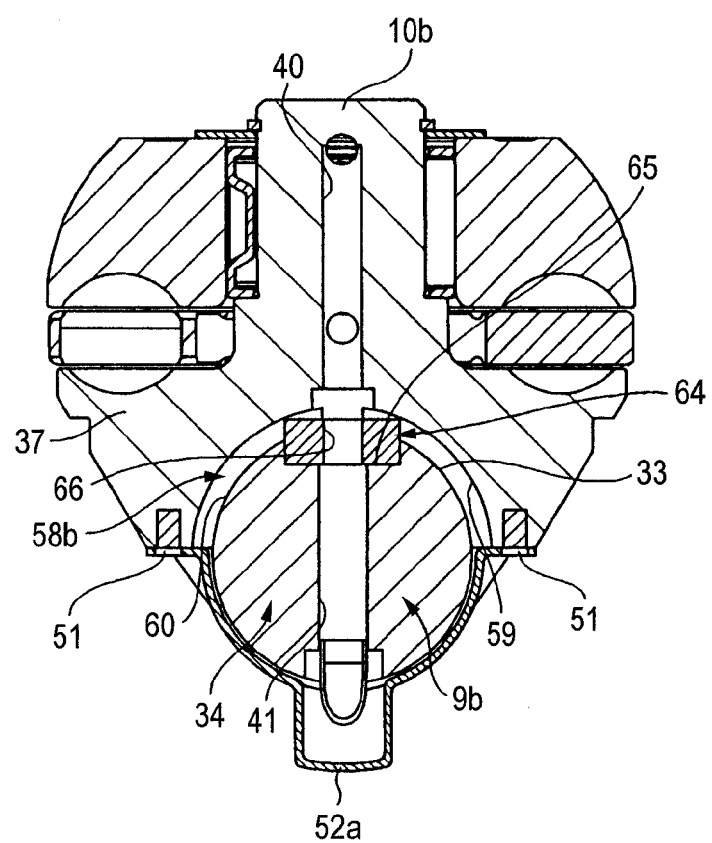
FIG. 53 is a cross-sectional view illustrating a twelfth embodiment of the invention, similar to FIG. 50.
Figure 54:
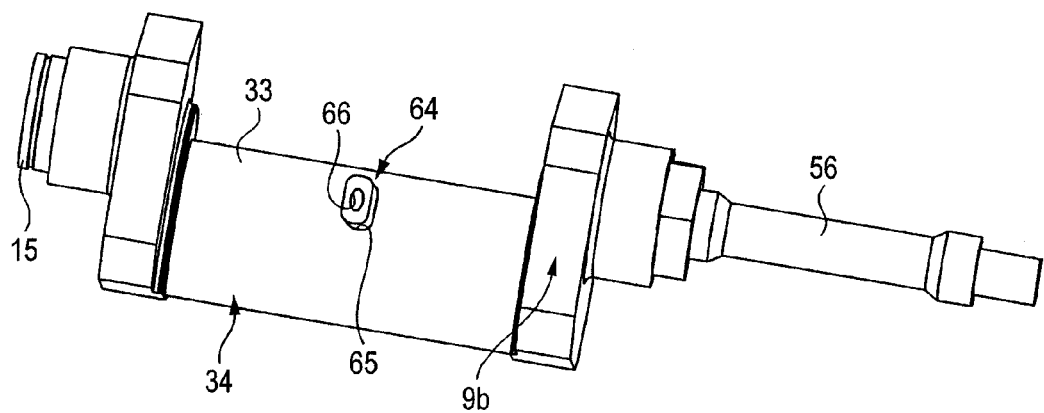
FIG. 54 is a perspective view illustrating a trunnion separated.

When the toroidal continuously variable transmission is in operation, the support beam 34 elastically deforms such that the power-roller-8b-side is recessed as shown in FIG. 47 in exaggeration by the thrust load applied to the power roller 8b from the input and output discs. The distance between the stepped faces 45 is decreased by the elastic deformation. Therefore, when one of the stepped faces 45 bears the traction force and the distance between the stepped faces 45 is larger a very little than the outer radius of the outer ring 37, the stepped faces 45 strongly push the outer ring 37 from the radial both sides by the elastic deformation. As a result, the outer ring 37 is difficult to swing at the center of the support beam 34, so that the power roller 8b can not move smoothly in the axial direction of the discs. When the movement is not smooth, contact pressure of the outer surface of the power roller 8b and the inner surface of each of the disc becomes non-uniform when the discs move axially by large torque transferred. Accordingly, transferring efficiency of the toroidal continuously variable transmission is decreased.

In order to prevent decrease in the transferring efficiency resulting from the above problems, it is preferable to set the distance $D_{45}$ between the stepped faces 45 sufficiently larger than the outer radius $D_{37}$ of the outer ring 37 ($D_{45} \gg D_{37}$). However, even though the distance $D_{45}$ is set sufficiently larger than the outer radius $D_{37}$, it is not enough to accurately locate the outer ring 37 in the axial direction of the support beam 34 (locate the power roller 8b supported by the inner surface of the outer ring 37), which consequently affects the stability of the toroidal continuously variable transmission in operation. Therefore, according to this embodiment, it is possible to ensure positioning the outer ring 37 in the axial direction of the support beam 34 accurately even though the distance $D_{45}$ is sufficiently larger than the outer radius $D_{37}$ and stability of the toroidal continuously variable transmission in operation by providing the traction force transmitting mechanism 58. Further, even though the amount of elastic deformation of the support beam 34 is large by large power transmission, the power roller 8b swings smooth and the transferring efficiency is not decreased.

Further, according to the tenth embodiment, since the outside groove 60 and the engagement portions 61 are provided, lubricant is supplied to the downstream oil passage 40 formed inner surface the outer ring 37 and the support shaft 10b through the oil supply space surrounded by the bottom of the outside groove 60 and grooves 62 formed on the inner surface of the engagement portions 61. Therefore, the downstream end of the oil pipe 43 is positioned between predetermined ends of the engagement portions 61 and the lubricant out of the oil pipe 43 flows into the oil supply space. Further, a clearance communicating with the opening of the upstream oil passage 40 is formed between the other ends of the engagement portions 61. However, the upstream oil passage 41 (e.g. see FIGS. 5 to 7) is not provided for the support beam 34. Specifically, decrease in rigidity of the support beam 34 due to the outer groove 60 is compensated by not providing the upstream oil passage 41.

The other configuration and operation are the same as ninth embodiment of the invention, therefore, not described for the same parts.

Eleventh Embodiment

FIGS. 48 to 52 show an eleventh embodiment of the invention that corresponds to the first to fourth, seventh, eighth, tenth, fifteenth, eighteenth to twenty first, and twenty third to twenty fifth aspects of the invention. According to the eleventh embodiment, inner and outer grooves 59a, 60a of a traction force transmitting mechanism 58a disposed between the outer ring 37 and a support beam 34a of the trunnion 9b are formed in a semicircle in the cross-section. A plurality of steel balls 63 serving as transferring members is disposed between the grooves 59a and 60a. Further, the downstream end of an oil pipe 43a protrudes from the cylindrical convex surface 33, radially passing through the axially intermediate portion of the support beam 34a. Each of the balls 63 is rotatable along the grooves 59a, 60a between the protruding portion from the cylindrical convex surface 33 of the downstream end of the oil pipe 43a and the attaching portions 51 of the separation-preventing bracket 52a and between the grooves 59a, 60a.

According to the eleventh embodiment having the above configuration, the steel balls 63 transfer traction force from the outer ring 37 to the support beam 34a. As the discs axially deform by the power transmission, the outer ring 37 swings with respect to the support beam 34a. While the outer ring 37 swings, the steel balls 63 and the grooves 59a, 60a function as a deep groove ball bearing and bear the traction force, allowing the outer ring 37 to swing. The amount of movement of the steel balls 63 between the grooves 59a, 60a is small because the angle of swing is small. Alternatively, it may be possible to provide the steel balls 63 throughout the support beam 34a with the grooves 59a, 60a and the steel balls 63 deviated axially from downstream end of the oil pipe 43a. According to this configuration, the steel balls exists outside the inner groove 59a is retained by a specific retaining plate. According to this configuration, the steel balls circulate around the support beam 34a.

Further, according to the eleventh embodiment that corresponds to the twenty fourth and twenty fifth aspects of the invention, in the support beam 34a of the trunnion 9b, the portion opposite to the cylindrical convex surface 33 supporting the outer ring 37 in the radial direction of the discs is recessed radially inward from the virtual cylindrical surface including the cylindrical convex surface 33. Further, the portion recessed radially inward forms a partial cylindrical surface 74 that is concentric with a pair of tilt rotary shafts 15, 15 provided at the ends of the trunnion 9b (in a radius of curvature larger then the cylindrical convex surface 33). In this embodiment, from the configuration as described above is used, the size of the trunnion 9b in the radial direction of the discs is not increased and swing radius of the power roller 8b about the tilt rotary shafts 15, 15 is ensured. Ensuring the swing radius is preferable in consideration of restriction of transmission ratio of the toroidal continuously variable transmission at a predetermined value, improvement of accuracy in transmission operation, and reduction of time required for the predetermined transmission ratio.

Specifically, according to the configuration of the eleventh embodiment, when the discs axially move, the power roller 8b follows the axial movement by swinging with respect to the support beam 34a. Due to the swing, the power roller 8b moves not only axially, but radially of the discs, though the amount is very small. The transmission ratio of the toroidal continuously variable transmission does not reach the predetermined value by the axial movement. In order to reduce the required amount to the predetermined transmission ratio, it is preferable to reduce the radial movement due to swing and increase the swing radius. However, even though the swing radius is increased, the height H9 of the trunnion 9b in the radial direction of the disc is large (see FIG. 49), which is disadvantageous in reduction of the size and weight of the toroidal continuously variable transmission. According to the eleventh embodiment, the height H9 of the trunnion 9h is maintained small as much as the amount of radial recess Δ74 due to the partial cylindrical surface 74 (see FIG. 50), so that the accuracy in transmission operation is improved and time required to achieve a predetermined transmission ratio is reduced. Therefore, reduction of the size and weight of the toroidal continuously variable transmission is achieved.

Because the partial cylindrical surface 74 is machined when lathe-machining is applied to the tilt rotary shafts 15 (with one chuck), cost for forming the partial cylindrical surface 74 is not much (for example, compared with forming flat face).

The other configuration and operation are the same as tenth embodiment of the invention, therefore, not described for the same parts.

Further, the configuration corresponding to the twenty fourth aspect of this embodiment may be applied to the other embodiment, not the traction force transmitting mechanism 58a with the steel balls 63.

Twelfth Embodiment

Figure 55:
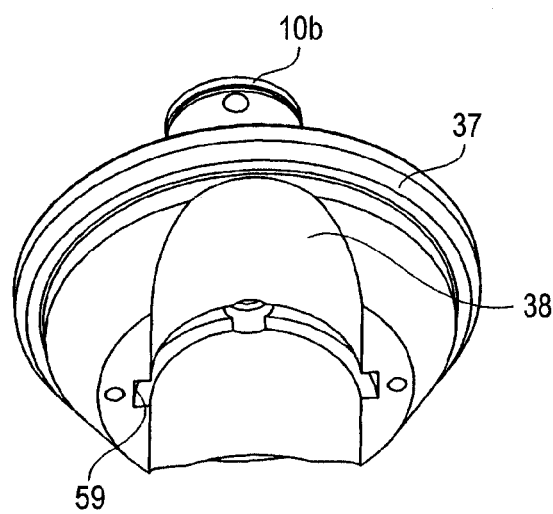
FIG. 55 is a perspective view illustrating an outer ring separated.
Figure 56:
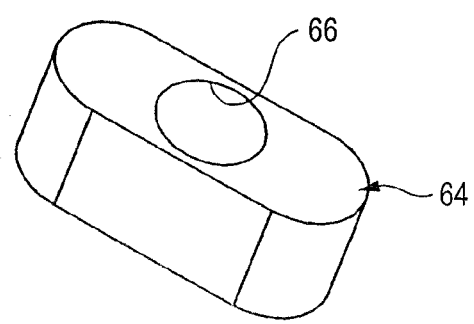
FIG. 56 is a perspective view illustrating a key separated.
Figure 57:
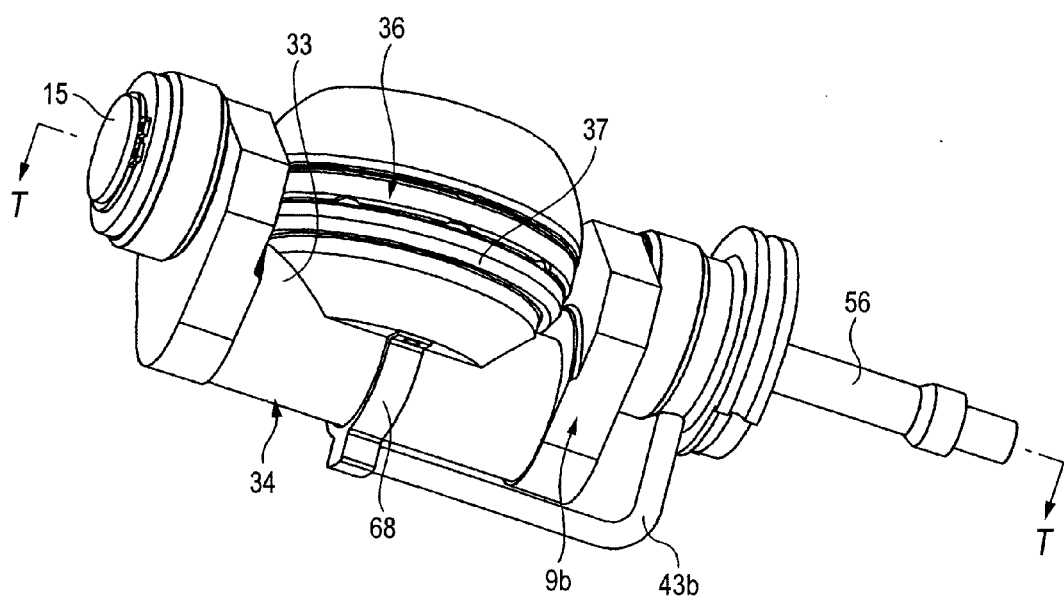
FIG. 57 is a perspective view illustrating the main parts of a thirteenth embodiment of the invention.
Figure 58:
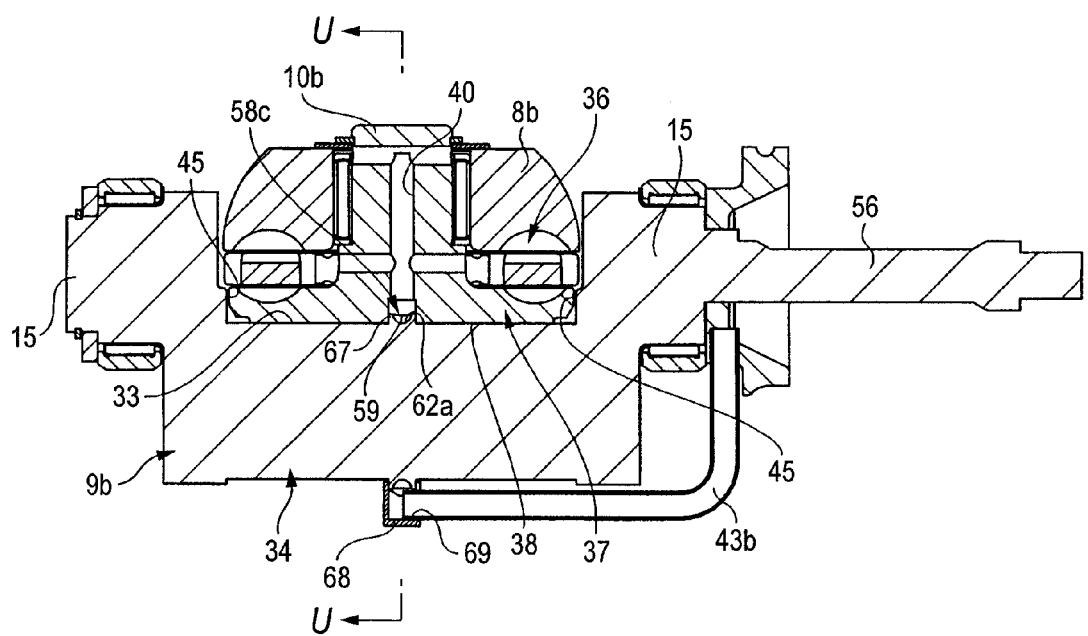
FIG. 58 is a cross-sectional view taken along the line T-T of FIG. 57.
Figure 59:
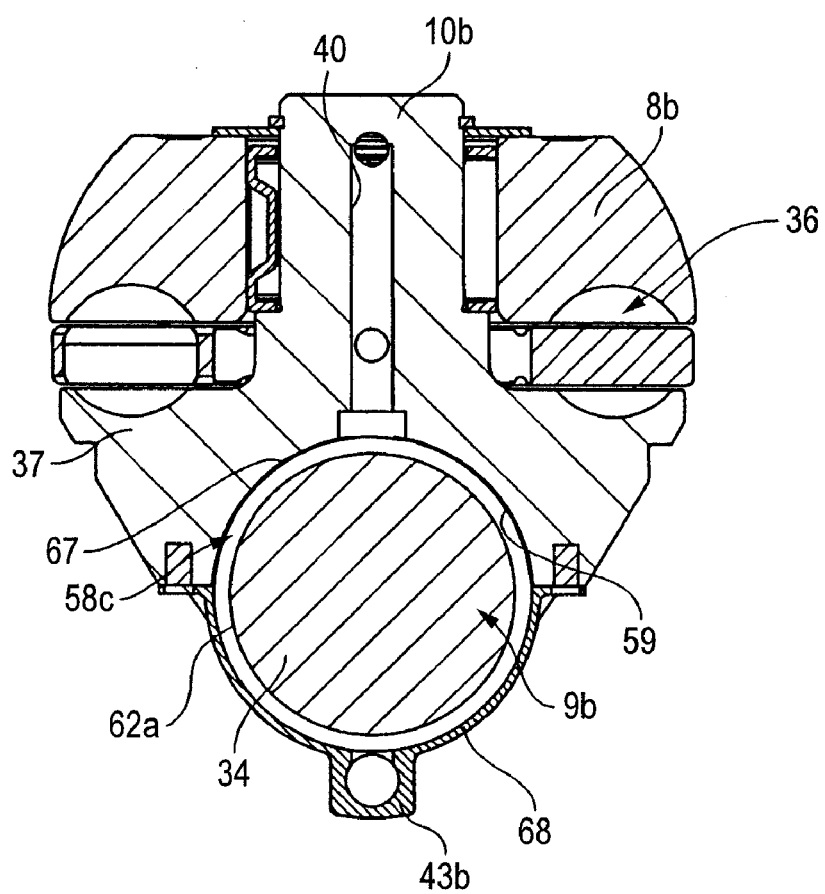
FIG. 59 is a cross-sectional view taken along the line U-U of FIG. 58.
Figure 60:
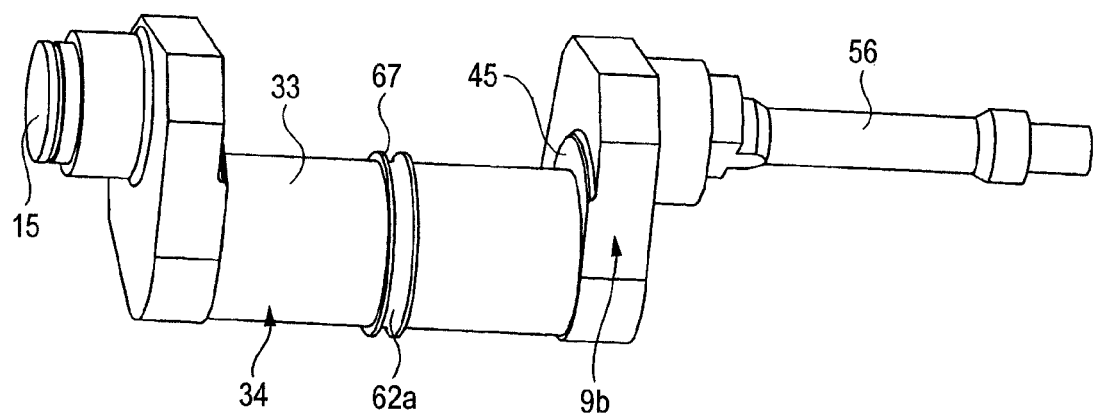
FIG. 60 is a perspective view illustrating a trunnion separated.

FIGS. 53 to 56 show a twelfth embodiment of the invention that corresponds to the first to fourth, seventh, eighth, eleventh, fifteenth, eighteen to twenty first, and twenty third aspects of the invention,. According to the twelfth embodiment, a traction force transmitting mechanism 58b disposed between the outer ring 37 and the support beam 34 of the trunnion 9b has an inner groove 59 and a key 64. The inner groove 59, as shown in FIG. 55, is the same as the tenth embodiment.

On the other hand, a recess 65 in which a half of the key 64 (the lower half in FIG. 53) is fitted is formed at the downstream opening of the upstream oil passage 41 in the support beam 34. The key 64 is oval shape and has a through hole 66 at the center to allow the lubricant to pass through. The other half of the key 64 (the upper half of FIG. 53) is fitted in the inner groove 59 such that the support beam 34 is circumferentially movable, with the half fitted in the recess 65.

According to this embodiment having the above configuration, they key 64 transmits traction force from the outer ring 37 to the support beam 34. As the discs axially move by the power transmission, the outer ring 37 swings with respect to the support beam 34. Because the end of the key is formed in a semicircle, the end and the inner surface of the inner groove 59 is not engaged and smooth swing is achieved. The lubricant is supplied to the downstream oil passage 40 from the upstream oil passage 41 through the through hole 66.

The other configuration and operation are the same as tenth embodiment of the invention, therefore, not described for the same parts.

Thirteenth Embodiment

FIGS. 57 to 60 show a thirteenth embodiment of the invention that corresponds to the first to fourths seventh, twelfth, fifteenth and eighteenth to twentieth aspects of the invention. According to the thirteenth embodiment, a traction force transmitting mechanism 58c disposed between the outer ring 37 and the support beam 34 of the trunnion 9 has an inner groove 59 formed on the outer ring 37 and a protrusion 67 formed on the support beam 34. The shape of the outer ring 37 including the inner groove 59 is the same as twelfth embodiment. On the other hand, the protrusion 67 is integrally and circumferentially formed around the outer surface of the support beam 34 at the axially intermediate portion. In this configuration, a groove 62a through which a lubricant flows is formed around the outer surface of the protrusion 67. The traction force transmitting mechanism 58c is achieved by engaging circumferentially movably the protrusion 67 in the inner groove 59.

According to the thirteenth embodiment having the above configuration, the protrusion 67 transmits traction force from the outer ring 37 to the support beam 34. As the discs axially move by the power transmission, the outer ring 37 swings with respect to the support beam 34.

Further, according to the thirteenth embodiment, the lubricant is supplied from an oil pipe 43b to the downstream oil passage 40 through the grooves 62a. Therefore, according to the thirteenth embodiment, both ends of a cover 68 covering the radially outer opening of the groove 62a are fixed to the outer surface of the outer ring 37. The cover 68 functioning as a separation-preventing bracket is generally formed in a semicircle. The downstream end of the oil pipe 43b is inserted in a through hole 69 formed in the portion radially protruding at the center of the cover 68. When the cover 68 is in swing motion with the outer ring 37, the oil pipe 43b swings correspondingly, but the angle change little, which is not an important problem.

The other configuration and operation are the same as tenth embodiment of the invention, therefore, not described for the same parts.

Fourteenth Embodiment

Figure 61:
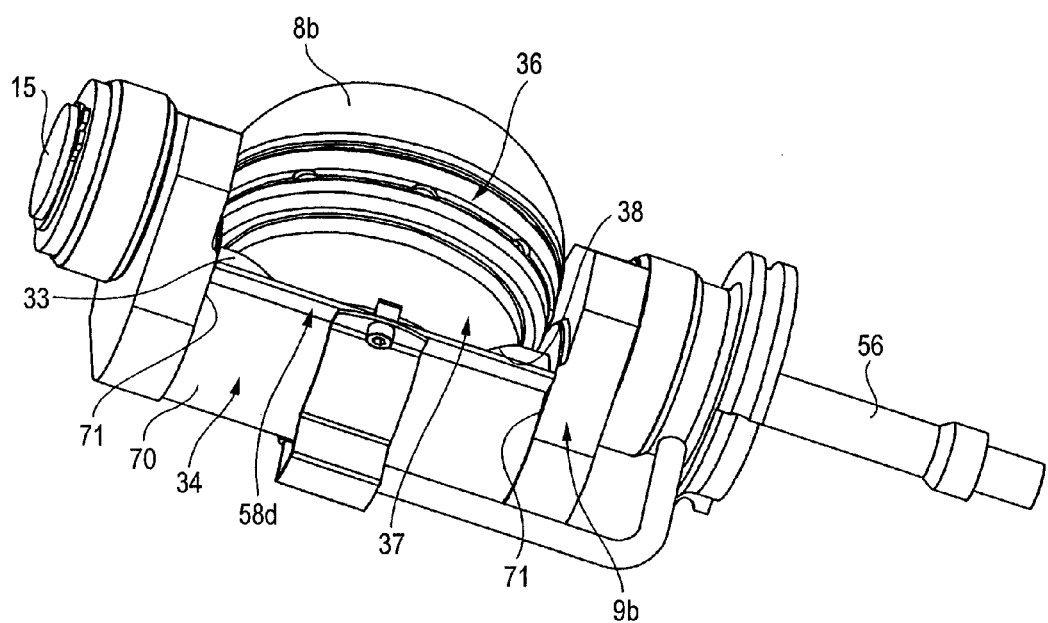
FIG. 61 is a perspective view illustrating the main parts of fourteenth embodiment of the invention.
Figure 62:
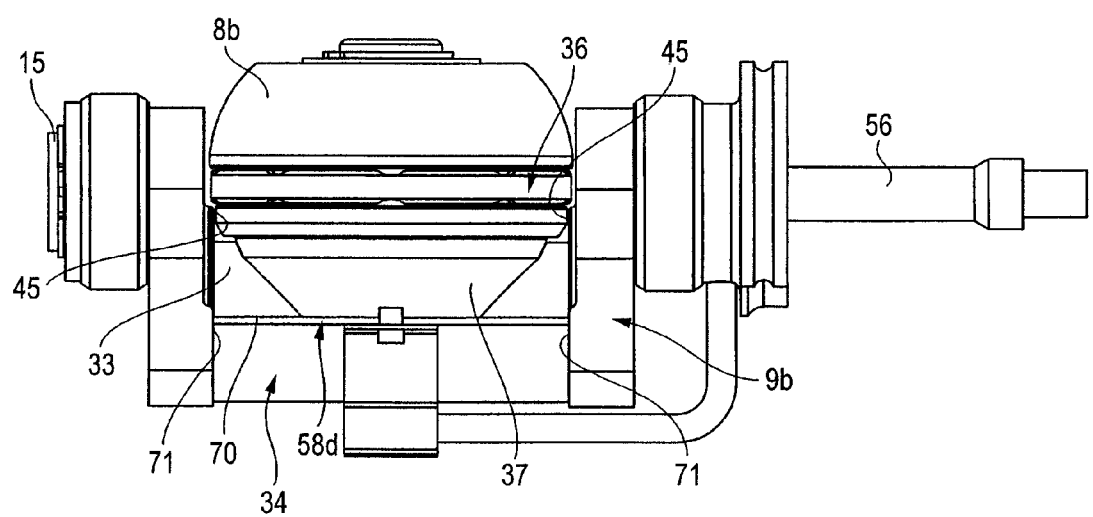
FIG. 62 is a front view of FIG. 61.
Figure 63:
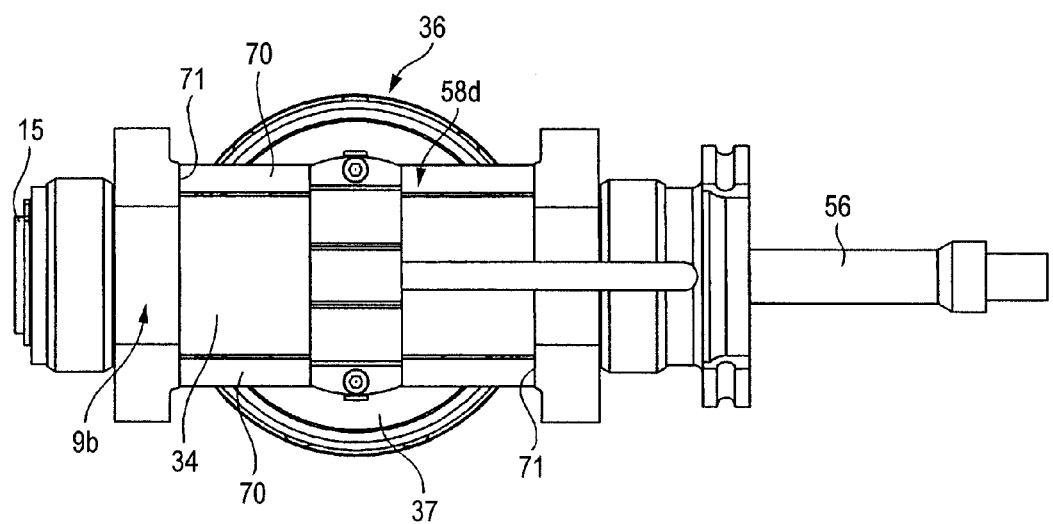
FIG. 63 is a bottom view of FIG. 61.

FIGS. 61 to 63 show a fourteenth embodiment of the invention that corresponds to the first to fourth, seventh, thirteenth, eighteenth to twenty first, and twenty third aspects of the invention. According to the fourteenth embodiment, a traction force transmitting mechanism 58d includes a pair of strut plates 70 of short plate having sufficient bending strength, such as rigid spring steel. The strut plates 70 that are strut members are arranged in parallel with the support beam 34 at both sides of the support beam 34 of the trunnion 9b (at both sides of the recess 38). The longitudinal intermediate portions of the strut plates 70 are fixed outward from the recess 38 to the outer surface of the outer ring by screws. Further, a pair of supporting surfaces 71 facing each other is formed at the opposite side to the power roller 8b in respect to the outer ring 37 in the trunnion 9b. Both longitudinal end faces of the strut plate 70 are in contact with or closely face the supporting surfaces 71.

According to the fourteenth embodiment having the above configuration, the strut plates 70 transfer traction force to the trunnion 9b through a supporting surface 71 of one of the supporting surfaces 71 from the outer ring 37.

The other configuration and operation are the same as tenth embodiment of the invention, therefore, not described for the same parts.

Fifteenth Embodiment

Figure 64:
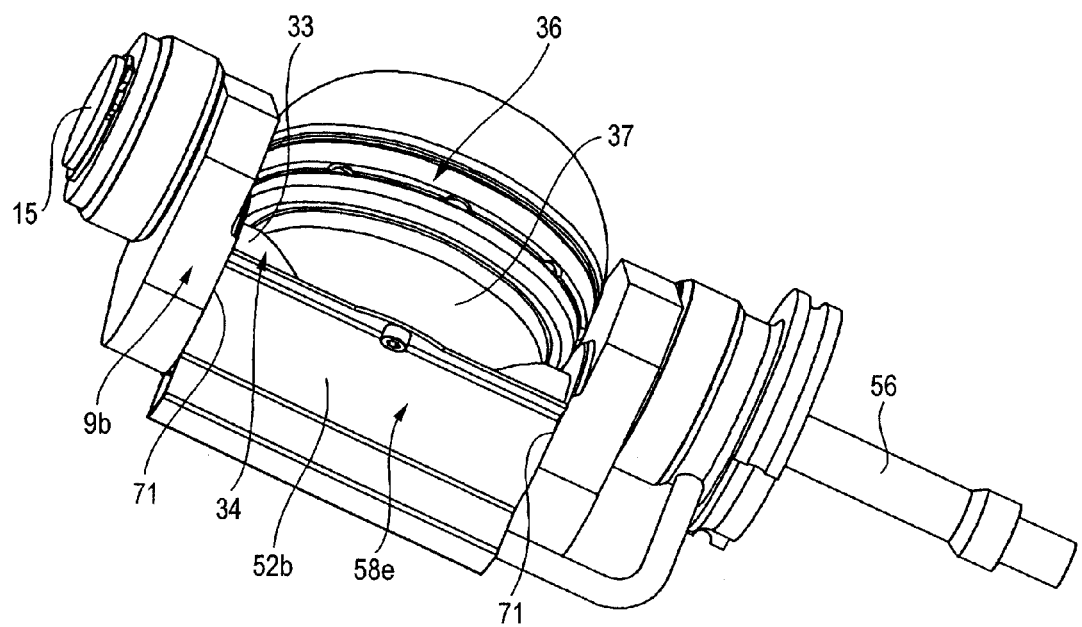
FIG. 64 is a perspective view illustrating the main parts of a fifteenth embodiment of the invention.
Figure 65:
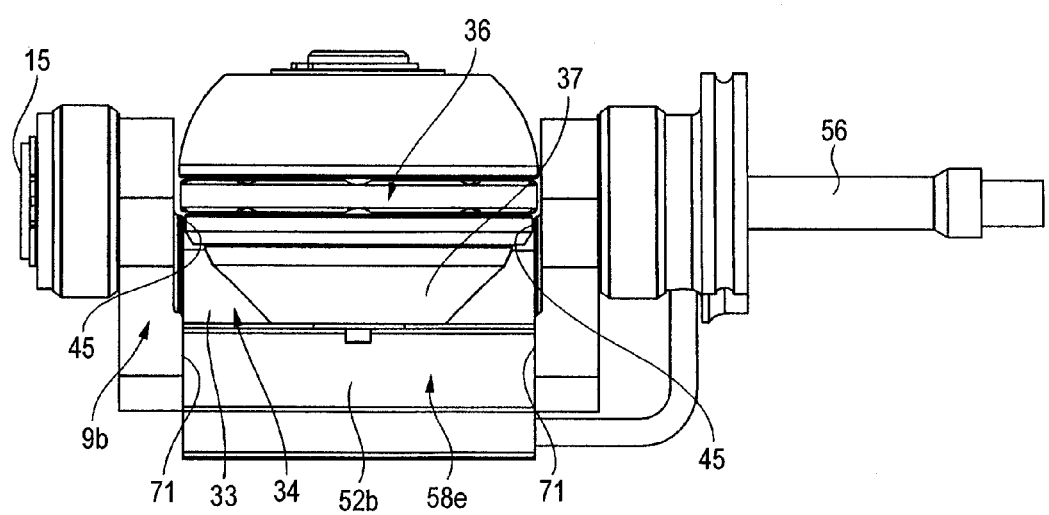
FIG. 65 is a front view of FIG. 64.
Figure 66:
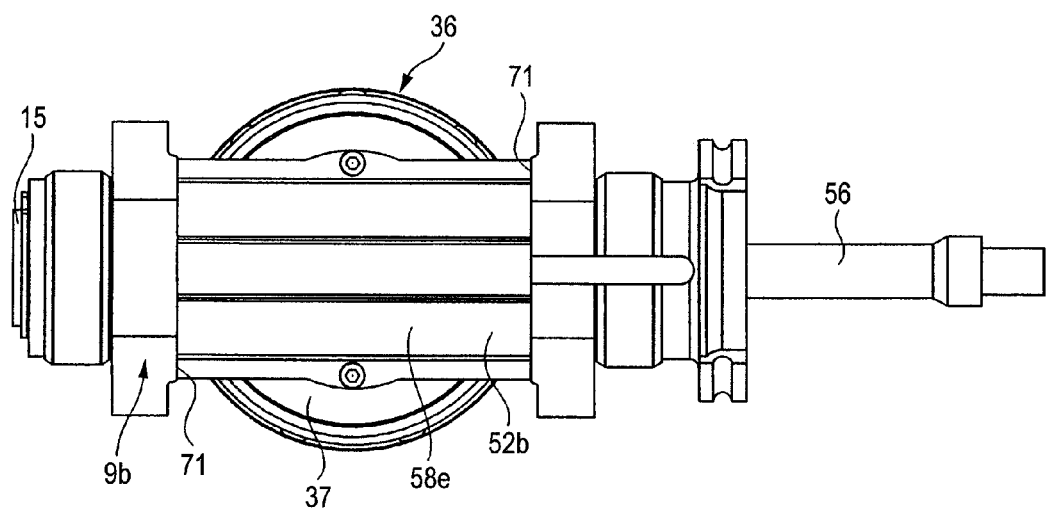
FIG. 66 is a bottom view of FIG. 64.

FIGS. 64 to 66 show a fifteenth embodiment of the invention that corresponds to the first to fourth, seventh, eighth, thirteenth, eighteenth to twenty first, and twenty third aspects of the invention. According to the fifteenth embodiment, a traction force transmitting mechanism 58e has a separation-preventing bracket 52b with increased length in the axial direction of the support beam 34 that protrudes from the support beam 34 of the trunnion 9b. Specifically, while the longitudinal intermediate portion of the separation-preventing bracket 52b is fixed to the outer surface of the outer ring 37 by screws, the longitudinal ends of the separation-preventing bracket 52b are in contact with or closely face a pair of supporting surfaces 71 formed on the trunnion 9b.

According to the fifteenth embodiment having the above configuration, the separation-preventing bracket 52b transfers traction force to the trunnion 9b through one of the supporting surfaces 71 from the outer ring 37.

The other configuration and operation are the same as tenth embodiment of the invention, therefore, not described for the same parts.

Sixteenth Embodiment

Figure 67:
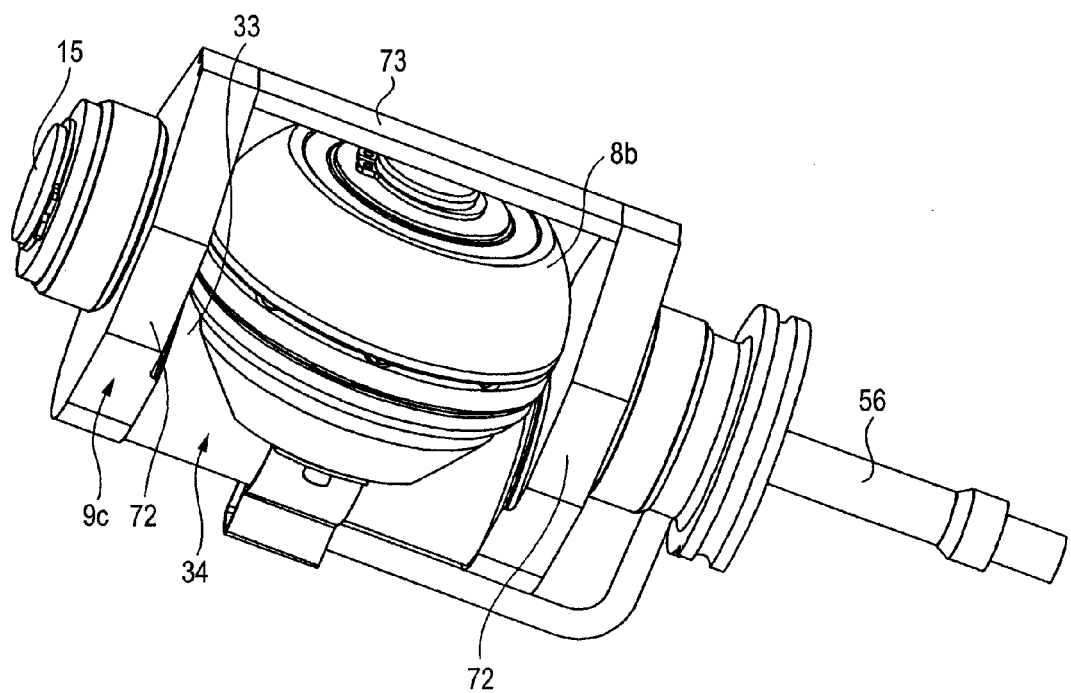
FIG. 67 is a perspective view illustrating the main parts of a sixteenth embodiment of the invention.
Figure 68:
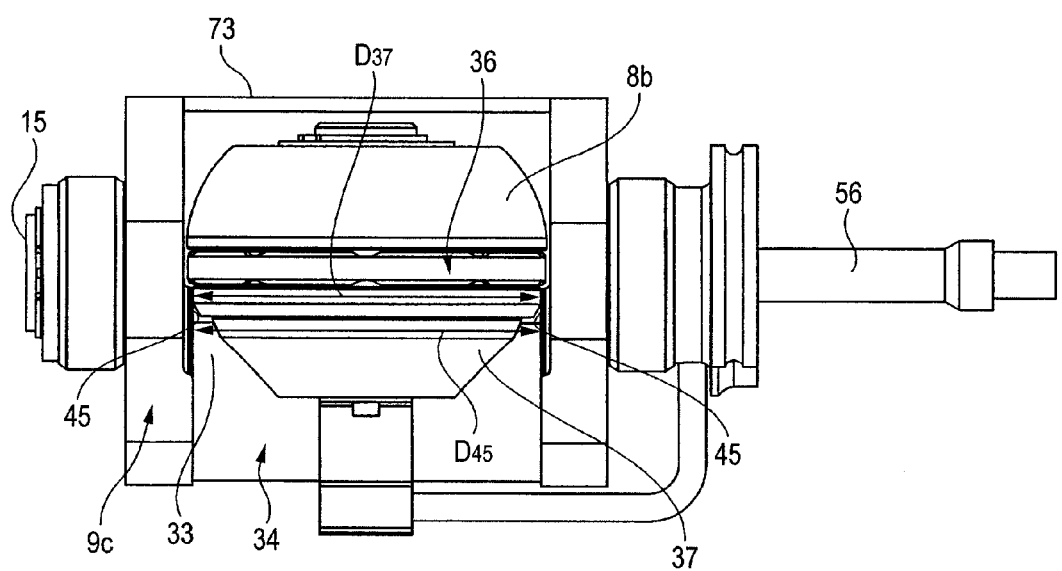
FIG. 68 is a front view of FIG. 67.
Figure 69:
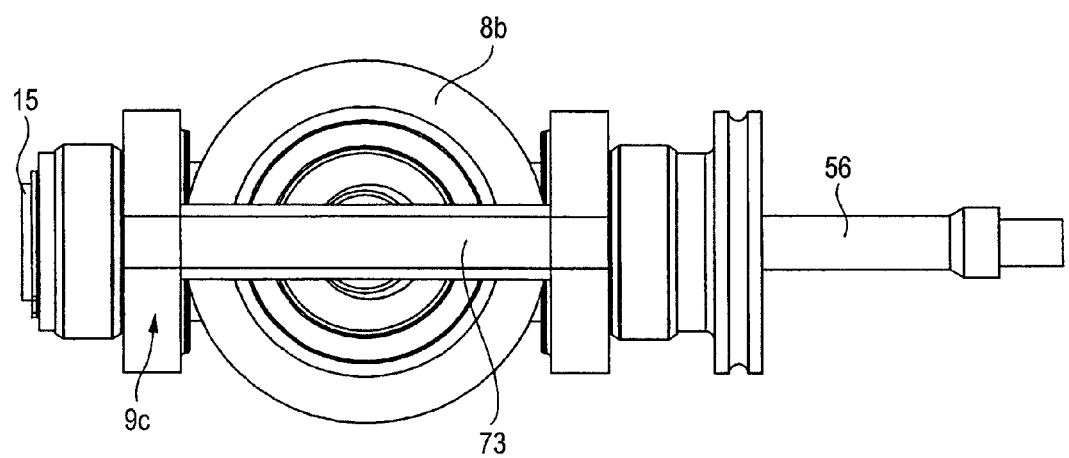
FIG. 69 is a plan view of FIG. 67.

FIGS. 67 to 69 show a sixteenth embodiment of the invention that corresponds to the first to fourth, fourteenth, eighteenth to twenty first, and twenty third aspects of the invention. According to the sixteenth embodiment, in a trunnion 9c, a pair of plates 72 connecting both ends of the support beam 34 with a pair of tilt rotary shafts 15 extends opposite to the support beam 34 from the tilt rotary shafts 15 and opposite to the support beam 34 from the inner surface of the power roller 8b. A strut beam 73 is provided between the extending ends.

According to the sixteenth embodiment provided with the strut beam 73, the strut beam 73 maintains the distance between the plates 72. Therefore, even though large power is transmitted by the toroidal continuously variable transmission, the trunnion 9c is not deformed and the distance between the sides of the plates 72 facing each other is not decreased. Accordingly, the distance $D_{45}$ of a pair of stepped faces 45 is a little larger than the outer radius D37 of the outer ring 37 of the thrust ball bearing 36, and the stepped faces 45 do not strongly push the outer ring 37 when large power is transferred. Therefore, even though the traction force transmitting mechanisms according to the tenth to fifteenth embodiments are provided, transmitting efficiency is ensured with stable transmission operation.

According to the above embodiments, a rod 56 is fixed to the ends of the trunnion 9b and the trunnion 9b is moved axially of the tilt rotary shafts 15 through the rod 56. This is designed by applying the invention to the configuration shown in FIG. 70. However, the invention may be applied to the configuration shown in FIGS. 71 and 72, in which the rod 56 is not needed.

Further, according to the embodiments of the invention, when lubricant film formed by smashing a solid lubricant material to one side or both sides of the partial cylindrical recess 38 formed on the outer surface of the outer ring 37 and the cylindrical convex surface 33 of the support beam 34, it has considerable effect on preventing wear or peeling of the sides. The lubricant film obtained by smashing a solid lubricant material has sufficient durability for long time use, so that it is advantageous in wear and peeling.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A toroidal continuously variable transmission comprising:
    at least a pair of discs that are relatively rotatably supported and coaxially arranged so that axially side surfaces thereof oppose each other;
    a plurality of trunnions that are disposed at a plurality of positions between the axially side surfaces of the discs along circumference of the discs; and a plurality of power rollers, each of which is rotatably supported by a thrust rolling bearing on an inner surface of the trunnion, and has a spherical convex surface contacting with the axially side surface of the disc, wherein the trunnion comprises:
   a pair of tilt rotary shafts that are eccentrically arranged at both ends thereof so as to be deviated from a central axis of the disc, the trunnion being swingable about the tilt rotary shaft; and
   a supporting beam which is formed between the tilt rotary shafts, and comprises a cylindrical convex surface, of which central axis is parallel with the central axes of the tilt rotary shafts and positioned radially outside of the central axes of the tilt rotary shafts, and is formed on at least an inner surface thereof in radial direction of the discs,
the thrust rolling bearing disposed between the support beam and an outer surface of the power roller comprises:
   an outer ring which is provided on a support beam side and comprises a partially cylindrical recess on an outer side thereof; and
   a plurality of rolling elements rollably disposed between an outer ring raceway formed on an inner surface of the outer ring and an inner ring raceway formed on the outer surface of the power roller, and
   the outer ring is supported on the trunnion so as to be swingable about the support beam in an axial direction of the disc by engaging the partially cylindrical recess of the outer ring with the cylindrical convex surface of the support beam.

2. The toroidal continuously variable transmission according to claim 1, wherein
   a support shaft is fixed on a center of the inner surface of the outer ring, and
   the power roller is rotatably supported around the support shaft through a radial rolling bearing.

3. The toroidal continuously variable transmission according to claim 2, wherein
   a downstream oil passage is formed inside the outer ring and the support shaft so as to supply lubricant to the thrust rolling bearing and the radial rolling bearing, and
   an upstream oil passage connected to the downstream oil passage is formed inside the support beam.

4. The toroidal continuously variable transmission according to claim 3, wherein
   an oil pipe connected to the upstream oil passage is provided outside the support beam.

5. The toroidal continuously variable transmission according to claim 1, wherein
   on the inner surface of the trunnion, a pair of stepped faces opposing each other are formed at connecting portions between both ends of the support beam and the tilt rotary shafts, respectively, and
   the outer ring is disposed between the stepped faces such that either of the stepped faces supports traction force applied to the outer ring from the power roller.

6. The toroidal continuously variable transmission according to claim 5, wherein
   a secondary thrust bearing is provided between an outer surface of the outer ring and the stepped face so as to bear traction force and reduce load required to swing the outer ring relative to the support beam.

7. The toroidal continuously variable transmission according to claim 1, wherein
   on the inner surface of the trunnion, a pair of stepped faces opposing each other are formed at connecting portions of both ends of the support beam and the tilt rotary shafts, respectively, in such a manner that distance between the stepped faces is larger than an outer diameter of the outer ring,
   a traction force transmitting mechanism is provided between the outer ring and the trunnion, and
   the traction force transmitting mechanism transmits axial traction force of the outer ring applied to the outer ring from the outer ring so that the axial traction force is supported without contacting the outer peripheral of the outer ring with the stepped face.

8. The toroidal continuously variable transmission according to claim 7, wherein
   the traction force transmitting mechanism comprises:
      an inner recessed groove that is circumferentially formed on an inner surface of a recess formed on the outer surface of the outer ring;
      an outer recessed groove that is formed on the cylindrical convex surface of the support beam along with the inner recessed groove; and
      a transmission member crossed over the inner recessed groove and the outer recessed groove.

9. The toroidal continuously variable transmission according to claim 8, wherein
   cross-sections of the inner and outer recessed grooves of the traction force transmission mechanism are rectangle,
   the transmission member is a partially arc shaped engaging piece,
   both axial end faces of the transmission member are flat faces parallel to each other, and
   the transmission member comprises a recess groove on an inner peripheral face thereof for communicating lubricant therethrough.

10. The toroidal continuously variable transmission according to claim 8, wherein
    cross-sections of the inner and outer grooves are semi-circle, and
    the transmission member is a plurality of steel balls.

11. The toroidal continuously variable transmission according to claim 7, wherein
    the traction force transmitting mechanism comprises:
       a key fixed on the outer surface of the support beam so as to be protruded therefrom; and
       an inner recessed groove circumferentially formed on an inner surface of a recess formed on the outer surface of the outer ring,
       wherein the key is engaged with the inner recessed groove so as to be capable of displacing relative to the inner recessed groove.

12. The toroidal continuously variable transmission according to claim 7, wherein
    the traction force transmitting mechanism comprises:
       a protrusion formed on an axially intermediate portion of the support beam so as to be monolithic with the support beam; and
       an inner recessed groove circumferentially formed on an inner surface of a recess formed on the outer surface of the outer ring,
       wherein the protrusion is engaged with the inner recessed groove so as to be capable of displacing relative to the inner recessed groove.

13. The toroidal continuously variable transmission according to claim 7, wherein
    the traction force transmitting mechanism comprises a strut member arranged in the trunnion so as to be parallel with the support beam, a longitudinally intermediate portion of the strut member is fixed to a part of the outer ring at a position away from the partially cylindrical recess of the outer ring, a pair of supporting surfaces are formed on a part of the trunnion at a position opposite of the power roller relative to the outer ring, and both of longitudinally end faces of the strut member are provided so as to abut or closely oppose to the pair of supporting surfaces, respectively.

14. The toroidal continuously variable transmission according to claim 1, wherein a pair of plates are provided in the trunnion so as to connects ends of the support beam with the tilt rotary shafts, respectively, the plate extends from the support beam side to the power roller side so as to beyond the inner surface of the power roller, and a strut beam is provided between ends of extended portions of the plates.

15. The toroidal continuously variable transmission according to claim 1, wherein the partial cylindrical recess of the outer ring directly contacts with the cylindrical convex surface of the support beam.

16. The toroidal continuously variable transmission according to claim 1, wherein the partial cylindrical recess of the outer ring engages with the cylindrical convex surface of the support beam through a bearing.

17. The toroidal continuously variable transmission according to claim 1, wherein a stopper is provided on a portion of an intermediate outer peripheral surface of the support beam so that when the outer ring swings at limit allowed swinging angle, a part of the outer ring abuts or engages with the stopper so as to prevent the outer ring from swinging further the allowed swinging angle.

18. The toroidal continuously variable transmission according to claim 1, wherein a first separation-preventing mechanism, which allows relative rotation between the outer ring and the power rollers and also prevents the outer ring from separating from the power rollers, is provided between the outer ring and the power roller; and a second separation-preventing mechanism, which allows the outer ring and the trunnions to swing and also prevents the outer ring from separating from the trunnions, is provided between the outer ring and the trunnion.

19. The toroidal continuously variable transmission according to claim 18, wherein the first separation-preventing mechanism comprises:

a support shaft fixed on a center of an inner surface of the outer ring;

a radial roller bearing rotatably supporting the power roller around the support shaft; and a stop ring fixed on a protruded part of an edge portion of the support shaft which is protruded relative to the inner surface of the power roller.

20. The toroidal continuously variable transmission according to claim 18, wherein the second separation-preventing mechanism comprises a separation-preventing bracket formed so as to stride across the support beam, and both ends of the separation-preventing bracket are fixed on the outer surface of the outer ring at positions exist both sides of the support beam.

21. The toroidal continuously variable transmission according to claim 20, wherein a support shaft is fixed on a center of an inner surface of the outer ring so that the power roller is rotatably supported around the support shaft through a radial roller bearing, a downstream oil passage, which supplies lubricant to the thrust rolling bearing and the radial rolling bearing, is formed inside the support shaft and the outer ring, an upstream oil passage connected to the downstream oil passage is formed inside the support beam, an oil pipe connected to the upstream oil passage is provided outside the support beam, and a part of the separation-preventing bracket is disposed on an edge side portion of the oil pipe at a position facing a connecting portion between the oil pipe and the support beam, so that the oil pipe is prevented from moving in a direction in which the oil pipe is removed out from the connecting portion.

22. The toroidal continuously variable transmission according to claim 21, wherein a large diameter portion is formed on the separation-preventing bracket at a position facing the oil pipe so as to be positioned radially outward of the support beam relative to the other part, and a stopper mechanism prevents the outer ring from swinging further the allowed swinging angle by engaging both ends of the large diameter portion with the oil pipe.

23. The toroidal continuously variable transmission according to claim 20, wherein a stopper mechanism comprises:

an engagement hole formed at the intermediate portion of the separation-preventing bracket; and an engagement pin protrudingly formed on the support beam at a portion corresponding to the engagement hole, wherein stopper mechanism prevents the outer ring from swinging further an allowed swinging angle by engaging the engaging pin with the engaging hole.

24. The toroidal continuously variable transmission according to claim 1, wherein in the support beam, a portion opposite to the cylindrical convex surface in the radial direction of the disc is recessed radially inward from a virtual cylindrical surface including the cylindrical convex surface.

25. The toroidal continuously variable transmission according to claim 24, wherein the portion recessed radially inward is a partial cylindrical surface that is concentrically arranged with an outer peripheral surface of the tilt rotary shaft.

* * * * *